United States Patent
Anderson et al.

(10) Patent No.: US 7,142,756 B2
(45) Date of Patent: Nov. 28, 2006

(54) HIGH INDEX-CONTRAST FIBER WAVEGUIDES AND APPLICATIONS

(75) Inventors: Emilia Anderson, Cambridge, MA (US); Wesley A. King, Brighton, MA (US); Yoel Fink, Cambridge, MA (US); Lori Pressman, Cambridge, MA (US)

(73) Assignee: OmniGuide, Inc., Cambridge, MA (US)

( * ) Notice: Subject to any disclaimer, the term of this patent is extended or adjusted under 35 U.S.C. 154(b) by 0 days.

(21) Appl. No.: 10/123,072

(22) Filed: Apr. 12, 2002

(65) Prior Publication Data

US 2003/0044159 A1 Mar. 6, 2003

Related U.S. Application Data

(60) Provisional application No. 60/283,459, filed on Apr. 12, 2001, provisional application No. 60/304,229, filed on Jul. 10, 2001, and provisional application No. 60/291,106, filed on May 15, 2001.

(51) Int. Cl.
*G02B 6/02* (2006.01)
*G02B 6/20* (2006.01)
*G02B 6/00* (2006.01)

(52) U.S. Cl. .................. 385/125; 385/127; 385/142

(58) Field of Classification Search ............. 385/122, 385/123, 125–128, 141–145; 501/40, 37
See application file for complete search history.

(56) References Cited

U.S. PATENT DOCUMENTS

| | | |
|---|---|---|
| 3,485,666 A | 12/1969 | Sterling et al. |
| 3,655,438 A | 4/1972 | Sterling et al. |
| 3,657,006 A | 4/1972 | Fisher et al. |

(Continued)

FOREIGN PATENT DOCUMENTS

| | | |
|---|---|---|
| EP | 0 060 085 | 9/1982 |
| EP | 0 195 630 | 9/1986 |
| EP | 0 426 203 | 5/1991 |
| GB | 2288469 | 10/1995 |
| GB | 2 350 904 | 12/2000 |
| JP | 2000-035521 | 2/2000 |
| JP | 2001-051244 | 2/2001 |
| WO | WO 94/09393 | 4/1994 |
| WO | WO 94/16345 | 7/1994 |
| WO | WO 97/01774 | 1/1997 |
| WO | WO 00/22466 | 4/2000 |
| WO | WO 00/46287 | 8/2000 |
| WO | WO 02/14946 | 2/2002 |

OTHER PUBLICATIONS

Fink et al. "Guiding optical Light in Air Using an All–Dielectric Structure;" Journal of Lightwave Technology, vol. 17, No. 11, Nov. 1999.*

Fiegel A. et al. "Chalcogenide glass–based three–dimensional photonic crystals," Applied Physics Letters, 77:20, pp. 3221–3223, Nov. 13, 2000.

Massadegh R. et al. "Fabrication of single–mode chalcogenide optial fiber," Journal of Lightwave Technology, 16:2, pp. 214–216, Feb. 1998.

(Continued)

*Primary Examiner*—Nimeshkumar D. Patel
*Assistant Examiner*—Peter Macchiarolo
(74) *Attorney, Agent, or Firm*—Fish & Richardson P.C.

(57) ABSTRACT

In one aspect, the invention features a fiber waveguide having a waveguide axis, including a first portion extending along the waveguide axis, and a second portion different from the first portion extending along the waveguide axis surrounding the first portion, wherein at least one of the first and second portions comprises a chalcogenide glass selected from the group consisting of Selenium chalcogenide glasses and Tellurium chalcogenide glasses, both the first and second portions have a viscosity greater than $10^3$ Poise at some temperature, T, and the fiber waveguide is a photonic crystal fiber.

55 Claims, 38 Drawing Sheets

U.S. PATENT DOCUMENTS

| | | | |
|---|---|---|---|
| 3,659,915 A | | 5/1972 | Maurer |
| 3,801,355 A | | 4/1974 | Cakenberghe |
| 3,823,995 A | | 7/1974 | Carpenter |
| 3,850,604 A | | 11/1974 | Klein |
| 3,886,896 A | | 6/1975 | Van Cakenberghe |
| 3,826,560 A | | 7/1975 | Schultz |
| 3,933,454 A | | 1/1976 | DeLuca |
| 3,938,974 A | * | 2/1976 | Macedo et al. ............. 385/141 |
| 4,063,914 A | | 12/1977 | Roeder et al. |
| 4,117,802 A | | 10/1978 | Le Sergent et al. |
| 4,125,388 A | | 11/1978 | Powers |
| 4,145,458 A | | 3/1979 | Koenings et al. |
| 4,165,223 A | | 8/1979 | Powers |
| 4,217,027 A | | 8/1980 | MacChesney et al. |
| 4,217,123 A | | 8/1980 | Titchmarsh |
| 4,324,803 A | | 4/1982 | Bergmann et al. |
| 4,334,903 A | | 6/1982 | MacChesney et al. |
| 4,339,173 A | | 7/1982 | Aggarwal et al. |
| 4,349,373 A | | 9/1982 | Sterling et al. |
| 4,405,655 A | | 9/1983 | Tuin |
| 4,410,345 A | | 10/1983 | Usui et al. |
| 4,473,596 A | | 9/1984 | Beerwald et al. |
| 4,612,294 A | | 9/1986 | Katsuyama et al. |
| 4,714,589 A | | 12/1987 | Auwerda et al. |
| 4,728,350 A | * | 3/1988 | Cocito ......................... 385/142 |
| 4,730,896 A | | 3/1988 | Katsuyama et al. |
| 4,733,940 A | * | 3/1988 | Broer et al. ................. 385/123 |
| 4,747,861 A | | 5/1988 | Schneider |
| 4,877,938 A | | 10/1989 | Rau et al. |
| 4,908,053 A | | 3/1990 | Nishii et al. |
| 4,909,816 A | | 3/1990 | MacChesney et al. |
| 4,913,518 A | | 4/1990 | Fine |
| 4,932,752 A | | 6/1990 | Krashkevich et al. |
| 5,015,844 A | | 5/1991 | Cole |
| 5,026,409 A | | 6/1991 | Robinson et al. |
| 5,069,701 A | | 12/1991 | Pastor et al. |
| 5,185,021 A | | 2/1993 | Miura et al. |
| 5,211,731 A | | 5/1993 | Busse et al. |
| 5,360,637 A | | 11/1994 | Jacoboni et al. |
| 5,454,847 A | | 10/1995 | Jacoboni et al. |
| 5,483,614 A | | 1/1996 | Bruck et al. |
| 5,518,516 A | | 5/1996 | Garnham |
| 5,629,953 A | | 5/1997 | Bishop et al. |
| 5,641,956 A | | 6/1997 | Vengsarkar et al. |
| 5,661,839 A | | 8/1997 | Whitehead |
| 5,729,646 A | | 3/1998 | Miyagi et al. |
| 5,740,287 A | | 4/1998 | Scalora et al. |
| 5,802,236 A | * | 9/1998 | DiGiovanni et al. ........ 385/127 |
| 5,812,729 A | | 9/1998 | Allison et al. |
| 5,814,367 A | | 9/1998 | Hubbard et al. |
| H1754 H | | 10/1998 | Tran et al. |
| 5,879,426 A | | 3/1999 | Sanghera et al. |
| 5,917,108 A | | 6/1999 | Itoh et al. |
| 5,949,935 A | | 9/1999 | Schaafsma et al. |
| 5,953,478 A | | 9/1999 | Sanghera et al. |
| 5,958,103 A | | 9/1999 | Yoneda et al. |
| 5,991,486 A | | 11/1999 | Braglia |
| 6,058,127 A | | 5/2000 | Joannopoulos et al. |
| 6,074,968 A | * | 6/2000 | Yoneda et al. ............... 385/142 |
| 6,075,915 A | * | 6/2000 | Koops et al. ................ 385/125 |
| 6,108,474 A | | 8/2000 | Eggleton et al. |
| 6,115,526 A | | 9/2000 | Morse |
| 6,128,429 A | | 10/2000 | Cole et al. |
| 6,130,780 A | | 10/2000 | Joannopoulos et al. |
| 6,175,671 B1 | | 1/2001 | Roberts |
| 6,195,483 B1 | | 2/2001 | Moon et al. |
| 6,201,916 B1 | * | 3/2001 | Eggleton et al. ............. 385/122 |
| 6,260,388 B1 | | 7/2001 | Borrelli et al. |
| 6,301,421 B1 | | 10/2001 | Wickham et al. |
| 6,334,017 B1 | | 12/2001 | West |
| 6,334,019 B1 | * | 12/2001 | Birks et al. .................. 385/125 |
| 6,380,551 B1 | | 4/2002 | Abe et al. |
| 6,389,197 B1 | | 5/2002 | Iltchenko et al. |
| 6,404,966 B1 | * | 6/2002 | Kawanishi et al. ......... 385/125 |
| 6,413,891 B1 | * | 7/2002 | Cho et al. ..................... 501/41 |
| 6,463,200 B1 | | 10/2002 | Fink et al. |
| 6,504,645 B1 | * | 1/2003 | Lenz et al. .................. 359/334 |
| 6,542,690 B1 | * | 4/2003 | Ellison et al. .............. 385/141 |
| 6,563,981 B1 | | 5/2003 | Weisberg et al. |
| 6,603,911 B1 | | 8/2003 | Fink et al. |
| 6,625,364 B1 | | 9/2003 | Johnson et al. |
| 6,728,439 B1 | | 4/2004 | Weisberg et al. |
| 6,788,864 B1 | | 9/2004 | Ahmad et al. |
| 6,801,698 B1 | | 10/2004 | King et al. |
| 6,816,243 B1 | | 11/2004 | Shurgalin et al. |
| 6,879,386 B1 | | 4/2005 | Shurgalin et al. |
| 6,895,154 B1 | | 5/2005 | Johnson et al. |
| 6,898,359 B1 | | 5/2005 | Soljacic et al. |
| 6,903,873 B1 | | 6/2005 | Joannopoulos et al. |
| 2001/0026667 A1 | | 10/2001 | Kawanishi et al. |
| 2002/0039046 A1 | | 4/2002 | Lipson et al. |
| 2003/0031852 A1 | | 2/2003 | Fink et al. |
| 2003/0044158 A1 | | 3/2003 | King et al. |
| 2003/0118315 A1 | | 6/2003 | Hewak et al. |
| 2004/0013379 A1 | | 1/2004 | Johnson et al. |
| 2004/0137168 A1 | | 7/2004 | Fuflyigin |
| 2004/0141702 A1 | | 7/2004 | Fuflyigin et al. |
| 2004/0223715 A1 | | 11/2004 | Benoit et al. |
| 2005/0226579 A1 | | 10/2005 | Fink et al. |
| 2005/0259933 A1 | | 11/2005 | Temelkuran et al. |
| 2005/0259934 A1 | | 11/2005 | Temelkuran et al. |
| 2005/0259942 A1 | | 11/2005 | Temelkuran et al. |
| 2005/0259944 A1 | | 11/2005 | Anderson et al. |
| 2005/0271340 A1 | | 12/2005 | Weisberg et al. |

OTHER PUBLICATIONS

Nishii, J. et al. "Chalcogenide glass fiber with a core–cladding structure." Applied Optics, 28: 23, pp. 5122–5127, Dec. 1, 1989.

Sanghera, J.S. et al. "Development and infrared applications of chalcogenide class optial fibers." Fiber and Integrated Optics, 19:3, pp. 251–274, Mar. 1, 2000.

Sanghera, J.S. et al. "Fabricationof long lengths of low–loss IR transmitting AS40S (60–X) sex glass fibers." Journal of Lightwave Technology, 14:5, pp. 743–748, May 1, 1996.

Monro, T.M. et al. "Chalcogenide Holey Fibres." Electronics Letters, 36:24, pp. 1998–2000, Nov. 23, 2000.

Chang et al. "Vector Normal Modes on Two–Core Optical Fibers—Part I: The Normalmode solutions." Journal of Lightwave Technology, 15:7, Jul. 1997, pp. 1213–1223.

Berger V. "From photonic band gaps to refractive index engineering." Optical Materials, 11:2–3, Jan. 1999, pp. 131–142.

A. Assch, et al., "10cm Yb3+ DFB fibre laser with permanent phase shifted grating", Electron. Lett., 31 (12): 969 (1995).

A. S. Oliveira et al., "Frequency upconversion in $Er^{3+}$/$Yb^{3+}$– codoped chalcogenide glass," Appl. Phys. Lett, 72 (7): 753–755 (1998).

A. T. Clausen et al., "10–GHz return–to–zero pulse source tunable in wavelength with the single– or multiwavelength output based on four–wave mixing in a newly developed highly nonlinear fiber," IEEE Photon. Technol. Lett., 13 (1): 70–72 (2001).

Andrea Melloni et al., "All–optical switching in phase–shifted fiber Bragg grating," IEEE Photonics Technology Letters, 12 (1): 42–44, Jan. 2000.

B. E. Little et al., "Microring resonator arrays for VLSI photonics", IEEE Photon. Technol. Lett., 12 (3): 323–325 (2000).

B. J. Eggleton et al., "All–optical switching in long–period fiber gratings," Optics Letters, 22 (12): 883–885, Jun. 15, 1997.

B. J. Eggleton et al., "Grating resonance in air–silica microstructured optical fibers", Opt. Lett., 24 (21): 1460 (1999).

B. Malo, et al., "Photosensitivity in phosphorous–doped silica glass and optical waveguides," Appl. Phys. Lett 65 (4): 394 (1994).

D. Furniss et al., "A novel approach for drawing optical fibers from disparate core/clad. glasses," J. Non–Cryst. Sol. 213–214: 141–146 (1997).

E. Anderson et al., "Dielectric Materials for Manufacturing Photonic Bandgap Waveguide," US Patent Disclosure, (2001).

E. Brinkmeyer, et al., "Fibre Bragg reflector for mode selection and line–narrowing of injection lasers", Electron. Lett., 22 (3): 134 (1986).

G. Meltz, et al., "Formation of Bragg gratings in optical fibers by a transverse holographic method", Opt.Lett., 14 (15): 823 (1989).

G. S. He et al., "Efficient amplification of a broad–band optical signal through stimulated Kerr scattering in a CS2 liquid–core fiber system," IEEE J. Quantum Electron., 28 (1): 323–329 (1992).

H.A. Haus, et al., "Antisymmetric taper of distributed feedback lasers", IEEE J. Quantum Electron., QE–12 (9): 532 (1976).

I. Gannot, et al., "Current Status of Flexible Waveguides for IR Laser Radiation Transmission", IEEE J. Sel. Topics in Quantum Electr., IEEE Service Center, 2 (4): 880–888 (Dec. 1996).

J. Fick et al., "High photoluminescence in erbium–doped chalcogenide thin films," J. Non–crystalline Solids, 272 (2–3): 200–208 (2000).

J. Kobelke et al., "Chalcogenide glass single mode fibers— preparation and properties," J. Non–Cyrstalline Solids, 256–7: 226–231 (1999).

J. M. Harbold et al., "Highly nonlinear As–S–Se glasses for all–optical switching," Optics Lett., 27 (2): 119–121 (2002).

J. Marchionda et al., "Advanced rod in tube techniques for fluoride fiber fabrication," Ceramics Transactions, Solid–State Optical Materials, eds. Allan J. Bruce and B.V. Hiremath, 28: 587–596 (1992).

J. S. Foresi et al., "Photonic–bandgap microcavities in optical waveguides," Nature, 390: 143–145 (Nov. 13, 1997).

Jia Jiang et al., "Fluorophosphate cladding glasses for fluoride glass fibers," J Non–Cryst. Sol., 213 and 214: 11–15 (1997).

J–X Cai, et al., "Simultaneous tunable dispersion compensation of many WDM channels using a sampled nonlinearly chirped fiber Bragg grating", IEEE Photon. Tech. Lett., 11 (11): 1455 (1999).

K. O. Hill, et al., "Photosensitivity in optical fiber waveguides: Application to reflection filter fabrication", Appl. Phys. Lett., 32 (10):647 (1978).

K. O. Hill, et al., "Efficient mode conversion in telecommunication fibre using externally written gratings", Electron. Lett., 26 (16): 1270 (1990).

L. F. Stokes, et al., "All–single–mode fiber resonator", Opt. Lett., 7 (6): 288 (1982).

Louis Poirier et al., "Nonlinear coaxial photonic crystal," Applied Physics Letters, 78 (18): 2626–2628, Apr. 30, 2001.

M. Ibanescu et al., "An all dielectric coaxial waveguide," Science, 289: 415–419 (2000).

M. Miyagi, et al., "Fabrication of germanium–coated nickel hollow waveguides for infrared transmission", Appl. Phys. Lett., 43 (5): 430 (1983).

M.W. Moore et al., "Sputtering of Chalcogenide Coatings on to Fluoride Glass," Novel Glasses and Processes, pp. 193–197.

N. Croitoru, et al., "Characterization of hollow fibers for the transmission of infrared radiation", Appl. Opt., 29 (12): 1805 (1990).

Piere R. Villeneuve et al., "Single–mode waveguide microcavity for fast optical switching," Opt. Lett., 21 (24): 2017–2019, Dec. 15, 1996.

Pochi Yeh et al., "Theory of Bragg Fiber," J.Opt.Soc.Am., 68 (9): 1196–1201 (1978).

R. E. Smith et al., "Reduced coupling loss using a tapered–rib adiabatic–following fiber coupler," IEEE Photon. Technol. Lett., 8 (8): 1052–1054 (1996).

R. U. Ahmad et al., "Ultracompact corner–mirror and T–branches in silicon–on–insulator," IEEE Photon. Technol. Lett., 14 (1): 65–76 (Jan. 2002).

S. Coen et al., "White–light supercontinuum generation with 60–ps pump pulses in a photonic crystal fiber," Opt. Lett., 26 (17): 1356–1358 (2001).

S. Ramachandran and S. G. Bishop, "Low loss photoinduced waveguides in rapid thermally annealed films of chalcogenide glasses," Appl. Phys. Lett., 74 (1): 13–15 (1999).

Stojan Radic et al., "Theory of low–threshold optical switching in nonlinear phase–shifted periodic structures," J.Opt-.Soc.Am. B, 12 (4): 671–680, Apr. 1995.

T. Cardinal et al., "Non–linear optical properties of chalcogenide glasses in the system As–S–Se," J. Non–Crystalline Solids, 256–7: 353–360 (1999).

T.A. Birks et al., "Dispersion Compensation Using Single–Material Fibers," IEEE Photonics Technology Letters, 11 (6): 674–676 (1999).

T.M. Monroe et al., "Chalcogenide Holey Fibres," Electronics Letters, 36 (24): 1998–2000 (2000).

Y. Fink et al., "Block copolymers as photonic band gap materials," J. Lightwave Tech., 17 (11): 1963–1969, (JLT IEEE–special issue on photonic crystals–invited paper) (1999).

Y. Matsuura, et al., "Hollow glass waveguides with three layered dielectric coating fabricated by chemical vapor deposition," J. Opt. Soc. Amer., 14 (6): 1255 (1997).

Y. Yamamoto et al., Phys. Today, 46: 66–73 (1993).

Yoel Fink et al., "A dielectric omnidirectional reflector," Science, 282: 1679–1682 (1998).

Yong Xu et al., "Asymptomatic Analysis of Bragg Fiber," Optics Letters, 25 (24): 1756–1758 (2000).

Blanc, D. and Wilson, J.I.B. "Plasma–enhanced chemical vapor deposition of Ge–Se and Ge–S" Optical Engineering, Oct. 1988, vol. 27, No. 10 pp. 917–921.

Voronin, N.I. et al. "Chalcogenide–glass optical fibers for the infrared range produced by plasma–chemical deposition from the gas phase" Sov. Phys. Dokl. 30(4), Apr. 1985, pp. 306–307.

Mizrahi, Amit and Schachter "Bragg reflection waveguides with a matching layer" Optics Express Jul. 12, 2004 vol. 12, No. 14.

Johnson et al., "Low–loss asymptotically single–mode propagation in large–core OmniGuide fibers," Optics Express, vol. 9, No. 13, pp. 748–779, Dec. 17, 2001.

* cited by examiner

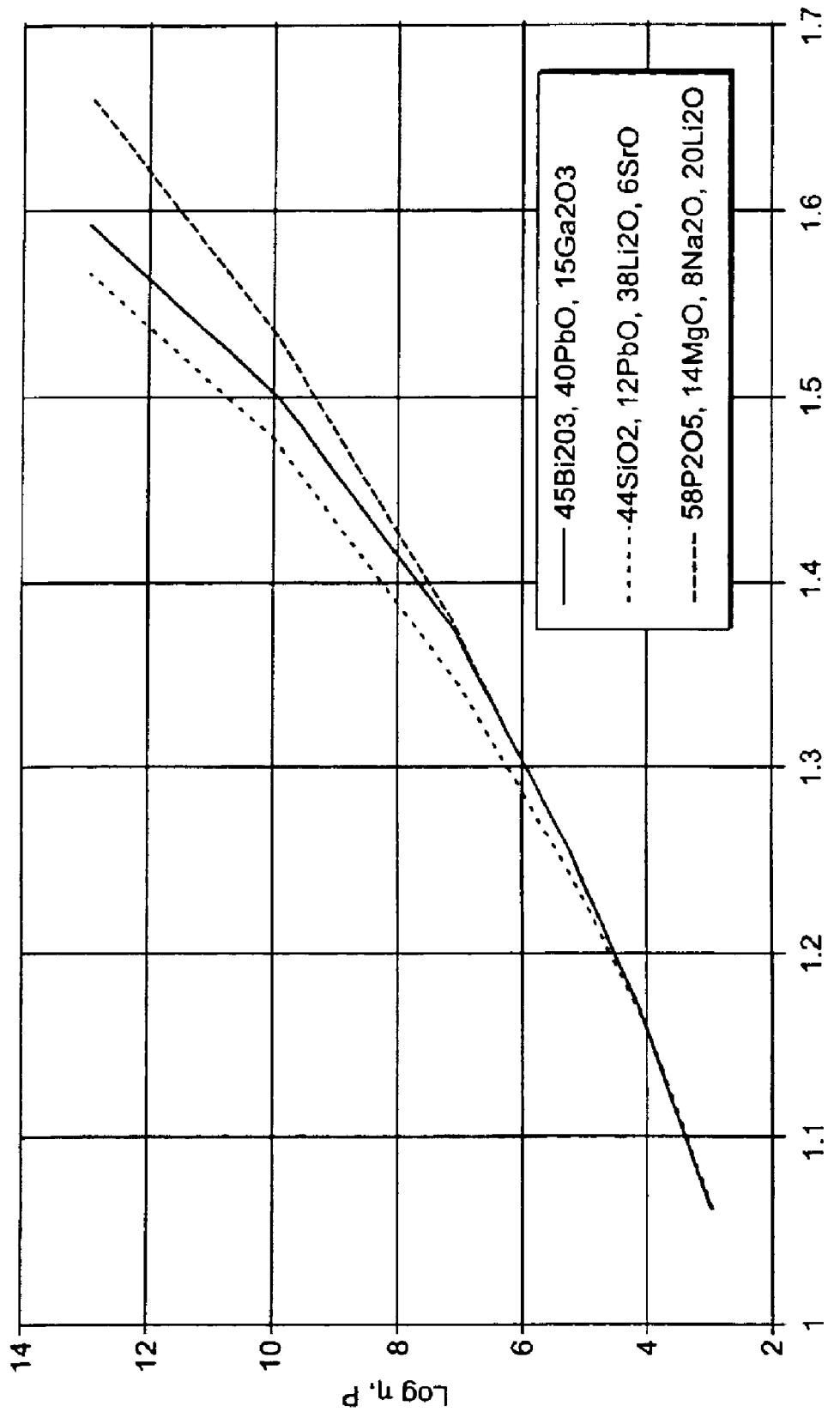

MATCHING VISCOSITY FOR La-Ga-S GLASS AND LEAD-ALKALI-BOROSILICATE GLASS
— 70Ga2S3, 30La2S3
--- 22SiO2, 54B2O3, 18Na2O, 6PbO

HIGH INDEX-CONTRAST FIBER WAVEGUIDES AND APPLICATIONS

CROSS-REFERENCE TO RELATED APPLICATIONS

This application claims priority to the following: U.S. Provisional Patent Application Ser. No. 60/283,459, entitled "DIELECTRIC MATERIALS FOR MANUFACTURING OMNI-DIRECTIONAL WAVEGUIDE," to Emilia Anderson et al., filed Apr. 12, 2001; U.S. Provisional Patent Application Ser. No. 60/304,229, entitled "HIGH Q-CAVITIES IN OMNIGUIDE AND BRAGG FIBERS," to Marin Soljačić et al., filed Jul. 10, 2001; and, U.S. Provisional Patent Application Ser. No. 60/291,106, entitled "AXIALLY MODULATED PHOTONIC BANDGAP FIBERS, METAL-COATED FIBERS, AND METHODS OF THEIR FABRICATION," to Marin Soljacic et al., filed May 15, 2001; The contents of all the above are incorporated herein by reference.

BACKGROUND

This invention relates to fiber waveguides, and more particularly to high index-contrast fiber waveguides.

Optical components are becoming increasingly more common in telecommunication networks. For example, fiber waveguides such as optical fibers are used to carry information between different locations as optical signals. Such waveguides substantially confine the optical signals to propagation along a preferred path or paths. Similarly, other components such as sources, modulators, and converters often include guided regions that confine electromagnetic (EM) energy. Although metallic waveguides have a long history of use at longer wavelengths (e.g., microwaves), their usefulness as waveguides in the optical regime (e.g., 350 nm to 3 microns) is limited by their absorption. Thus, dielectric waveguiding regions are preferred in many optical applications.

The most prevalent type of fiber waveguide is an optical fiber, which utilizes index guiding to confine an optical signal to a preferred path. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode for a given wavevector parallel to the waveguide axis. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts ranging from about 0.2% to 3% for wavelengths in the range of 1.5 µm, depending on the application.

Drawing a fiber from a preform is the most commonly used method for making fiber waveguides. A preform is a short rod (e.g., 10 to 20 inches long) having the precise form and composition of the desired fiber. The diameter of the preform, however, is much larger than the fiber diameter (e.g., 100's to 1000's of times larger). Typically, when drawing an optical fiber, the material composition of a preform includes a single glass having varying levels of one or more dopants provided in the preform core to increase the core's refractive index relative to the cladding refractive index. This ensures that the material forming the core and cladding are Theologically and chemically similar to be drawn, while still providing sufficient index contrast to support guided modes in the core. To form the fiber from the preform a furnace heats the preform to a temperature at which the glass viscosity is sufficiently low (e.g., less than $10^8$ Poise) to draw fiber from the preform. Upon drawing, the preform necks down to a fiber that has the same cross-sectional composition and structure as the preform. The diameter of the fiber is determined by the specific Theological properties of the fiber and the rate at which it is drawn.

Preforms can be made using many techniques known to those skilled in the arts, including modified chemical vapor deposition (MCVD) and outside deposition (OVD). The MCVD process involves depositing layers of vaporized raw materials onto the inside walls of a pre-made tube in the form of soot. Each soot layer is fused shortly after depositing into a glass layer. This results in a preform tube that is subsequently collapsed into a solid rod, over jacketed, and then drawn into fiber.

The OVD process involves deposition of raw materials onto a rotating rod. This occurs in two steps: laydown and consolidation. During the laydown step, a soot preform is made from utlra-pure vapors of e.g., silicon tetrachloride (for silica fiber) and germanium tetrachloride. The vapors move through a traversing burner and react in the flame to form soot particles of silicon oxide and germanium oxide. These particles are deposited on the surface of the rotating target rod. When deposition is complete, the rod is removed, and the deposited material is placed in a consolidation furnace. Water vapor is removed, and the preform is collapsed to become a dense, transparent glass.

Another method for making a fiber preform is to simply insert a rod of one material into the core of a hollow preform. Heating consolidates the preform into a single object.

Fiber waveguides form the basis of numerous optical devices in addition to simply providing a channel for the transmission of optical information. For example, fiber waveguides can be design to compensate for effects that may be deleterious to an optical signal, e.g., dispersion. Dispersion is the property of a waveguide that causes optical signals of different wavelengths to travel at different speeds, which results in broadening of optical pulses. Typically, a long haul silica optical fiber has a positive dispersion of 2–50 ps/nm-km for wavelengths in the range of 1.5 µm. This positive dispersion can be compensated by directing the signal through a waveguide having negative dispersion equal in magnitude to the positive dispersion introduced by the silica optical fiber. Often, this is implemented by providing alternating sections of fiber having positive and negative dispersion in an optical telecommunications network.

Another example of an effect that may be deleterious to an optical signal is attenuation. Attenuation is simply the loss of intensity of an optical signal that occurs as a signal propagates through an optical fiber. When attenuation is sufficiently large, the optical signal becomes indistinguishable from the background noise. Accordingly, important components in communications networks are fiber amplifiers. As their name implies, fiber amplifiers are fiber waveguides that amplify the signal strength of an optical signal. The growth of dense wavelength-division multiplexing applications, for example, has made erbium-doped fiber amplifiers (EDFA's) an essential building block in modern telecommunication systems. EDFA's amplify an optical signal inside a fiber and therefore allow transmission of information over longer distances without the need for conventional repeaters. To form an EDFA, the fiber is doped with erbium, a rare earth element, that has appropriate energy levels in its atomic structure to amplify light at 1550 nm. A 980 nm pump laser is used to inject energy into the erbium-doped fiber. When a weak signal at 1550 nm enters the fiber, the light stimulates the erbium atoms to release their stored energy as additional 1550 nm light. This stimulated emission is coherent with the original signal, and hence the original signal grows stronger in intensity as it propagates down the fiber.

A fiber laser is another example of an optical component made using optical fibers. Typically, the cavity is defined in the radial direction by the index difference between a high index core and a lower index cladding which confines EM radiation through total internal reflection (TIR). The cavity may be defined in the axial direction by reflectors. The end reflectors in early fiber lasers were mirrors placed at, or evaporated onto, the ends of polished fibers. Refractive index modulations along the fiber axis can also be used to create a reflector and thus define a lasing cavity. For example, two Bragg gratings can surround a gain medium and define the end reflectors, thereby forming a distributed Bragg reflector (DBR) laser. Alternatively, the axial modulation can extend through out the length of the gain medium to form a "distributed feedback" (DFB) laser.

The composition of typical fiber waveguides often consists of a single material, having an appropriately doped cross-sectional profile to manipulate the fiber's optical properties. However, compositions including different materials may also be used. Accordingly, compositions including dissimilar materials, fiber waveguides derived from the dissimilar material compositions, and exemplary devices are disclosed.

SUMMARY

The invention features high index-contrast fiber waveguides that can be drawn from a preform. The invention also features materials for forming high index-contrast fiber waveguides, and guidelines for their selection. High index-contrast fiber waveguides, which may include optical fibers (i.e., fiber waveguides that utilize total internal reflection to confine light to a core) and photonic crystal fibers (e.g., Bragg fibers), can provide enhanced radial confinement of an optical signal in the fiber waveguide. The enhanced radial confinement can reduce radiative losses, thereby improving transmission efficiency. Moreover, large optical energy densities can be achieved inside the high index-contrast fiber waveguides, making them attractive candidates for a number of applications, e.g., nonlinear applications. Moreover, in addition to enhanced radial confinement, it is also possible to achieve enhanced axial confinement in the fiber waveguide. Using the enhanced axial confinement and enhanced radial confinement, one can form optical cavities having high Q values and/or small modal volumes in high index-contrast fiber waveguides. These cavities can form the basis of many optical devices, e.g., bi-stable devices.

We will now summarize different aspects, features, and advantages of the invention.

In general, in one aspect, the invention features a fiber waveguide having a waveguide axis. The fiber waveguide includes a first portion extending along the waveguide axis including a first material having an index of refraction, $n_1$, a working temperature, $T_w$, and a softening temperature, $T_s$. The fiber waveguide also includes a second portion extending along the waveguide axis comprising a second material having an index of refraction, $n_2$, and a viscosity, $\eta_2$, that varies as a function of temperature, T, and the absolute difference between $n_1$ and $n_2$ is at least 0.35 (e.g., at least 0.5, at least 0.6, at least 0.7, at least 0.8, at least 0.9, at least 1.0, at least 1.1, at least 1.2, at least 1.3, at least 1.4, at least 1.5, at least 1.6, at least 1.7, at least 1.8) and $\eta_2$ at $T_w$ is at least $10^3$ Poise (e.g., at least $10^4$ Poise) and no more than $10^6$ Poise (e.g., no more than $10^5$ Poise), and $\eta_2$ at $T_s$ is at least $10^5$ Poise (e.g., at least $10^6$ Poise, at least $10^7$ Poise, at least $10^8$ Poise, at least $10^9$ Poise, at least $10^{10}$ Poise, at least $10^{11}$ Poise) and no more than $10^{13}$ Poise (e.g., no more than $10^{12}$ Poise, no more than $10^{11}$ Poise, no more than $10^{10}$ Poise, no more than $10^9$ Poise, no more than $10^8$ Poise).

Embodiments of the fiber waveguides can include on or more of the following features, and/or any of the features mentioned with respect to any other aspect of the invention.

The first and/or second materials can be dielectric materials, such as glasses. The first material can include a chalcogenide glass, and the second material can include an oxide glass and/or a halide glass.

The first and second portions can be homogeneous portions or inhomogeneous portions. Inhomogeneous portions can include at least one hollow region extending along the waveguide axis.

The first and/or second materials can be inorganic materials, such as polymers.

The first portion can be a core and $n_1 > n_2$, and the second portion can include a cladding layer.

The fiber waveguide can be a photonic crystal fiber, such as a Bragg fiber.

In some embodiments, the first portion can have a glass transition temperature, $T_g$, and $\eta_2$ at $T_g$ is at least $10^8$ Poise (e.g., at least $10^9$ Poise, at least $10^{10}$ Poise, at least $10^{11}$ Poise, at least $10^{12}$ Poise, at least $10^{13}$ Poise).

The first material can have a first thermal expansion coefficient, $TEC_1$, and the second material has a second thermal expansion coefficient, $TEC_2$, and between 20° C. and 380° C. $|TEC_1 - TEC_2| \leq 5 \times 10^{-6}/°$ (e.g., $|TEC_1 - TEC_2| \leq 4 \times 10^{-6}/°$, $|TEC_1 - TEC_2| \leq 3 \times 10^{-6}/°$, $|TEC_1 - TEC_2| \leq 2 \times 10^{-6}/°$, $|TEC_1 - TEC_2| \leq 1 \times 10^{-6}/°$).

The residual stress between the first portion and second portion at 20° C. can be less than 100 MPa (e.g., less than 80 MPa, less than 50 MPa, less than 40 MPa, less than 30 MPa, less than 20 MPa).

The fiber waveguide can include a confinement region, and the confinement region can include the first and second portions. The first portion can include a first layer extending along the waveguide axis and the second portion can include a second layer extending along the waveguide axis and surrounding the first layer.

The fiber waveguide can include an optical modulation extending along the waveguide axis. The optical modulation can include a structural modulation and/or a refractive index modulation.

In a second aspect, the invention features a method for making a fiber waveguide having a waveguide axis. The method includes providing a fiber preform including a first portion and a second portion surrounding the first portion. The first portion includes a first material having a refractive index $n_1$ and the second portion includes a second material having a refractive index $n_2$, and $|n_1-n_2| \geq 0.3$ (e.g., $|n_1-n_2| \geq 0.$, $|n_1-n_2| \geq 0.$). The method further includes heating the fiber preform to a temperature where the first and second portions have a viscosity between $10^3$ Poise and $10^6$ Poise, and drawing the heated fiber preform into the fiber waveguide.

Embodiments of the method can include any of the features mentioned with respect to other aspects of the invention, and/or one or more of the following features.

The fiber perform can be heated so that the first and second portions have a viscosity between $10^3$ Poise and $10^5$ Poise, such as about $10^4$ Poise.

The first portion can include a preform core. The second portion can include a preform cladding.

The fiber preform can include a preform confinement region, and the first and second portions can be included in the fiber preform.

The first material can include a first glass (e.g., a chalcogenide glass) and the second material can include a second glass different from the first glass (e.g., an oxide glass or a halide glass).

The method can further include perturbing the fiber waveguide while drawing to form an optical modulation extending along the waveguide axis of the fiber waveguide.

The relative cross sectional structure of the fiber preform can be preserved during the drawing.

In a further aspect, the invention features a fiber waveguide having a waveguide axis including a first portion extending along the waveguide axis. The fiber waveguide also includes a second portion different from the first portion extending along the waveguide axis surrounding the first portion, and at least one of the first and second portions includes a chalcogenide glass selected from the group consisting of Selenium chalcogenide glasses and Tellurium chalcogenide glasses.

Embodiments of the fiber waveguide can include any of the features mentioned with respect to other aspects of the invention and/or one or more of the following features.

The chalcogenide glass can be any of the following glasses: As—Se, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—Se—Tl, As—Te—Tl, As—Se—Ga, and Ge—Sb—Se. The chalcogenide glass can be $As_{12}Ge_{33}Se_{55}$.

The chalcogenide glass can include any of the following elements: boron, aluminum, silicon, phosphorus, sulfur, gallium, arsenic, indium, tin, antimony, thallium, lead, bismuth, cadmium, lanthanum, fluorine, chlorine, bromine, and iodine.

Either or both of the first and second portions can include a nonlinear material (e.g., an electrooptic material and/or a photorefractive material). Either or both portions can be doped with one or more rare earth ions (e.g. erbium ions).

The second portion can include a dielectric material, such as an organic or inorganic dielectric material. The inorganic material can be an inorganic glass (e.g., an oxide, halide glass or mixed oxide-fluoride glass). In cases where the inorganic material is an oxide glass, the oxide glass can include up to 40 mole % (e.g., up to 30%, up to 20%, up to 10%, up to 5%) of a compound of the form MO, where M can be Pb, Ca, Mg, Sr, and Ba. The oxide glass can include up to 40 mole % (e.g., up to 30%, up to 20%, up to 10%, up to 5%) of a compound of the form $M_2O$, where M can be Li, Na, K, Rb, and Cs. The oxide glass can include up to 40 mole % (e.g., up to 30%, up to 20%, up to 10%, up to 5%) of a compound of the form $M_2O_3$, where M can be Al, B, and Bi. The oxide glass can also include up to 60 mole % (e.g., up to 50%, up to 40%, up to 30%, up to 20%, up to 10%, up to 5%) of $P_2O_5$. The oxide glass can further include up to 40 mole % (e.g., up to 30%, up to 20%, up to 10%, up to 5%) of $SiO_2$.

In embodiments where the dielectric material is an organic material, the organic material can be a polymer (e.g., carbonate-, sulfone-, etherimid-, and/or acrylate-family polymer, and/or fluoropolymers).

The first portion can be a core having a refractive index $n_1$ and the second portion has a refractive index $n_2 < n_1$.

The fiber waveguide can be a photonic crystal fiber, such as a Bragg fiber or holey photonic crystal fiber.

In another aspect, the invention features a fiber waveguide having a waveguide axis, including a core extending along the waveguide axis, and a confinement region extending along the waveguide axis surrounding the core, the confinement region including a chalcogenide glass. The confinement region further a photonic crystal structure having a photonic band gap, wherein during operation the confinement region guides EM radiation in at least a first range of frequencies to propagate along the waveguide axis.

Embodiments of the fiber waveguide can include any of the features mentioned with respect to other aspects of the invention, and/or one or more of the following features.

The confinement region can include a first portion having a refractive index $n_1$ and a second portion having a refractive index $n_2$, and $|n_1-n_2| \geq 0.$ (e.g., $|n_1-n_2| \geq 0.$, $|n_1-n_2| \geq 0.$, $|n_1-n_2| \geq 0.$, $|n_1-n_2| \geq 0.$, $|n_1-n_2| \geq 0.$, $|n_1-n_2| \geq 0.$).

The core can be a hollow core. The core can include a dielectric material, such as the dielectric materials listed above.

The confinement region can include a plurality of layers. These layers can include alternating layers including the chalcogenide glass, such as a chalcogenide glass listed above. A subset of the plurality of layers can be devoid of the chalcogenide glass. The subset of layers can be alternating layers.

In a further aspect, the invention features a method for making an fiber waveguide, including providing a fiber preform including a first portion and a second portion surrounding the first portion, wherein the first portion includes a chalcogenide glass. The method also includes heating the fiber preform so that the first and second portions have a viscosity between $10^3$ Poise and $10^6$ Poise, and drawing the heated fiber preform to make the fiber waveguide.

Embodiments of the method can include any of the features mentioned with respect to other aspects of the invention.

In general, in another aspect, the invention features a fiber waveguide having a waveguide axis, including a core extending along the waveguide axis including a first dielectric material having a refractive index $n_1$, and a cladding extending along the waveguide axis and surrounding the core, the cladding including a second dielectric material having a refractive index $n_2 < n_1$. Also, the fiber waveguide has a numerical aperture greater than 0.7 (e.g., greater than 0.8, greater than 0.9, greater than 1.0, greater than 1.1, greater than 1.2, greater than 1.3, greater than 1.4, greater than 1.5).

Embodiments of the fiber waveguide can include any of the features mentioned with respect to other aspects of the invention, and/or any of the features listed below.

The refractive index of the first dielectric material can be more than 1.8, (e.g., more than 1.9, more than 2.0, more than 2.1, more than 2.2, more than 2.3, more than 2.4, such as about 2.5).

The core can include an optical modulation extending along the waveguide axis (e.g., a refractive index modulation and/or a structural modulation). The optical modulation can cause the optical fiber to have a transmission bandgap of at least 0.1% (e.g., at least 1%, at least 2%, at least 3%, at least 4%, at least 5%, such as 6% or more).

For at least one wavelength the fiber can have a mode field diameter less than 3 microns (e.g., less than 2 microns, less than 1 micron, less than 0.5 microns, less than 0.25 microns).

The refractive index of the second dielectric material can be less than 1.9 (e.g., less than 1.8, less than 1.7, less than 1.6, less than 1.5, such as about 1.4).

The fiber waveguide can further include a dispersion tailoring region extending along the waveguide axis, can during operation the core can support at least one mode in a range of frequencies and the dispersion tailoring region introduces one or more additional modes in the first range of frequencies that interact with the guided mode to produce a working mode. The cladding can surround the dispersion tailoring region.

The core can have a diameter less than 3 microns (e.g., less than 2 microns, less than 1 micron, less than 0.5 microns, less than 0.25 microns).

In a further aspect, the invention features a fiber waveguide having a waveguide axis, including a first portion extending along the waveguide axis including a first material having a refractive index $n_1$ and a melting temperature, $T_m$. The fiber waveguide also includes a second portion extending along the waveguide axis that surrounds the first portion and includes a second material that has a refractive index $n_2$ and a working temperature, $T_w$, and $|n_1-n_2| \geq 0.3$ and $T_m > T_w$.

Embodiments of the fiber waveguide can include any of the features mentioned with respect to other aspects of the invention.

In another aspect, the invention features an optical fiber having a waveguide axis, including a core extending along the waveguide axis comprising a first dielectric material having a refractive index $n_1$, and a cladding extending along the waveguide axis and surrounding the core. The cladding can include a second dielectric material having a refractive index $n_2$, and $n_1-n_2 \geq 0$. (e.g., $n_1-n_2 \geq 0.$, $n_1-n_2 \geq 0.$, $n_1-n_2 \geq 0.$, $n_1-n_2 \geq 0.$, $n_1-n_2 \geq 1$, $n_1-n_2 \geq 1.$, $n_1-n_2 \geq 1.$)

Embodiments of the optical fiber can include any of the features mentioned with respect to other aspects of the invention.

In a further aspect, the invention features a method, including providing a fiber waveguide having a waveguide axis that includes a first portion extending along the waveguide axis having a refractive index $n_1$, and a second portion extending along the waveguide axis having a refractive index $n_2$, in which $|n_1-n_2| \geq 0.3$. The method also includes directing an input signal into the fiber waveguide with an input signal power sufficient to cause the fiber waveguide to produce an output signal whose output signal power varies nonlinearly with respect to the input signal power.

Embodiments of the method can include any of the features mentioned with respect to other aspects of the invention.

In general, in another aspect, the invention features a method for making a photonic crystal fiber having an axial optical modulation along a waveguide axis. The method includes heating a photonic crystal fiber preform to a draw temperature, drawing the photonic crystal fiber from the preform, and perturbing the photonic crystal fiber preform during the drawing to produce an axial optical modulation in the photonic crystal fiber along the waveguide axis.

Embodiments of the method can include one or more of the features mentioned with respect to other aspects of the invention, and/or any of the following features.

The photonic crystal fiber can include a first layer extending along the waveguide axis having a first refractive index, $n_1$ and a second layer extending along the waveguide axis adjacent the first layer having a second refractive index, $n_2$, and $|n_1-n_2| \geq 0$. (e.g., $|n_1-n_2| \geq 0.$, $|n_1-n_2| \geq 0.$, $|n_1-n_2| \geq 0.$, $|n_1-n_2| \geq 0.$).

The photonic crystal fiber can have a hollow core.

The diameter of the photonic crystal fiber can be related to a drawing velocity and perturbing the fiber can include varying the fiber diameter by varying the drawing velocity.

Perturbing the photonic crystal fiber can include varying the drawing temperature along the waveguide axis to vary the photonic crystal fiber diameter. The photonic crystal fiber can be illuminated with radiation (e.g., laser radiation) during drawing to vary the drawing temperature along the waveguide axis.

The photonic crystal fiber can be a hollow fiber, and perturbing the fiber can include varying the pressure inside the hollow fiber. Alternatively, or additionally, perturbing the fiber can include varying the pressure outside the photonic crystal fiber.

The axial optical modulation can be a periodic or a periodic modulation. The axial optical modulation can form a fiber Bragg grating in the photonic crystal fiber.

The axial optical modulation can form an optical cavity in the photonic crystal fiber.

In a further aspect, the invention features a method for forming an axial optical modulation along a waveguide axis of a fiber waveguide. The method includes providing a fiber waveguide having a hollow core, introducing a core medium into the hollow core; and exposing the fiber waveguide to an agent that causes the core medium to form an axial optical modulation along the waveguide axis of the fiber waveguide.

Embodiments of the method can include one or more of the features mentioned with respect to other aspects of the invention, and/or any of the following features.

The core medium can include a plurality of similarly-shaped objects (e.g., spherical objects). The similarly-shaped objects can be polymeric objects. At least a portion of the similarly-shaped objects can be positioned adjacent one another in the hollow core. Exposing the fiber waveguide to an agent can include heating the fiber to cause the fiber waveguide to conform to the plurality of similarly-shaped objects in the hollow core.

The method can include removing at least a portion of the core medium after exposing the waveguide fiber to the agent. Removing the core medium can include providing a removal agent (e.g., an etchant or solvent) in the core that removes the portion of the core medium.

The core medium can be a photosensitive medium (e.g., a photoresist, or material whose refractive index changes on exposure to radiation).

Exposing the core medium to an agent can include illuminating portions of the core medium to radiation (e.g., electromagnetic radiation or electron beam radiation). The radiation can include an interference pattern. The radiation can cause an optical property (e.g., the refractive index of the core medium, or the structure of the core medium) of the exposed portions of the core medium to be different from the optical properties of portions not exposed to radiation.

The core medium can be a block co-polymer.

In another aspect, the invention features a fiber waveguide having a waveguide axis, including a first portion extending along the waveguide axis having a refractive index $n_1$, and a second portion extending along the waveguide axis having a refractive index $n_2$, and $|n_1-n_2| \geq 0.3$. Also, the fiber waveguide has an axial optical modulation extending along the waveguide axis.

Embodiments of the fiber waveguide can include one or more of the features mentioned with respect to other aspects of the invention, and/or any of the following features.

The axial optical modulation can have an amplitude of at least 0.1% (e.g., at least 0.5%, at least 1%, at least 2%, at least 3%, at least 4%, at least 5%, at least 6%, at least 7%, such as 8% or more).

The axial optical modulation can include a structural modulation, such as a modulation in the fiber waveguide diameter. The axial optical modulation can be a modulation in the fiber waveguide refractive index.

The axial optical modulation can form a Bragg reflector in the fiber waveguide. The axial optical modulation forms an optical cavity in the fiber waveguide. The optical cavity has a resonant wavelength, $\lambda$, and a modal volume less than or equal to 500 $\lambda^3$ (e.g., less than or equal to 200 $\lambda^3$, less than or equal to 100 $\lambda^3$, less than or equal to 50 $\lambda^3$, less than or equal to 20 $\lambda^3$, less than or equal to 10 $\lambda^3$, less than or equal to 5 $\lambda^3$, less than or equal to 2 $\lambda^3$, less than or equal to 1 $\lambda^3$).

The second portion can surround the first portion and the first portion can include a nonlinear material.

In another aspect, the invention features an optical fiber having a waveguide axis, including a core extending along the waveguide axis having a refractive index, $n_1$, and a cladding extending along the waveguide axis and surrounding the core, the cladding having a refractive index $n_2 < n_1$; and an axial optical modulation extending along the waveguide axis forming an optical cavity having a resonant wavelength $\lambda$, and a modal volume of less than or equal to 100 $\lambda^3$ (e.g., less than 50 $\lambda^3$, less than 20 $\lambda^3$, less than 10 $\lambda^3$, less than 5 $\lambda^3$, less than 2 $\lambda^3$, less than 1 $\lambda^3$.)

Embodiments of the optical fiber can include one or more of the features mentioned with respect to other aspects of the invention, and/or any of the following features.

The axial optical modulation can have an amplitude of at least 1% (e.g., at least 2%, at least 3%, at least 4%, at least 5%).

In another aspect, the invention features a fiber waveguide device, including a fiber waveguide having a waveguide axis, and the fiber waveguide includes a first portion extending along the waveguide axis having a refractive index $n_1$, and a second portion extending along the waveguide axis having a refractive index $n_2$, and $|n_1-n_2| \geq 0.3$. The fiber waveguide device also includes an axial optical modulation forming an optical cavity in the fiber waveguide and during operation an input signal propagating in the fiber waveguide having a power between a first power value, $P_1$, and a second power value, $P_2$, causes the fiber waveguide to produce an output signal whose output signal power varies nonlinearly with respect to the input signal power.

Embodiments of the fiber waveguide device can include one or more of the features mentioned with respect to other aspects of the invention, and/or any of the following features.

An input signal power between $P_1$ and $P_2$ can cause the fiber waveguide to produce an output signal whose output signal power varies discontinuously with respect to the input signal power.

An input signal power below $P_1$ can cause the fiber waveguide to produce an output signal whose output signal power is below an output power value $P_{out,1}$, and an input signal power above $P_2$ can cause the fiber waveguide to produce an output signal whose output signal power is above an output power value $P_{out,2}$, where $P_{out,2}/P_{out,1}$ is at least 2 (e.g., at least 5, at least 10, at least 100). The ratio $P_1/P_2$ can be greater than 0.5 (e.g., greater than 0.75, greater than 0.9, greater than 0.95, greater than 0.99).

The optical cavity has a quality factor Q and $P_1$ can be less than or equal to $10^8$ W/Q$^2$ (e.g., less than or equal to $10^7$ W/Q$^2$, $10^6$ W/Q$^2$, $10^5$ W/Q$^2$, $10^4$ W/Q$^2$, $10^3$ W/Q$^2$).

The axial optical modulation can form more than one optical cavity (e.g., two optical cavities, three optical cavities, four optical cavities, or five or more optical cavities).

In a further aspect, the invention features a photonic crystal fiber having a waveguide axis, including a core region extending along the waveguide axis, a confinement region extending along the waveguide axis and surrounding the core and including a chalcogenide glass, and an axial optical modulation extending along waveguide axis forming an optical cavity in the photonic crystal fiber.

Embodiments of the photonic crystal fiber can include one or more of the features mentioned with respect to other aspects of the invention, and/or any of the following features.

The photonic crystal fiber can be a one-dimensionally periodic photonic crystal fiber (e.g., a Bragg fiber). The photonic crystal fiber can be a two-dimensionally periodic photonic crystal fiber, e.g., having an inhomogeneous confinement region, such as a holey region.

The axial optical modulation can have an amplitude of at least 0.01%.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Additional features, objects, and advantages of the invention will be apparent from the following detailed description and drawings, and from the claims.

DESCRIPTION OF DRAWINGS

The invention will now be further described merely by way of example with reference to the accompanying drawings in which:

FIG. 15 is a plot showing 1000/Temperature vs. log viscosity for a lead-bismuth glass and two borates/phosphate glasses;

Like reference symbols in the various drawings indicate like elements.

DETAILED DESCRIPTION

The invention relates to fiber waveguides having portions including different optical materials that can be co-drawn. The portions are the structural elements of the fiber waveguide that determine the optical properties of the waveguide (e.g., the structural elements that determine how the waveguide confines an optical signal to a path). One such fiber waveguide is a conventional optical fiber (hereinafter referred to as "optical fiber") in which the portions include a core and a cladding surrounding the core. The core and cladding cause optical energy within a certain subset of frequencies to propagate along a waveguide axis while confined to the core. Another example of a fiber waveguide is a photonic crystal fiber, which includes a core and a confinement region. The confinement region has a refractive index variation that forms a bandgap and reflects light within a certain range of frequencies, confining that light to the core. One type of photonic crystal fiber is a Bragg fiber, in which the confinement region can include multiple layers of different composition that give rise to the index variation. In such cases, each of the layers is considered to be a portion of the waveguide.

Figure 1:
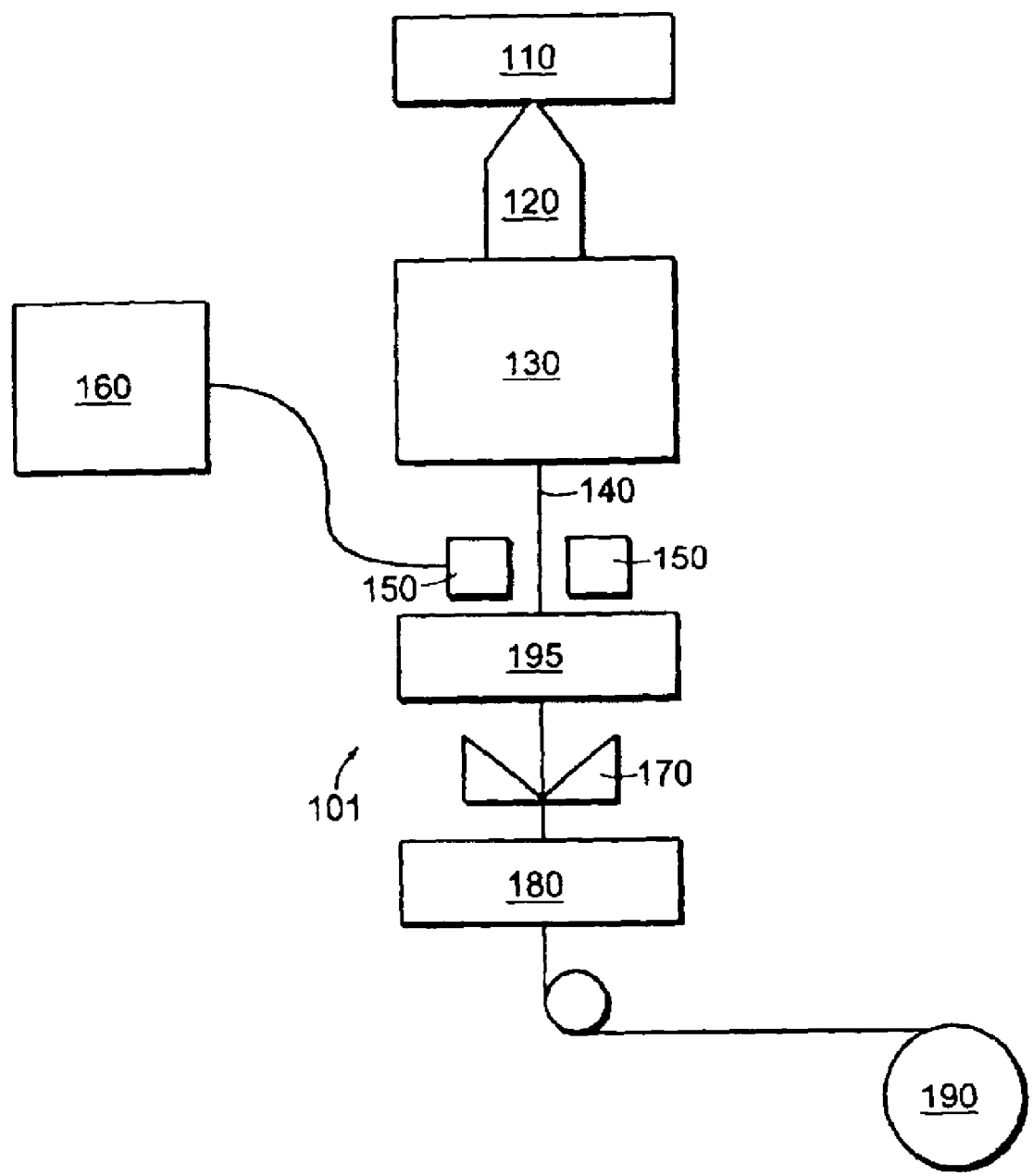
FIG. 1 is a schematic of an embodiment of a high index-contrast fiber waveguide drawing system.

Fiber waveguides having portions including different optical materials that can be co-drawn can be made from a fiber waveguide preform using a fiber waveguide drawing system. Referring to FIG. 1, a fiber waveguide drawing system 101 includes a preform holder 110, which positions a preform 120 relative a furnace 130. Furnace 130 heats preform 120 to a temperature sufficiently high so that preform 120 can be drawn into a fiber waveguide 140. Fiber waveguide 140 includes different portions extending along a waveguide axis, e.g., a core, a cladding layer, and/or a region within a core or cladding layer. A fiber monitoring system 150 measures various fiber characteristics (e.g., fiber diameter). Fiber monitoring system 150 is in communication with a controller 160. Controller 160 controls drawing parameters (e.g., furnace temperature and drawing speed) based on fiber data received from fiber monitoring system 150. A coating applicator 170 applies a protective coated (e.g., a plastic coating) onto fiber waveguide 140. A bank of UV lamps 180 cures the protective coating with actinic radiation. The coated fiber waveguide is wound onto take-up spool 190, providing a compact spool of continuous fiber for use. Optionally, fiber waveguide drawing system 101 includes an annealing furnace 195, which reheats fiber 140 to relax any stress developed as fiber 140 cools.

When drawing a fiber waveguide, the radial dimensions of the fiber waveguide are inversely proportional to the square root of the drawing speed (see, e.g., *Optical Fiber Telecommunications*, Academic Press, p.182 (1988)). The more quickly the fiber waveguide is pulled, the smaller the fiber waveguide diameter. Moreover, the ratios of dimensions of various portions within the fiber waveguide are preserved during pulling speed changes. For example, a perform with a cladding to core radius ratio of 1:1, will produce a fiber with a cladding to core radius ratio of 1:1, assuming a uniform temperature distribution across the fiber, and uniform viscosity of the glassy sections, regardless of actual dimensions of the finished fiber. In other words, varying the pulling speed changes the final dimensions of the finished fiber waveguide, but not of the relative dimensions of one portion relative to another within a give cross section. Hence, fiber waveguide drawing preserves the cross-sectional structure of complex preforms in the finished fiber, making drawing a suitable manufacturing method for complex fiber waveguides. For example, in "Single-mode photonic band gap guidance of light in air," *Science*, 285, 5433, P. 1537–1539 (September 1999), Russell et al. describe photonic crystal fibers having radial cross sections similar to a "honeycomb", which are formed by drawing.

In preferred embodiments, the invention relates to fiber waveguides in which different portions of the waveguide have very different refractive indices. As will be described in the forthcoming paragraphs, a large difference between the refractive index of different portions of a fiber waveguide can enhance radial confinement of electromagnetic modes in the waveguide. Enhanced radial confinement of guided modes can decrease the amount of electromagnetic energy in the cladding, thereby decreasing transmission loss associated with the cladding. Moreover, enhanced radial confinement of guided modes can enhance nonlinear effects in the fiber waveguide.

By "very different refractive indices," we mean that the absolute difference between the refractive indices of a first and second portion of a fiber waveguide is at least 0.35 (e.g., at least 0.4, at least 0.45, at least 0.5, at least 0.55, at least 0.6, at least 0.7, at least 0.8, at least 0.9, at least 1.0, at least 1.1, at least 1.2). For example, a high index portion of a fiber waveguide extending along a waveguide axis includes a high index material (e.g., dielectric material) that has a refractive index, $n_1$, where $n_1$ is more than about 1.80 (e.g., more than 1.85, more than 1.9, more than 1.95, more than 2.0, more than 2.1, more than 2.2, more than 2.3, more than 2.4, more than 2.5 such as about 2.8). The fiber waveguide also has a low index portion extending along a waveguide axis. The low index portion includes a low index material (e.g., dielectric material) that has a refractive index, $n_2$, where $n_2$ is less than about 2.2 (such as less than 2.0, less than about 1.9, less than about 1.85, less than about 1.8, less than about 1.75, less than 1.7, less than 1.65, less than 1.6, less than 1.55, less than 1.5, less than 1.45, such as 1.4).

An alternative way of expressing the difference in refractive index between different portions of a fiber waveguide is "index-contrast." Index contrast is defined as $$\frac{n_1}{1}$$

where $n_1 > n_2$. In general, the invention relates to fiber waveguides having a high-index contrast, e.g., an index contrast of at least 0.1, such as 0.5 or greater. Index-contrast can also be expressed as a percentage.

Note that as used herein, the refractive index of a material refers to the refractive index of a material at the wavelength at which the waveguide is designed to guide light. Typically, for optical waveguides this wavelength is between about 0.3 μm and 15 μm. Wavelength ranges of particular interest are those ranges important to telecommunications applications, e.g., 0.7–0.9 μm and 1.1–1.7 μm. These wavelength ranges correspond to wavelengths at which commonly used materials (e.g., silica) have relatively small absorption coefficients, which results in relatively low-loss components.

We will now describe specific materials that may be appropriate for high index portions and low index portions of high index-contrast fiber waveguides.

Materials with a suitably high index of refraction to form a high index portion include chalcogenide glasses (e.g., glasses containing a chalcogen element, such as sulphur, selenium, and/or tellurium), heavy metal oxide glasses, amorphous alloys, and combinations thereof.

In addition to a chalcogen element, chalcogenide glasses may include one or more of the following elements: boron, aluminum, silicon, phosphorus, sulfur, gallium, arsenic, indium, tin, antimony, thallium, lead, bismuth, cadmium, lanthanum and the halides (fluorine, chlorine, bromide, iodine).

Chalcogenide glasses, can be binary or ternary glass systems, e.g., As—S, As—Se, Ge—S, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—S—Tl, As—Se—Tl, As—Te—Tl, As—Se—Ga, Ga—La—S, Ge—Sb—Se or complex, multi-component glasses based on these elements such as As—Ga—Ge—S, Pb—Ga—Ge—S, etc. The ratio of each element in a chalcogenide glass can be varied. For example, a chalcogenide glass with a suitably high refractive index may be formed with 5–30 mole % Arsenic, 20–40 mole % Germanium, and 30–60 mole % Selenium.

Examples of heavy metal oxide glasses with high refractive indices include $Bi_2O_3$—, PbO—, $Tl_2O_3$—, $Ta_2O_3$—, $TiO_2$—, and $TeO_2$— containing glasses.

Amorphous alloys with suitably high indices of refraction include Al—Te, R—Te(Se) (R=alkali).

Materials with suitably low index of refraction to form a low-index portion include oxide glasses, halide glasses, polymers, and combinations thereof. Suitable oxide glasses may include glasses that contain one or more of the following compounds: 0–40 mole % of $M_2O$ where M is Li, Na, K, Rb, or Cs; 0–40 mole % of M'O where M' is Mg, Ca, Sr, Ba, Zn, or Pb; 0–40 mole % of $M''_2O_3$ where M" is B, Al, Ga, In, Sn, or Bi; 0–60 mole % $P_2O_5$; and 0–40 mole % $SiO_2$.

Many halide glasses can satisfy the low index requirement; fluoride glasses and mixed oxide-fluoride glasses e.g. phosphate-fluoride are especially appropriate as matching materials.

Polymers including those in the carbonate-, sulfone-, etherimid-, and acrylate-families as well as fluoropolymers are good matching candidates too.

Portions of high-index contrast fiber waveguides can optionally include other materials. For example, any portion can include one or more materials that change the index of refraction of the portion. A portion can include a material that increases the refractive index of the portion. Such materials include, for example, germanium oxide, which can increase the refractive index of a portion containing a borosilicate glass. Alternatively, a portion can include a material that decreases the refractive index of the portion. For example, boron oxide can decrease the refractive index of a portion containing a borosilicate glass.

Portions of high index-contrast fiber waveguides can be homogeneous or inhomogeneous. For example, one or more portions can include nano-particles (e.g., particles sufficiently small to minimally scatter light at guided wavelengths) of one material embedded in a host material to form an inhomogeneous portion. An example of this is a high-index polymer composite formed by embedding a high-index chalcogenide glass nano-particles in a polymer host. Further examples include CdSe and or PbSe nano-particles in an inorganic glass matrix. Other examples of inhomogeneous fiber portions include so-called "holey" portions. A holey portion includes one or more hollow regions, or holes, extending along the waveguide axis. Hollow regions can be filled with a fluid (e.g., a gas or liquid). An air-filled hollow region, for example, can lower the refractive index of the portion because the refractive index of air, $n_{air} \cong 1$. In some embodiments, a fiber waveguide can include holey portions and non-holey portions of the same material. For example, a fiber waveguide can include a cladding layer having a portion of solid glass and a portion of glass with hollow regions. Due to the low-index hollow regions, the refractive index of the portion with hollow regions is lower than the solid portion.

Portions of high index-contrast fiber waveguides can include materials that alter the mechanical, rheological and/or thermodynamic behavior of those portions of the fiber. For example, one or more of the portions can include a plasticizer. Portions may include materials that suppress crystallization, or other undesirable phase behavior within the fiber. For example, crystallization in polymers may be suppressed by including a cross-linking agent (e.g., a photosensitive cross-linking agent). In other examples, if a glass-ceramic material was desired, a nucleating agent, such as $TiO_2$ or $ZrO_2$, can be included in the material.

Portions can also include compounds designed to affect the interface between adjacent portions in the fiber. Such compounds include adhesion promoters and compatibilizers. For example, an organo-silane compound can be used to promote adhesion between a silica-based glass portion and a polymer portion. For example, phosphorus or $P_2O_5$ is compatible with both chalcogenide and oxide glasses, and may promote adhesion between portions formed from these glasses.

High index contrast fiber waveguides can include additional materials specific to particular fiber waveguide applications. In fiber amplifiers, for example, any of the portions can be formed of any dopant or combination of dopants capable of interacting with an optical signal in the fiber to enhance absorption or emission of one or more wavelengths of light by the fiber, e.g., at least one rare earth ion, such as erbium ions, ytterbium ions neodymium ions, holmium ions, dysprosium ions, and/or thulium ions.

Portions of high index-contrast waveguides can include one or more nonlinear materials. Nonlinear materials are materials that enhance the nonlinear response of the waveguide. In particular, nonlinear materials have a larger nonlinear response than silica. For example, nonlinear materials have a Kerr nonlinear index, $n^{(2)}$, larger than the Kerr nonlinear index of silica (i.e., greater than $3.5 \times 10^{-20}$ m$^2$/W, such as greater than $5 \times 10^{-20}$ m$^2$/W, greater than $10 \times 10^{-20}$ m$^2$/W, greater than $20 \times 10^{-20}$ m$^2$/W, greater than $100 \times 10^{-20}$ m$^2$/W, greater than $200 \times 10^{-20}$ m$^2$/W).

When making a robust high index-contrast fiber waveguide using a drawing process, not every pair of materials having sufficiently different refractive indices is necessarily suitable. Typically, one should select materials that are Theologically, thermo-mechanically, and physico-chemically compatible. Several criteria for judiciously selecting compatible materials will now be discussed.

A first criterion is to select materials that are Theologically compatible. In other words, to select materials that have similar viscosities over a broad temperature range, corresponding to the temperatures experience during the different stages of fiber drawing and operation. Viscosity is the resistance of a fluid to flow under an applied shear stress. Here, we quote viscosities in units of Poise. Before elaborating on rheological compatibility, we define a set of characteristic temperatures for a given material, which are temperatures at which the given material has a specific viscosity.

The annealing point, $T_a$, is the temperature at which a material has a viscosity $10^{13}$ Poise. $T_a$ can be measured using a Model SP-2A System from Orton Ceramic Foundation (Westerville, Ohio). Typically, $T_a$ is the temperature at which the viscosity of a piece of glass is low enough to allow for relief of residual stresses.

The softening point, $T_s$, is the temperature at which a material has a viscosity $10^{7.65}$ Poise. $T_s$ can be measured using a softening point instrument, e.g., Model SP-3A from Orton Ceramic Foundation (Westerville, Ohio). The softening point is related to the temperature at which the materials flow changes from plastic to viscous in nature.

The working point, $T_w$, is the temperature at which a material has a viscosity $10^4$ Poise. $T_w$ can be measured using a glass viscometer, e.g., Model SP-4A from Orton Ceramic Foundation (Westerville, Ohio). The working point is related to the temperature at which a glass can be easily drawn into a fiber. In some embodiments, for example, where the material is an inorganic glass, the material's working point temperature can be greater than 250° C., such as about 300° C., 400° C., 500° C. or more.

The melting point, Tm, is the temperature at which a material has a viscosity $10^2$ Poise. $T_m$ can also be measured using a glass viscometer, e.g., Model SP-4A from Orton Ceramic Foundation (Westerville, Ohio). The melting point is related to the temperature at which a glass becomes a liquid and control of the fiber drawing process with respect to geometrical maintenance of the fiber becomes very difficult.

To be rheologically compatible, two materials should have similar viscosities over a broad temperature range, e.g., from the temperature at which the fiber is drawn down to the temperature at which the fiber can no longer release stress at a discernible rates (e.g., at $T_a$) or lower. Accordingly, the working temperature of two compatible materials should be similar, so that the two materials flow at similar rates when drawn. For example, if one measures the viscosity of the first material, $\eta_1(T)$ at the working temperature of the second material, $T_{w2}$, $\eta_1(T_{w2})$ should be at least $10^3$ Poise, e.g., $10^4$ Poise or $10^5$ Poise, and no more than $10^6$ Poise. Moreover, as the drawn fiber cools the behavior of both materials should change from viscous to elastic at similar temperatures. In other words, the softening temperature of the two materials should be similar. For example, at the softening temperature of the second material, $T_{s2}$, the viscosity of the first material, $\eta_1(T_{s2})$ should be at least $10^6$ Poise, e.g., $10^7$ Poise or $10^8$ Poise and no more than $10^9$ Poise. In preferred embodiments, it should be possible to anneal both materials together, so at the annealing temperature of the second material, $T_{a2}$, the viscosity of the first material, $\eta_1(T_{a2})$ should be at least $10^8$ Poise (e.g., at least $10^9$ Poise, at least $10^{10}$ Poise, at least $10^{11}$ Poise, at least $10^{12}$ Poise, at least $10^{13}$ Poise, at least $10^{14}$ Poise).

Additionally, to be rheologically compatible, the change in viscosity as a function of temperature (i.e., the viscosity slope) for both materials should preferably match as close as possible. In other words, when the materials are glasses, a short glass should be paired with another short glass (where a short glass is a glass with steep slope of viscosity as a function of temperature; opposite to a long glass). For example, for a high index $Bi_2O_3$-based glass, a short borosilicate glass would be a better match than a long phosphate glass with similar drawing temperatures since $Bi_2O_3$ forms short glasses.

A second selection criterion is the thermal expansion coefficients (TEC) of each material should be similar at temperatures between the annealing temperatures and room temperature. In other words, as the fiber cools and its rheology changes from liquid-like to solid-like, both materials' volume should change by similar amounts. If the two materials TEC's are not sufficiently matched, a large differential volume change between two fiber portions can result in a large amount of residual stress buildup, which can cause one or more portions to crack and/or delaminate. Residual stress may also cause delayed fracture even at stresses well below the material's fracture stress.

Figure 2:
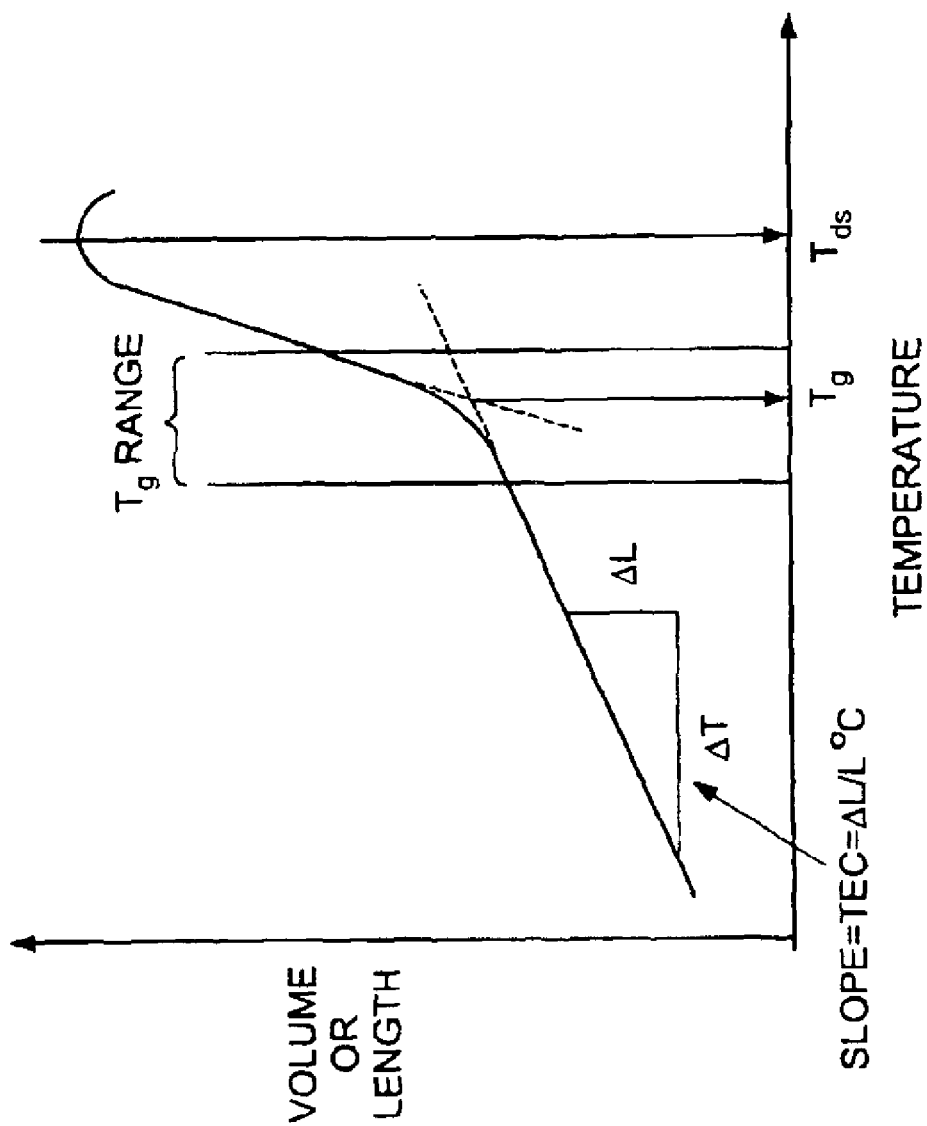
FIG. 2 is a temperature vs. volume (or length) plot for a glass showing $T_g$ and $T_{ds}$.

The TEC is a measure of the fractional change in sample length with a change in temperature. Referring to FIG. 2, this parameter can be calculated for a given material from the slope of a temperature-length (or equivalently, temperature-volume) curve. The temperature-length curve of a material can be measured using e.g., a dilatometer, such as a Model 1200D dilatometer from Orton Ceramic Foundation (Westerville, Ohio). The TEC can be measured either over a chosen temperature range or as the instantaneous change at a given temperature. This quantity has the units $°C.^{-1}$. Note that there are two linear regions in the temperature-length curve that have different slopes. There is a transition region where the curve changes from the first to the second linear region. This region is associated with a glass transition, where the behavior of a glass sample transitions from that normally associated with a solid material to that normally associated with a viscous fluid. This is a continuous transition and is characterized by a gradual change in the slope of the temperature-volume curve as opposed to a discontinuous change in slope. A glass transition temperature, $T_g$, can be defined as the temperature at which the extrapolated glass solid and viscous fluid lines intersect, as shown in FIG. 2. The glass transition temperature is a temperature associated with a change in the materials rheology from a brittle solid to a solid that can flow.

Physically, the glass transition temperature is related to the thermal energy required to excite various molecular translational and rotational modes in the material. The glass transition temperature is often taken as the approximate annealing point, where the viscosity is $10^{13}$ Poise, but in fact, the measured $T_g$ is a relative value and is dependent upon the measurement technique.

As shown in FIG. 2, a dilatometer can also be used to measure a dilatometric softening point, $T_{ds}$. A dilatometer works by exerting a small compressive load on a sample and heating the sample. When the sample temperature becomes sufficiently high, the material starts to soften and the compressive load causes a deflection in the sample, when is observed as a decrease in volume or length. This relative value is called the dilatometric softening point and usually occurs when the materials viscosity is between $10^{10}$ and $10^{12.5}$ Poise. The exact $T_{ds}$ value for a material is usually dependent upon the instrument and measurement parameters. When similar instruments and measurement parameters are used, this temperature provides a useful measure of different materials rheological compatibility in this viscosity regime.

As mentioned above, matching the TEC is an important consideration for obtaining fiber that is free from excessive residual stress, which can develop in the fiber during the draw process. Typically, when the TEC's of the two materials are not sufficiently matched, residual stress arises as elastic stress. The elastic stress component stems from the difference in volume contraction between different materials in the fiber as it cools from the glass transition temperature to room temperature (e.g., 25° C.). The volume change is determined by the TEC and the change in temperature. For embodiments in which the materials in the fiber become fused or bonded at any interface during the draw process, a difference in their respective TEC's will result in stress at the interface. One material will be in tension (positive stress) and the other in compression (negative stress), so that the total stress is zero. Moderate compressive stresses themselves are not usually a major concern for glass fibers, but tensile stresses are undesirable and may lead to failure over time. Hence, it is desirable to minimize the difference in TEC's of component materials to minimize elastic stress generation in a fiber during drawing. For example, in a composite fiber formed from two different materials, the absolute difference between the TEC's of each glass between $T_g$ and room temperature measured with a dilatometer with a heating rate of 3° C./min, should be no more than $5 \times 10^{-6}$° $C.^{-1}$ (e.g., no more than $4 \times 10^{-6}$° $C.^{-1}$, no more than $3 \times 10^{-6}$° $C.^{-1}$, no more than $2 \times 10^{-6}$° $C.^{-1}$, no more than $1 \times 10^{-6}$° $C.^{-1}$, no more than $5 \times 10^{-7}$° $C.^{-1}$, no more than $4 \times 10^{-7}$° $C.^{-1}$, no more than $3 \times 10^{-7}$° $C.^{-1}$, no more than $2 \times 10^{-7}$° $C.^{-1}$).

While selecting materials having similar TEC's can minimize an elastic stress component, residual stress can also develop from viscoelastic stress components. A viscoelastic stress component arises when there is sufficient difference between strain point or glass transition temperatures of the component materials. As shown by the curve in FIG. 2, as a material cools below $T_g$ it undergoes a sizeable volume contraction. Moreover, as the viscosity changes in this transition upon cooling, the time needed to relax stress increases from zero (instantaneous) to minutes. For example, consider a composite preform made of two or more glasses, each having a different glass transition range (and different $T_g$'s). During initial drawing, the glasses behave as viscous fluids and stresses due to drawing strain are relaxed instantly. After leaving the hottest part of the draw furnace, the glass fiber rapidly loses heat, causing the viscosities of the fiber materials to increase exponentially, along with the stress relaxation time. Upon cooling to its $T_g$, each glass cannot practically release any more stress since the stress relaxation time has become very large compared with the draw rate. So, assuming the component glasses possess different $T_g$ values, the first glass to cool to its $T_g$ can no longer reduce stress, while the second glass is still above its $T_g$ and can release stress developed between the glasses. Once the second glass cools to its $T_g$, stresses that arise between the glasses can no longer be effectively relaxed. Moreover, at this point the volume contraction of the second glass is much greater than the volume contraction of the first glass (which is now below its $T_g$ and behaving as a brittle solid). Such a situation can result sufficient stress buildup between the glasses so that one or both of the glass portions mechanically fail. This leads us to a third selection criterion for choosing fiber materials: it is desirable to minimize the difference in $T_g$'s of component glasses to minimize viscoelastic stress generation in a fiber during drawing. Preferably, the glass transition temperature of a first material, $T_{g1}$, should be within 100° C. of the glass transition temperature of a second material, $T_{g2}$ (e.g., $|T_{g1}-|$ should be less than 90° C., less than 80° C., less than 70° C., less than 60° C., less than 50° C., less than 40° C., less than 30° C., less than 20° C., less than 10° C.).

Figure 3:
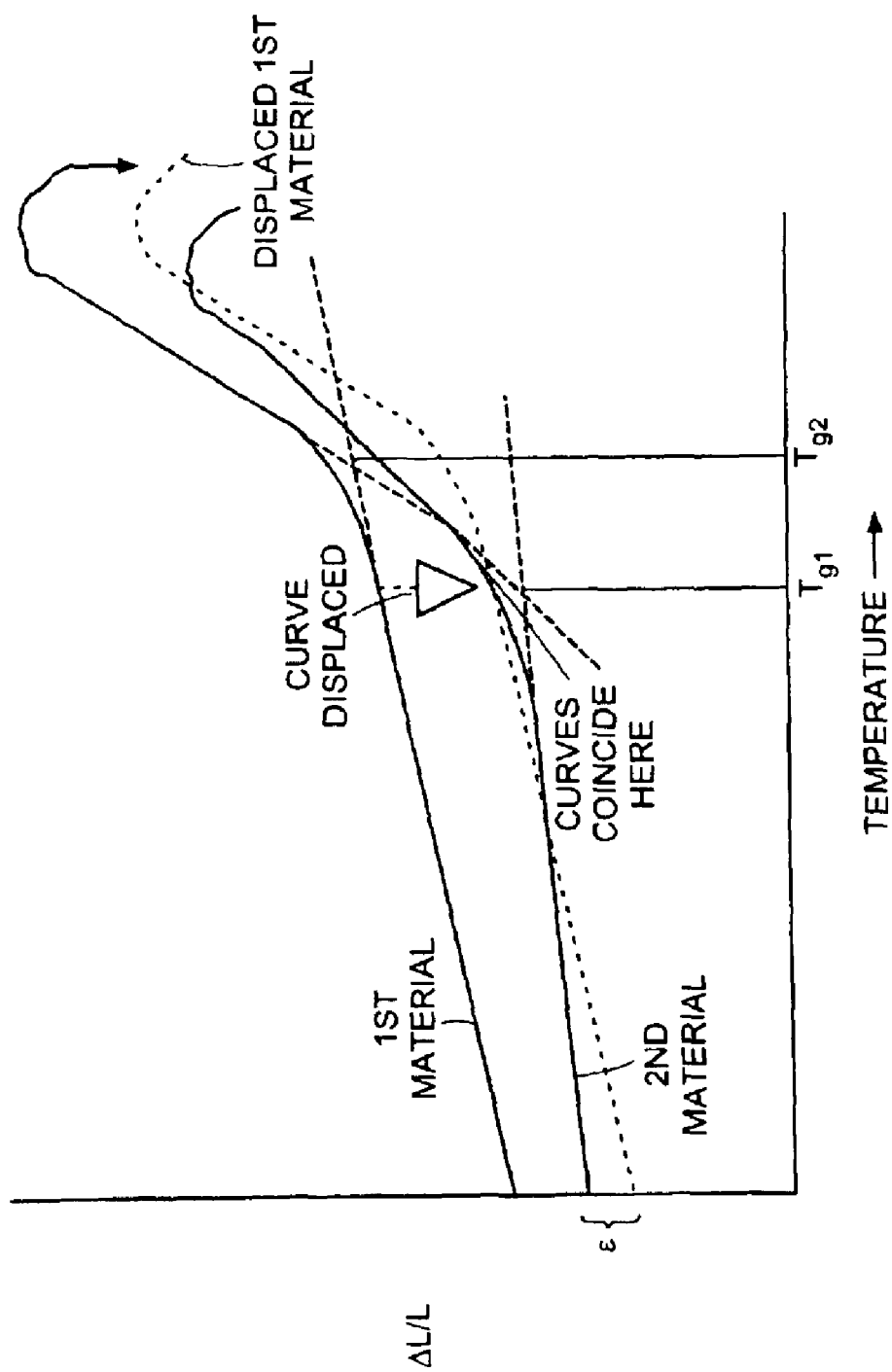
FIG. 3 is a temperature vs. length plot for two glasses.
Figure 4:
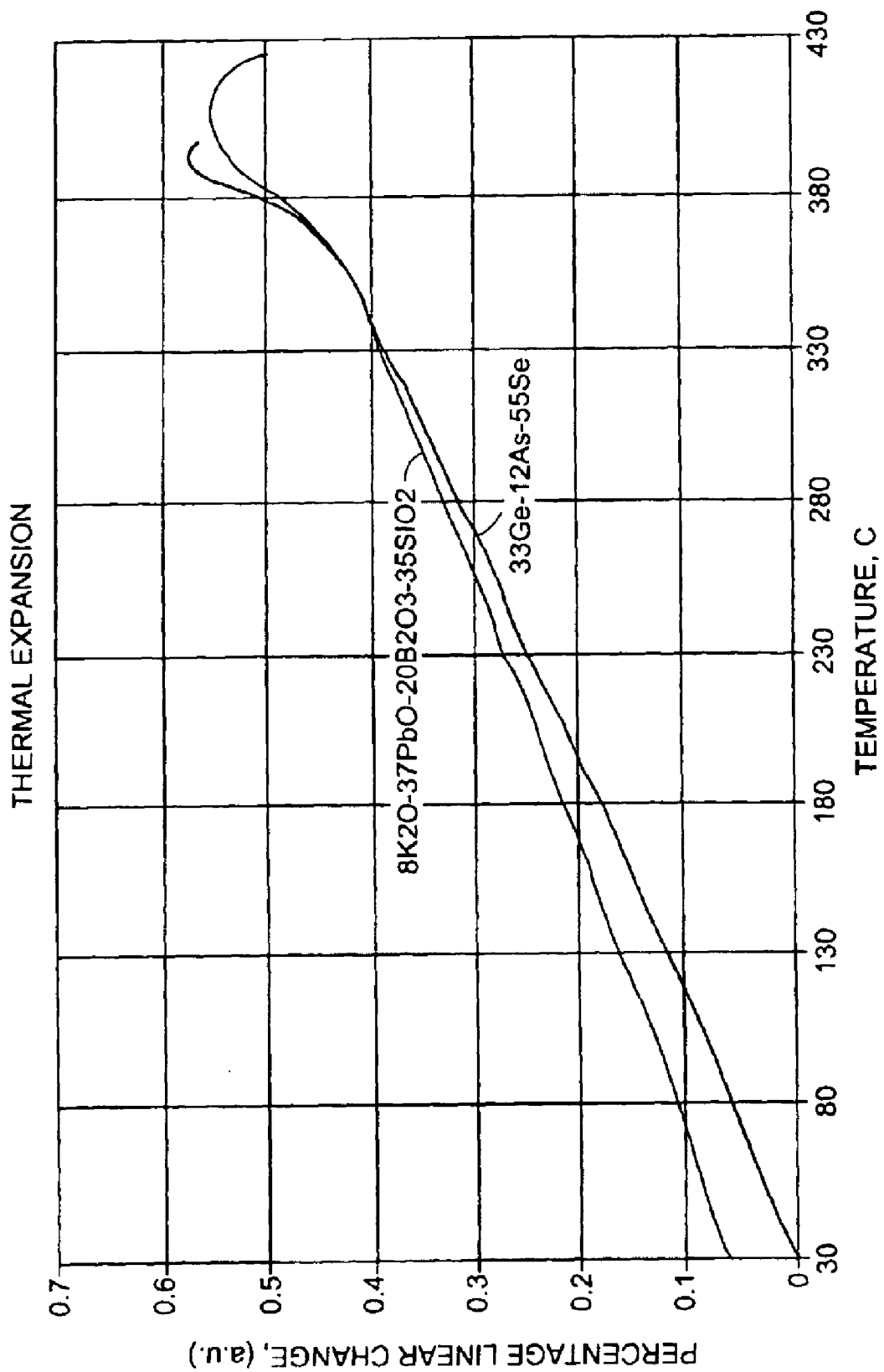
FIG. 4 is a plot comparing the thermal expansion of a chalcogenide glass and an oxide glass.
Figure 5:
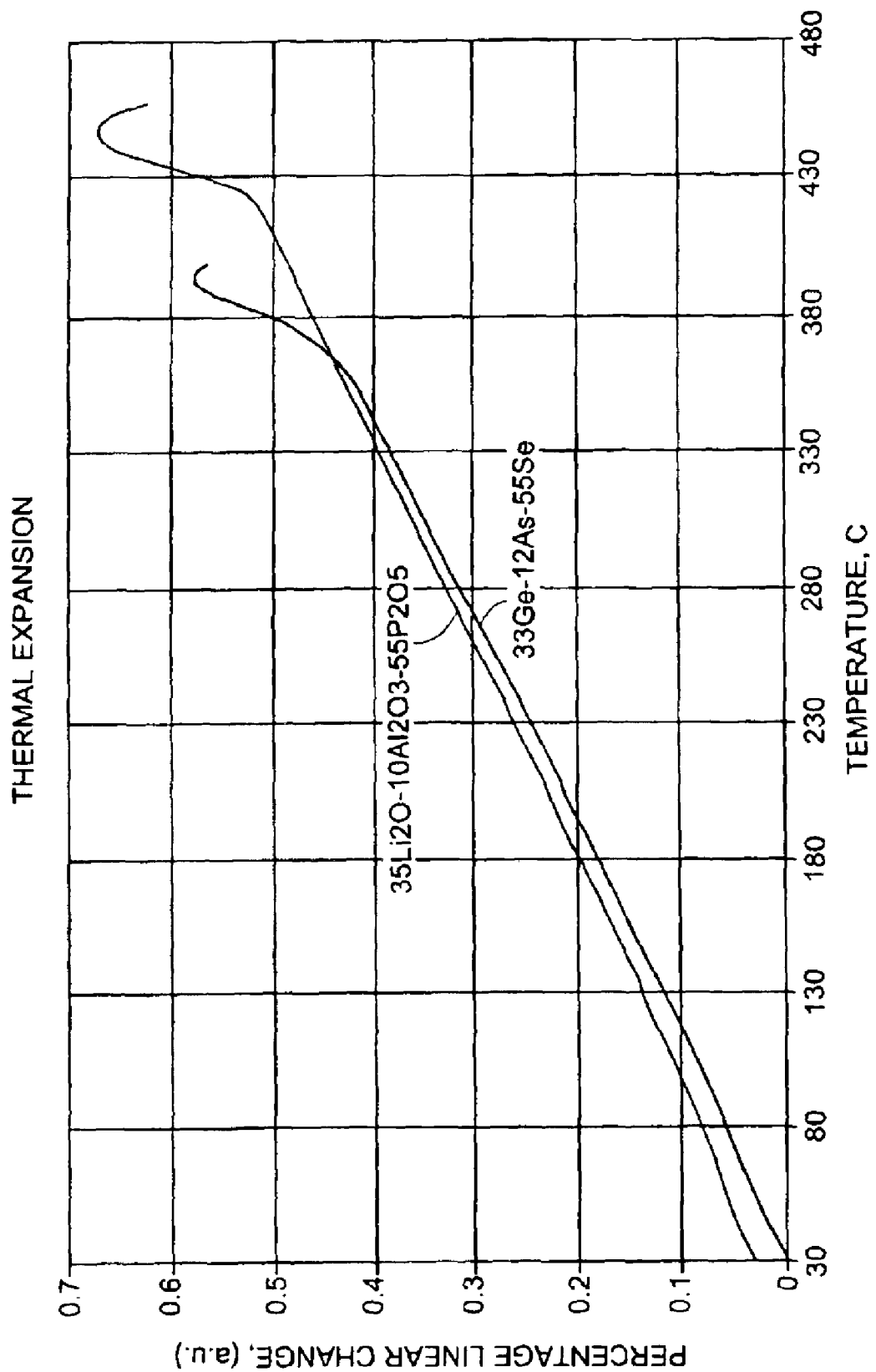
FIG. 5 is a plot comparing the thermal expansion of the chalcogenide glass and another oxide glass.
Figure 6:
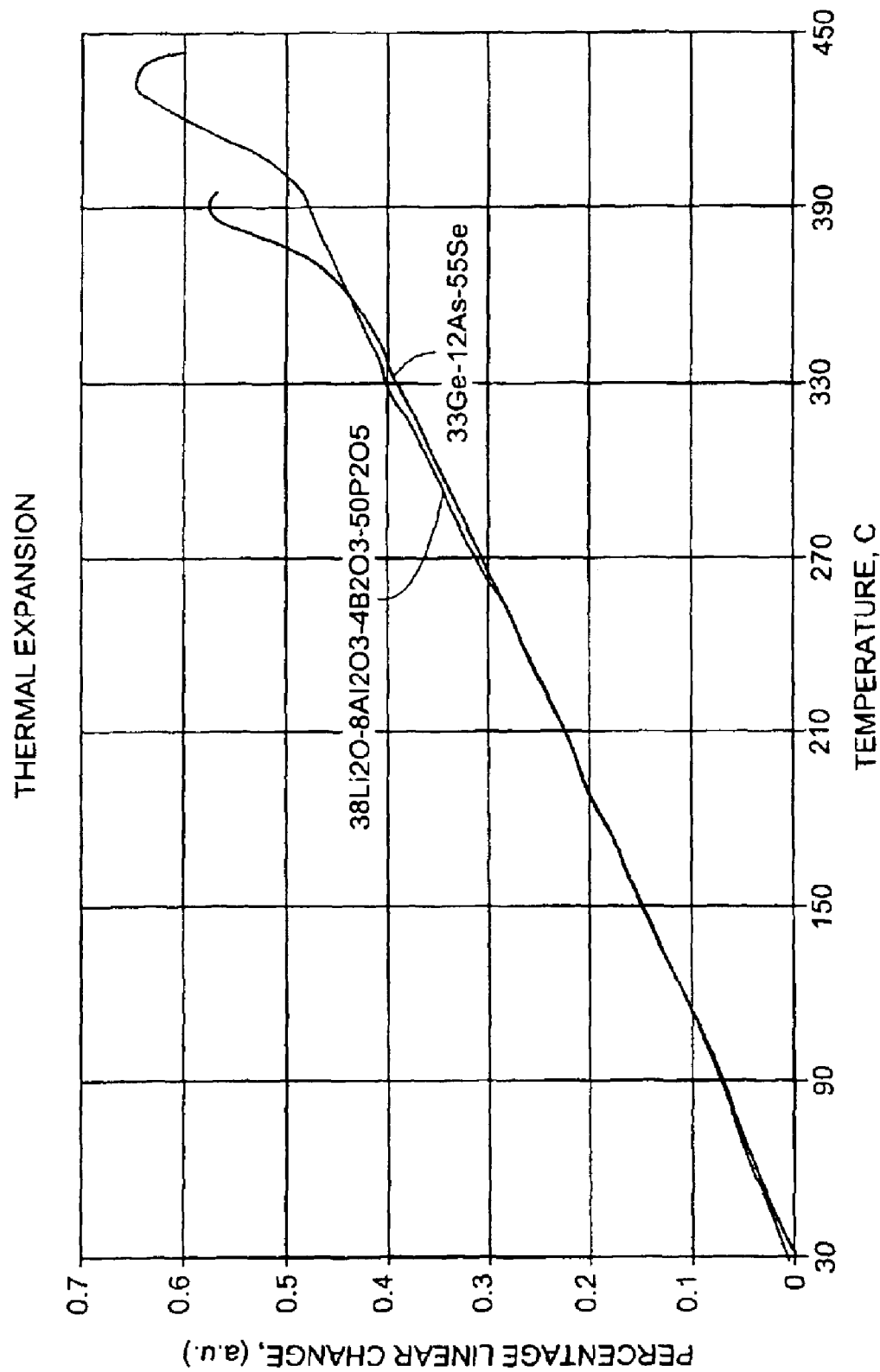
FIG. 6 is a plot comparing the thermal expansion of the chalcogenide glass and another oxide glass.
Figure 7:
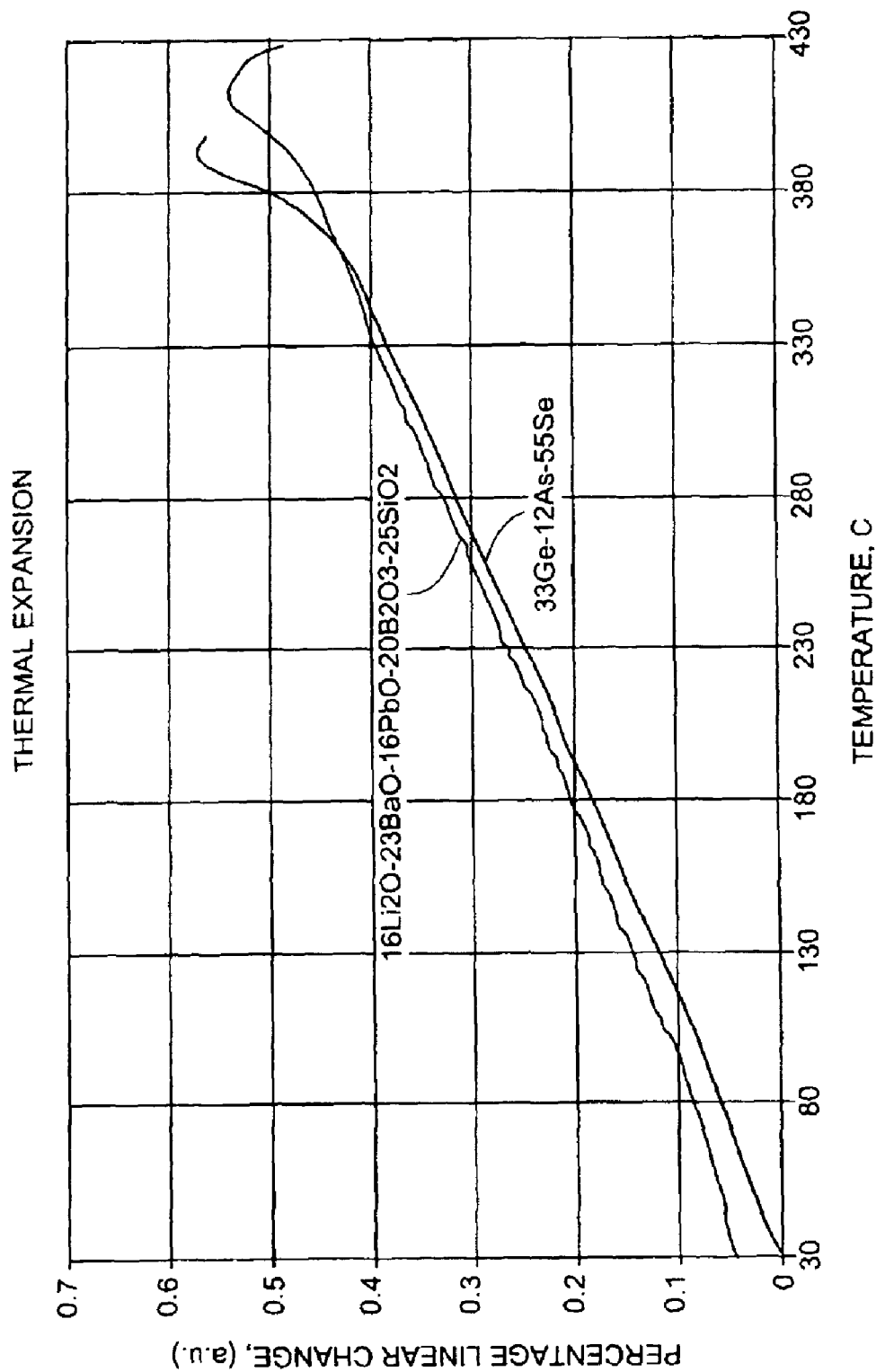
FIG. 7 is a plot comparing the thermal expansion of the chalcogenide glass and another oxide glass.
Figure 8:
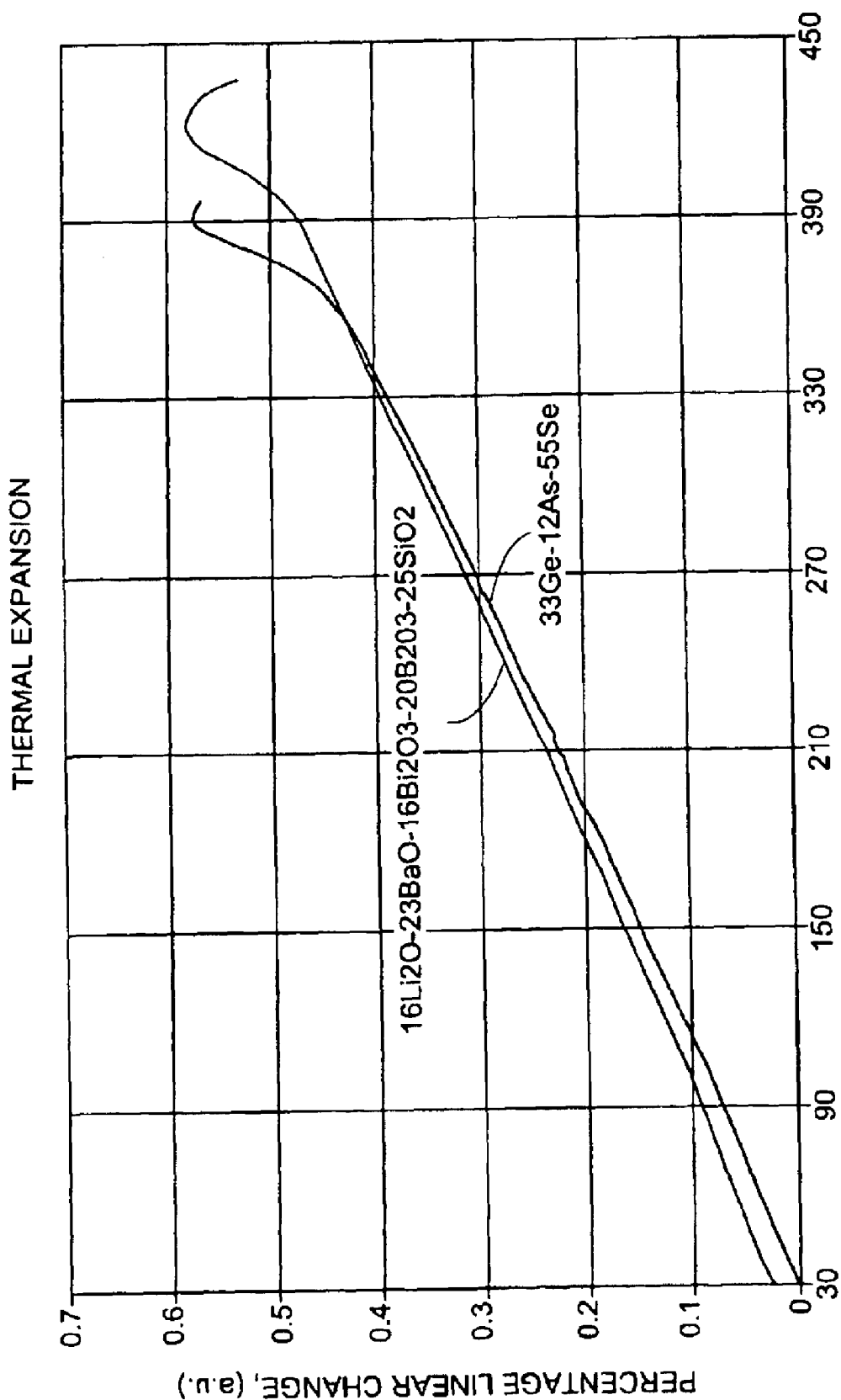
FIG. 8 is a plot comparing the thermal expansion of the chalcogenide glass and another oxide glass.
Figure 9:
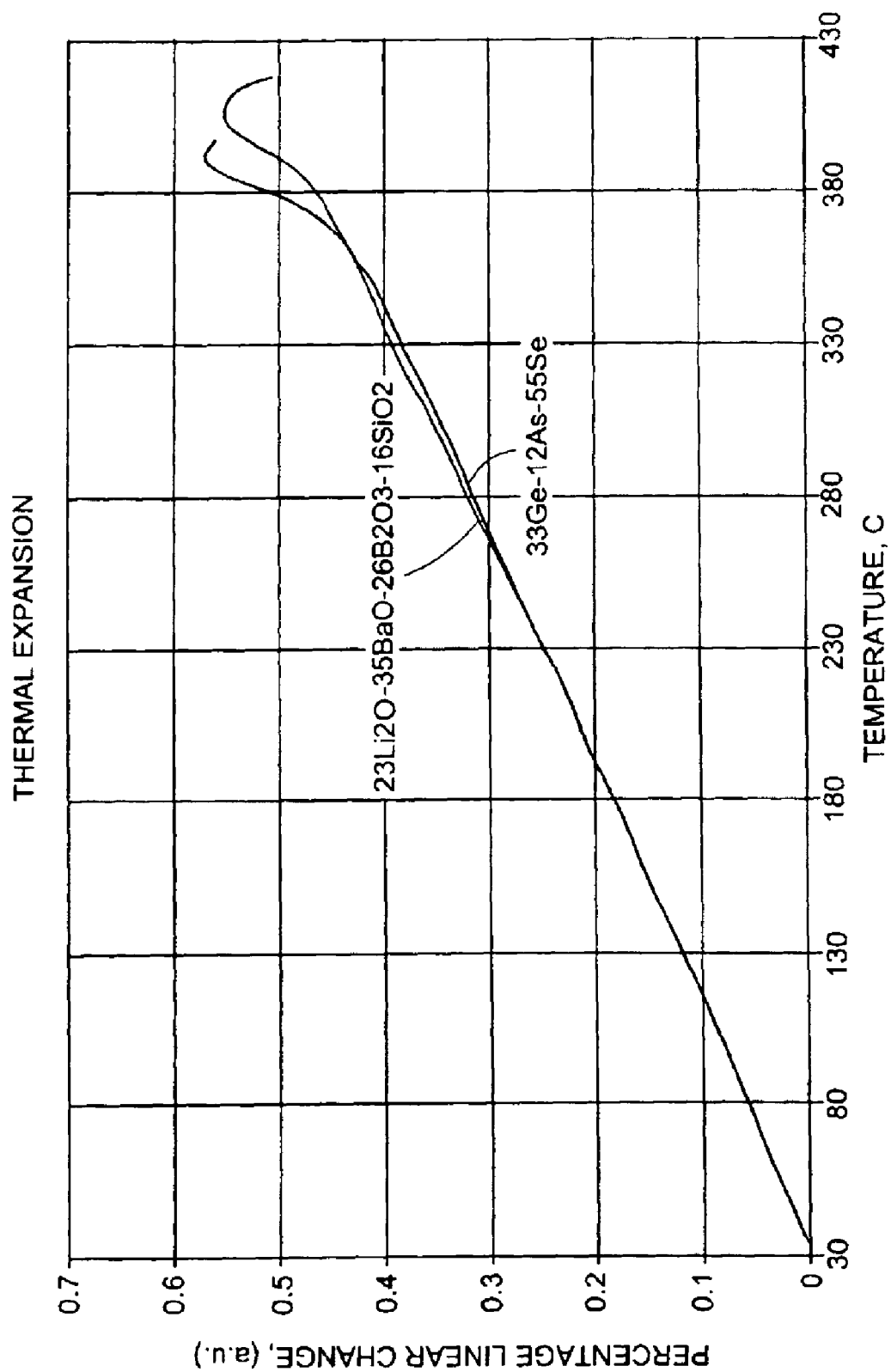
FIG. 9 is a plot comparing the thermal expansion of the chalcogenide glass and another oxide glass.
Figure 10:
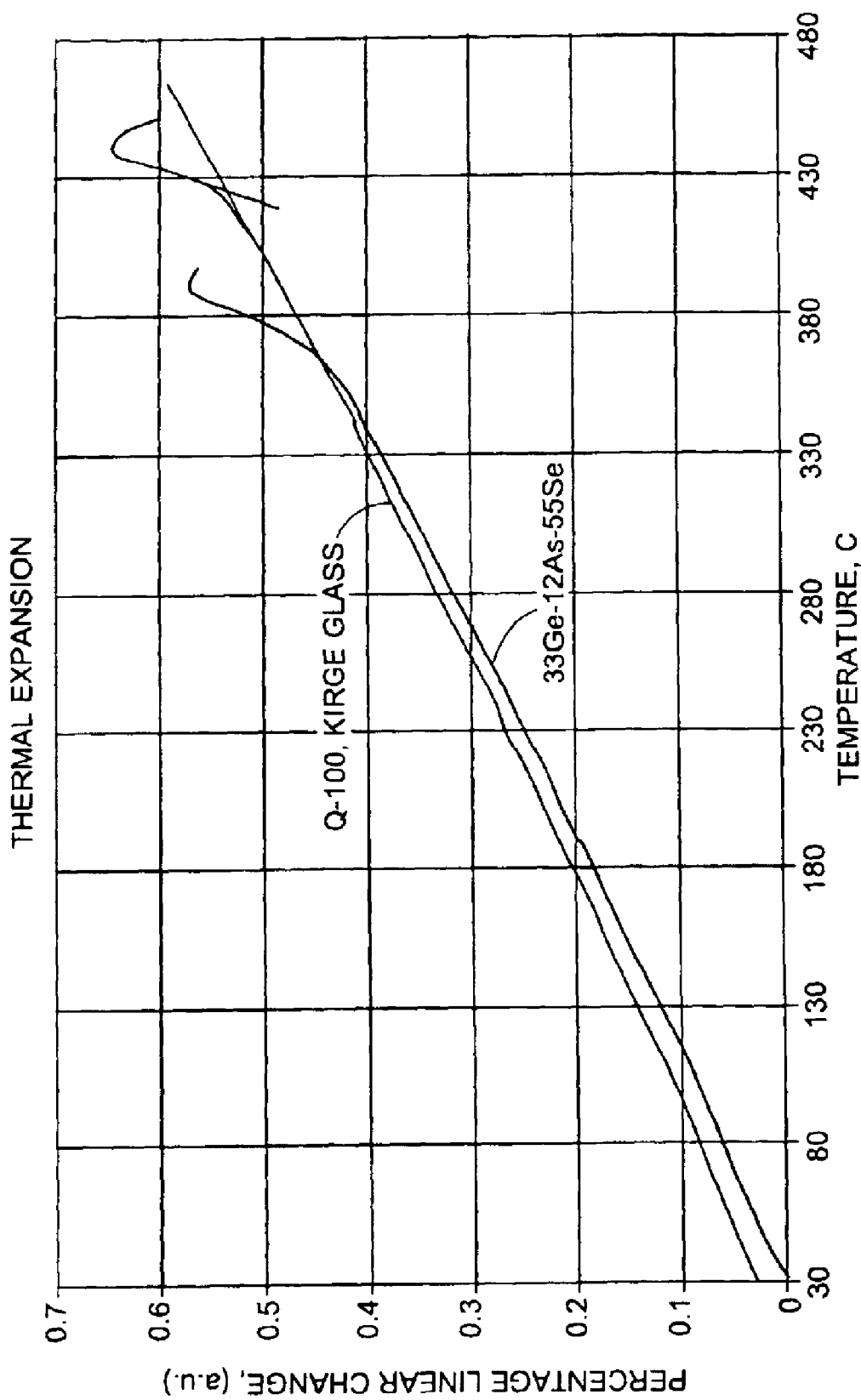
FIG. 10 is a plot comparing the thermal expansion of the chalcogenide glass and Q-100 Kirge glass.
Figure 11:
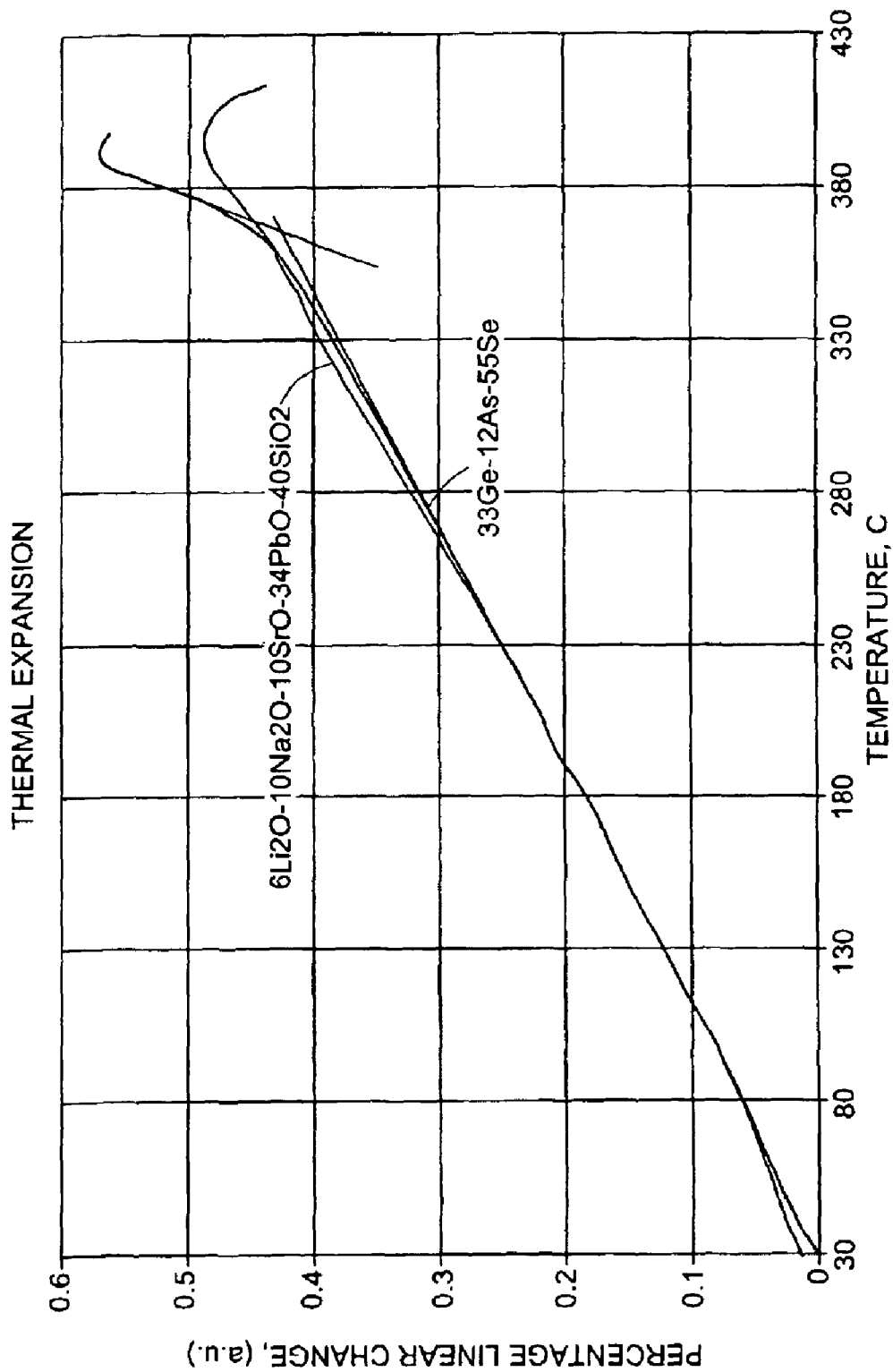
FIG. 11 is a plot comparing the thermal expansion of the chalcogenide glass and another oxide glass.
Figure 12:
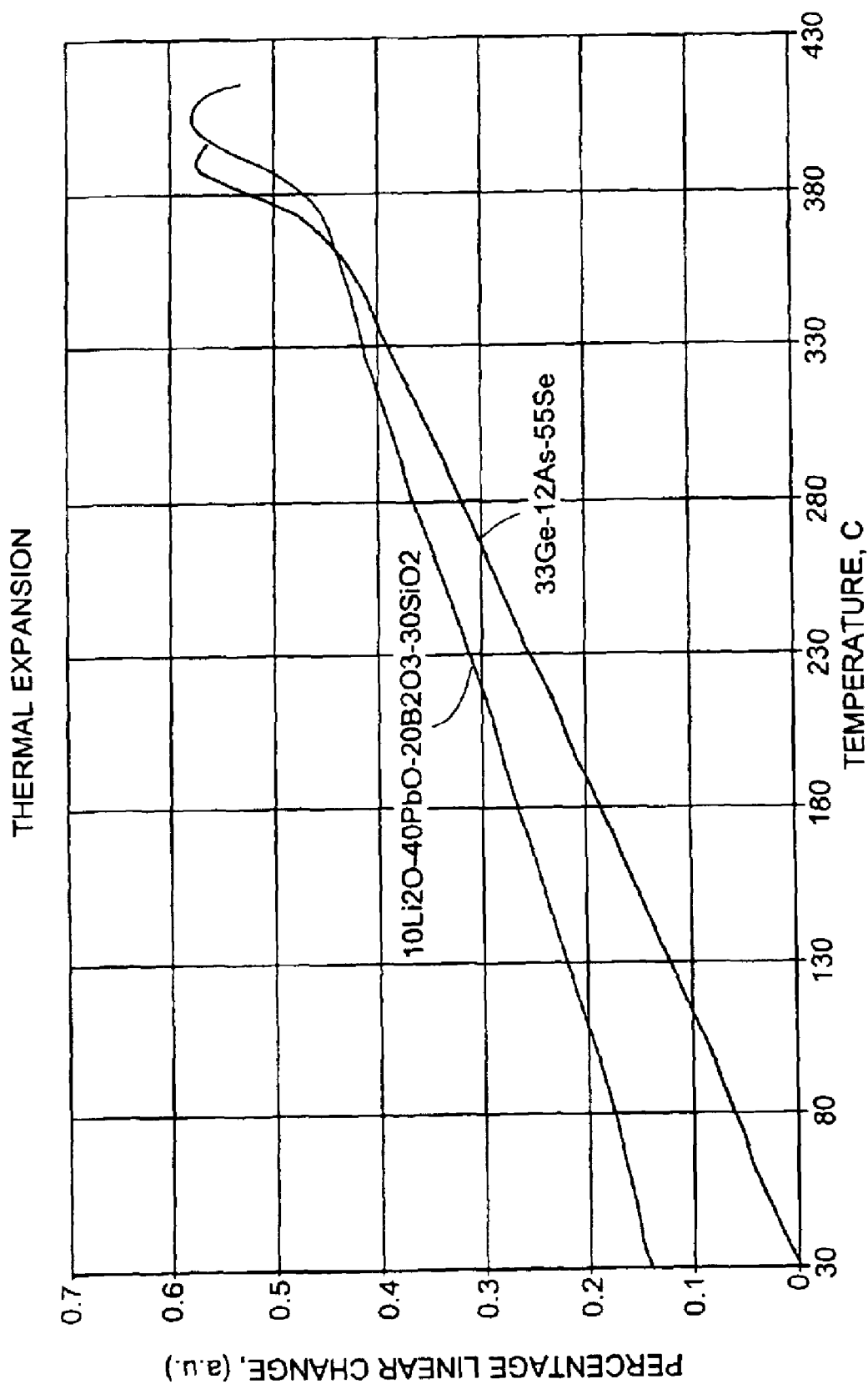
FIG. 12 is a plot comparing the thermal expansion of the chalcogenide glass and a further oxide glass.

Since there are two mechanisms (i.e., elastic and viscoelastic) to develop permanent stress in drawn fibers due to differences between constituent materials, these mechanisms may be employed to offset one another. For example, materials constituting a fiber may naturally offset the stress caused by thermal expansion mismatch if mismatch in the materials $T_g$'s results in stress of the opposite sign. Conversely, a greater difference in $T_g$ between materials is acceptable if the materials' thermal expansion will reduce the overall permanent stress. Referring to FIG. 3, one way to assess the combined effect of thermal expansion and glass transition temperature difference is to compare each component material temperature-length curve. After finding $T_g$ for each glass using the foregoing slope-tangent method, one of the curves is displaced along the ordinate axis such that the curves coincide at the lower $T_g$ temperature value ($T_{g1}$ as shown in FIG. 3). The difference in y-axis intercepts at room temperature yields the strain, $\epsilon$, expected if the glasses were not conjoined. The expected tensile stress, $\sigma$, for the material showing the greater amount of contraction over the temperature range from $T_g$ to room temperature, can be computed simply from the following equation:

$$\sigma =,$$

where E is the elastic modulus for that material. Typically, residual stress values less than 100 MPa (e.g., less than 50 MPa, less than 30 MPa), are sufficiently small to indicate that two materials are compatible.

A fourth selection criterion is to match the thermal stability of candidate materials. A measure of the thermal stability is given by the temperature interval ($T_x-T_g$), where $T_x$ is the temperature at the onset of the crystallization as a material cools slowly enough that each molecule can find its lowest energy state. Accordingly, a crystalline phase is a more energetically favorable state for a material than a glassy phase. However, a material's glassy phase typically has performance and/or manufacturing advantages over the crystalline phase when it comes to fiber waveguide applications. The closer the crystallization temperature is to the glass transition temperature, the more likely the material is to crystallize during drawing, which can be detrimental to the fiber (e.g., by introducing optical inhomogeneities into the fiber, which can increase transmission losses). Usually a thermal stability interval, ($T_x-T_g$) of at least 80° C. (e.g., at least 100° C.) is sufficient to permit fiberization of a glass by redrawing fiber from a preform. In preferred embodiments, the thermal stability interval is at least 120° C., such as 150° C., 200° C. or more. $T_x$ can be measured using a thermal analysis instrument, such as a differential thermal analyzer (DTA) or a differential scanning calorimeter (DSC).

A further consideration when selecting materials that can be co-drawn are the materials' melting temperatures, $T_m$. At the melting temperature, the viscosity of the material becomes too low to successfully maintain precise geometries during the fiber draw process. Accordingly, in preferred embodiments the melting temperature of one material is higher than the working temperature of a second, Theologically compatible material. In other words, when heating a preform, the preform reaches a temperature at it can be successfully drawn before either material in the preform melts.

Examples of specific combinations of Theologically compatible materials that can form a high-index contrast fiber waveguides include the following.

A chalcogenide glass with composition $Ge_{33}As_{12}Se_{55}$ is a suitable high refractive index material. Its refractive index at wavelength 1.5 μm is 2.5469 and is higher at 587.56 nm (this is the wavelength of the sodium d-line at which the refractive index is often measured, and is referred to as $n_d$). This glass is readily formed and manufactured in different shapes. Its onset of crystallization ($T_x$) is above 500° C. and the thermal expansion coefficient (TEC) is $12.0-13.5 \times 10^{-6}$/° C. in the range of 50° C.–320° C. This composition also exhibits high optical homogeneity and low absorption losses at infrared frequencies. This glass is commercially available under tradename AMTIR-1 from Amorphous Materials, Inc (Garland, Tex.). Moreover, this glass has a glass transition temperature $T_g$=365, a dilatometric softening temperature $T_{ds}$=391, softening point temperature $T_s$=476° C. and has a draw temperature, $T_d$=515° C. $T_d$ is measured by suspending a rod of the glass (approximately 4–7 mm in diameter and 3–6 inches long) in a furnace at a first temperature, with approximately the bottom third of the rod positioned in the center of the furnace. If the rod does not soften and stretch into a fiber after five minutes the furnace temperature is raised 10° C. This step is repeated until the rod softens and can easily be drawn into a fine fiber (e.g., diameter less than 300 μm). The temperature at which this occurs is the drawing temperature, $T_d$. Note that $T_d$ is different from the aforementioned characteristic temperatures, which are defined according to a materials viscosity.

TABLE 1

Example glasses compatible with $Ge_{33}As_{12}Se_{55}$.

| Glass [mole %] | TEC [×10$^{-6}$/° C.] | $T_g$ [° C.] | $\Delta T_g$ [° C.] | $T_{ds}$ [° C.] | $\Delta T_{ds}$ [° C.] | $T_s$ [° C.] | $\Delta T_s$ [° C.] | $T_d$ [° C.] | $\Delta T_d$ [° C.] |
|---|---|---|---|---|---|---|---|---|---|
| 8 $K_2O$-37 PbO-20 $B_2O_3$-35 $SiO_2$ | 10–12 | 370 | 5 | 408 | 17 | 470 | 6 | 495 | 20 |
| 35 $Li_2O$-10 $Al_2O_3$-55 $P_2O_5$ | 11–14 | 420 | 55 | 446 | 55 | 512 | 36 | 513 | 3 |
| 38 $Li_2O$- 8 $Al_2O_3$-4 $B_2O_3$-50 $P_2O_5$ | 12–14 | 403 | 38 | 434 | 43 | 493 | 17 | 502 | 13 |
| 16 $Li_2O$-23 BaO-16 PbO-20 $B_2O_3$-25 $SiO_2$ | 11–13 | 390 | 25 | 412 | 21 | 489 | 13 | 490 | 25 |
| 16 $Li_2O$-23 BaO-16 $Bi_2O_3$-20 $B_2O_3$-25 $SiO_2$ | 12–14 | 398 | 33 | 423 | 32 | 495 | 19 | 495 | 20 |
| 23 $Li_2O$-35 BaO-26 $B_2O_3$-16 $SiO_2$ | 12–14 | 384 | 19 | 408 | 17 | 471 | 5 | 477 | 38 |
| Q-100 | 11–14 | 423 | 58 | 441 | 50 | 519 | 43 | 515 | 0 |
| 6 $Li_2O$-10 $Na_2O$-10 SrO-34 PbO-40 $SiO_2$ | 12–14 | 373 | 8 | 395 | 4 | 479 | 3 | 497 | 18 |
| 10 $Li_2O$-40 PbO-20 $B_2O_3$-30 $SiO_2$ | 8–9 | 378 | 21 | 404 | 11 | 476 | 7 | 492 | 23 |

Referring to FIGS. 4–13, the thermal expansion curve for nine low-index glasses was measured and compared to the $Ge_{33}As_{12}Se_{55}$ thermal expansion. Table 1 shows the parameters $T_g$, $T_{ds}$, $T_s$, and $T_d$ for each of the nine glasses. Table 1 also shows the difference between the low-index glass value and the $Ge_{33}As_{12}Se_{55}$ values for each parameter as $\Delta T_g$, $\Delta T_{ds}$, $\Delta T_s$, and $\Delta T_d$, respectively. Note that the low index glass Q-100 is the tradename of a glass commercially available from Kigre, Inc. (Hilton Head, S.C.).

These nine low-index glasses were co-drawn with $Ge_{33}As_{12}Se_{55}$ as follows. Each of the low index glasses, available either as a round or square cross-section rod, were consolidated with a $Ge_{33}As_{12}Se_{55}$ into a single piece. The rods were consolidated into one piece by holding one rod adjacent to the other and heating them in a furnace. The rods were heated to near the higher of the two materials' softening temperature to allow a bond to form between the rods. Insufficiently compatible materials cannot be consolidated and will either crack, if bonding is extensive, otherwise separate upon cooling to room temperature. To co-draw the consolidated sample, each sample was suspended in a furnace and heated to a temperature sufficient for both materials to soften and be drawn into fiber. During this test, it became apparent if one of the samples softens or liquefies significantly more than the other material. Moreover, if the viscosities of the materials were not sufficiently matched, one of the materials would soften excessively and deform and/or volatilize before the other material was soft enough to be drawn. Samples formed from mismatched materials exhibited permanent curvature on cooling. For the nine low-index glasses listed in Table 1, only 10 $Li_2O$-40 PbO-20 $B_2O_3$-30 $SiO_2$ was found to not be compatible with $Ge_{33}As_{12}Se_{55}$.

Figure 13:
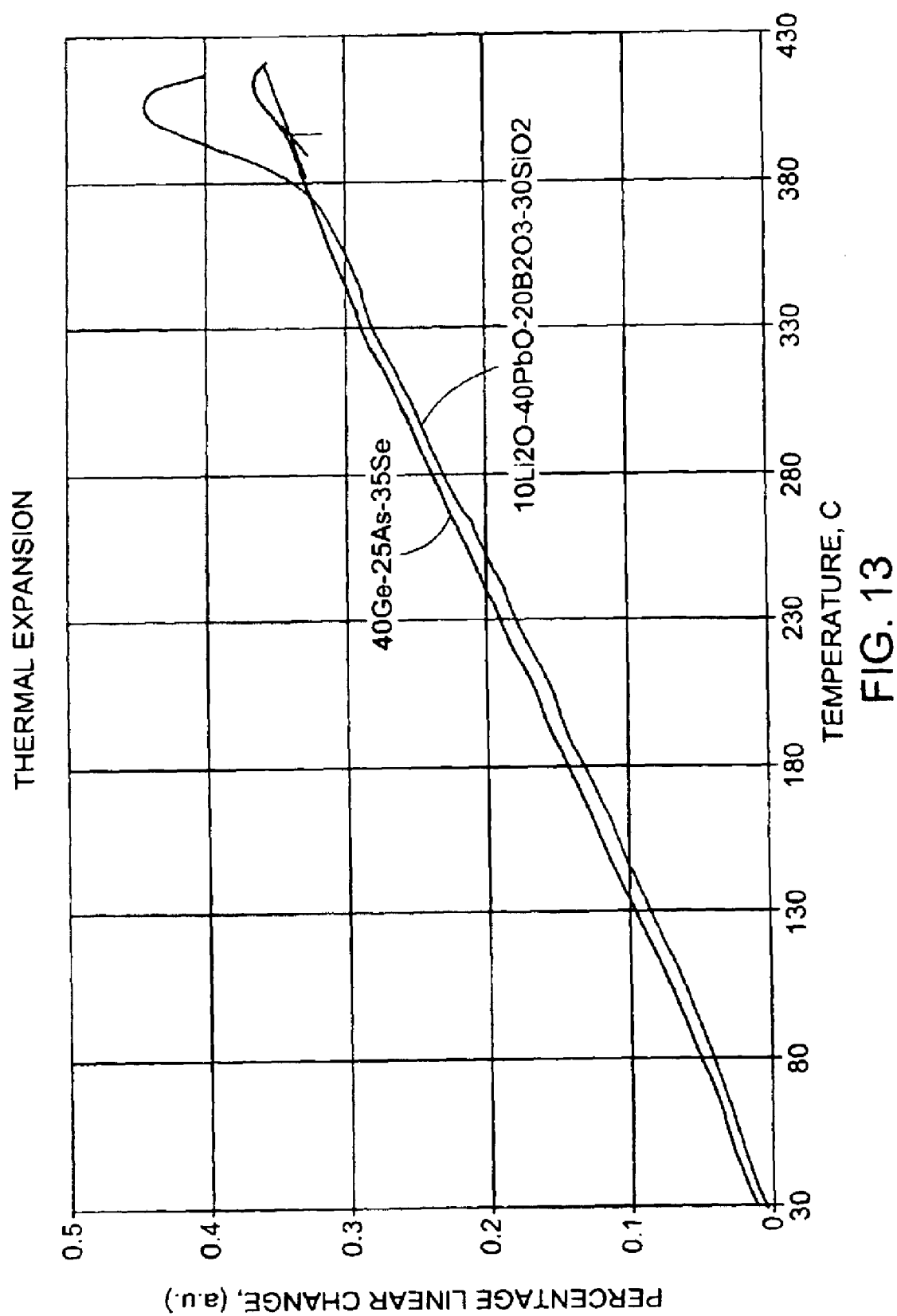
FIG. 13 is a plot comparing the thermal expansion of another chalcogenide glass and the oxide glass of FIG. 12.

Referring to FIG. 13, the low index glass 10 $Li_2O$-40 PbO-20 $B_2O_3$-30 $SiO_2$ was successfully co-drawn with another chalcogenide glass, $Ge_{40}As_{25}Se_{25}$. Accordingly, compositional changes can affect compatibility of one particular material with another.

In the foregoing discussed the compatibility of high and low index materials based on actual co-drawing experiments. Extrapolating empirical rheological data can identify high and low index materials that may be compatible. Such analysis may be performed using SciGlass and or SciPolymer databases (available from SciVision, Burlington, Mass.). Referring to FIGS. 14A–17, we used the Priven-2000 method to generate rheological data from the SciGlass and SciPolymer databases. A discussion of this data follows.

A suitable low refractive index glass, compatible with $Ge_{33}As_{12}Se_{55}$ glass can be the alkali borosilicate glass with composition (in mole %) 26 $SiO_2$-31 $B_2O_3$-12 $Na_2O$-12 $K_2O$-6 $Li_2O$-13 PbO. This composition vitrifies easily and the glass has thermal stability similar to its chalcogenide partner: it has $T_g$=401° C., refractive index, $n_d$=1.62 and TEC=13.9×10$^{-6}$/° C. The viscosity curves of the two glasses overlap over a broad temperature range including the fiber drawing temperatures (viscosity=10$^3$–10$^6$ Poise). Moreover, the glasses are chemically compatible, yielding a smooth and homogeneous interface when contacted at 550° C.

The basic glass composition may be modified to adjust any physical property. This is illustrated also in FIG. 14A. Another borosilicate glass, with slightly different composition 33.6 $SiO_2$-21.7 $B_2O_3$-44.7 $Na_2O$ (mole %), has the properties $n_d$=1.70, $T_g$=395° C. and TEC=12.9×10$^{-6}$/° C. Lowering the alkali content in the glass increases its thermal stability and brings its thermal expansion coefficient closer to the thermal expansion coefficient for $Ge_{33}As_{12}Se_{55}$ glass and results in practically identical viscosity curves in the temperature range of viscosities 10$^{3.5}$–10$^{7.5}$ Poise. This effect is accompanied by an increase in $n_d$, but still provides sufficiently high index-contrast with $Ge_{33}As_{12}Se_{55}$ glass.

Figure 14A:
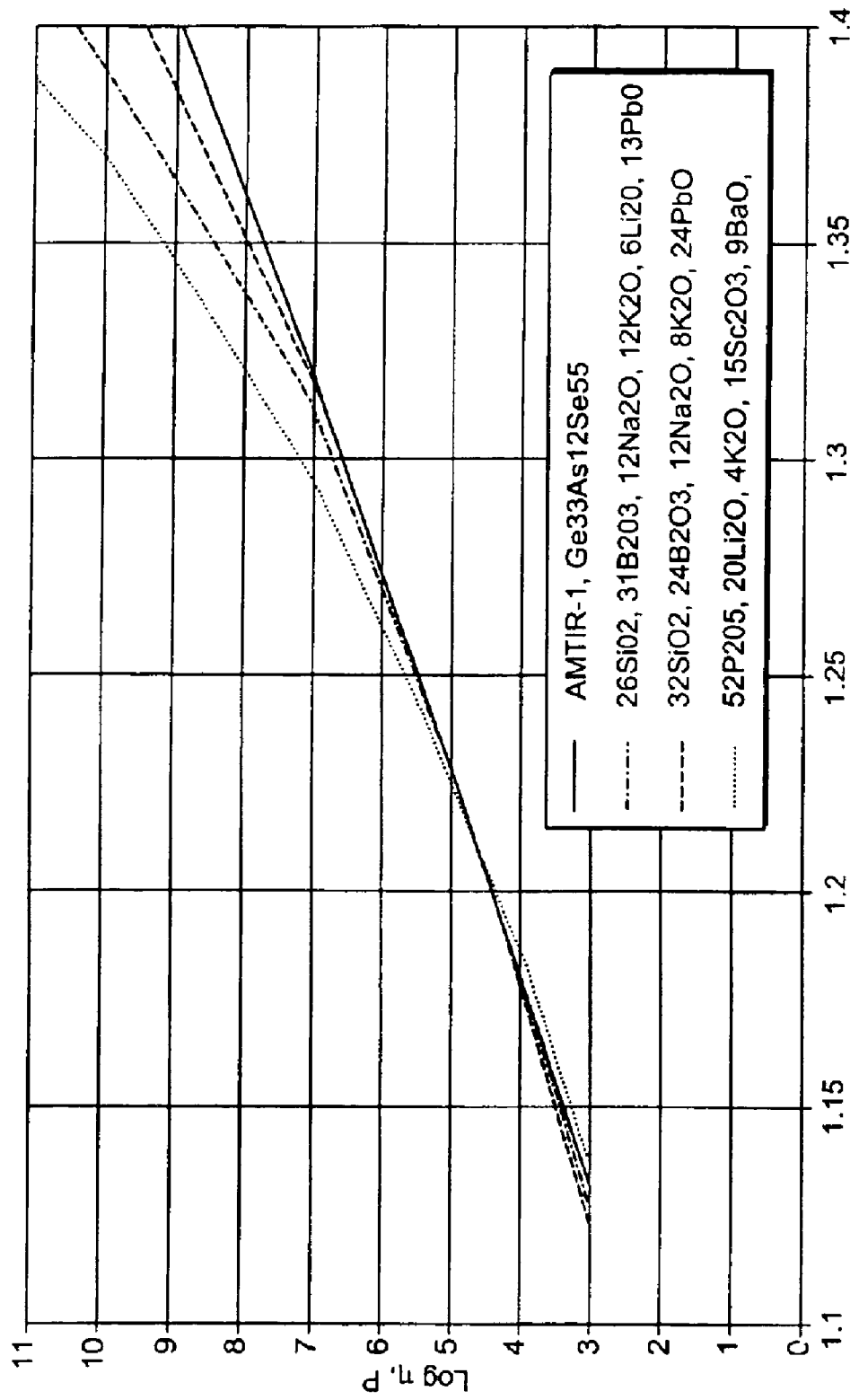
FIG. 14A is a plot showing 1000/Temperature vs. log viscosity for three borosilicates/phosphate glasses and AMTIR-1.
Figure 14B:
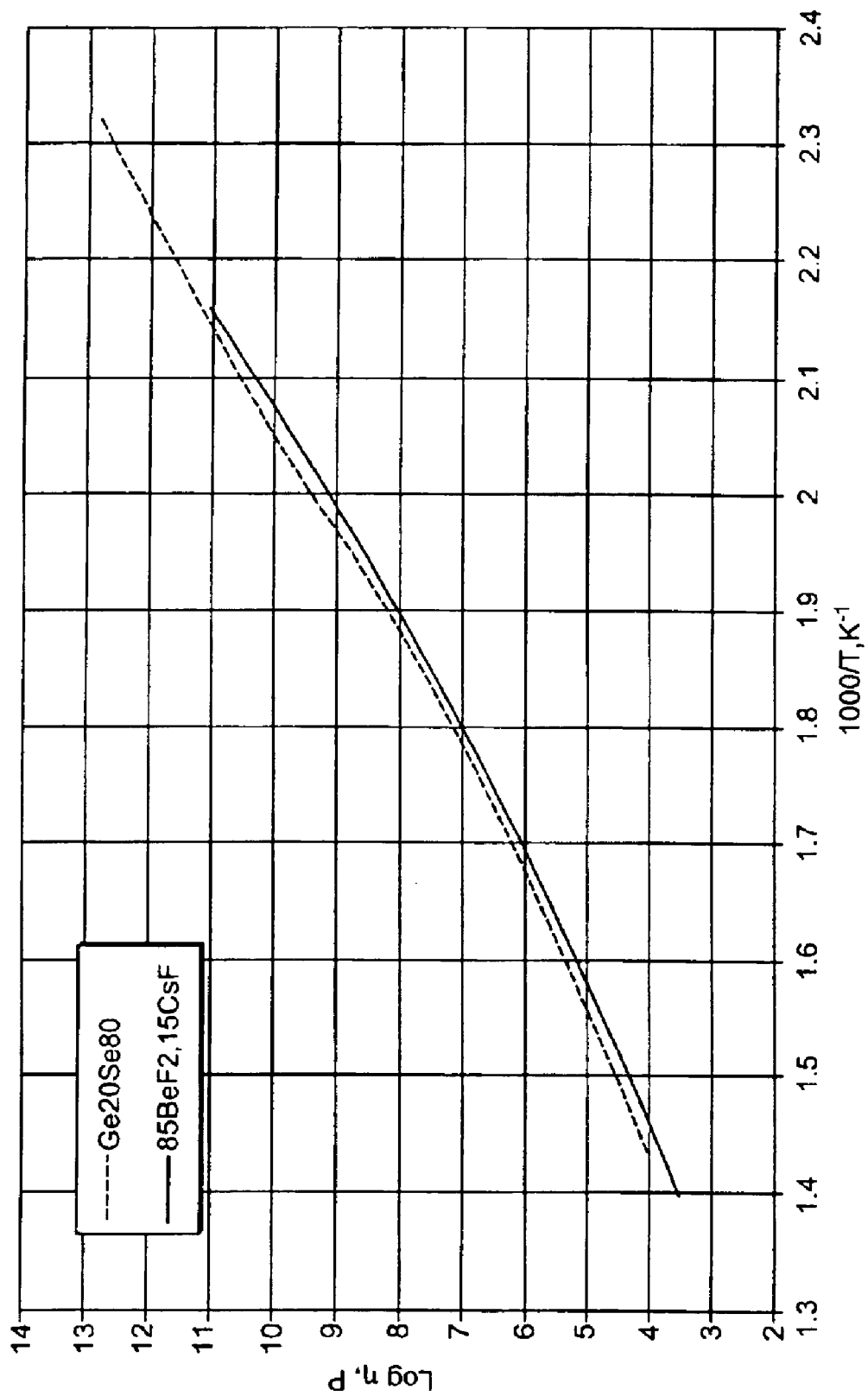
FIG. 14B is a plot showing 1000/Temperature vs. log viscosity for a fluoride glass and $Ge_{20}Se_{80}$.
Figure 16:
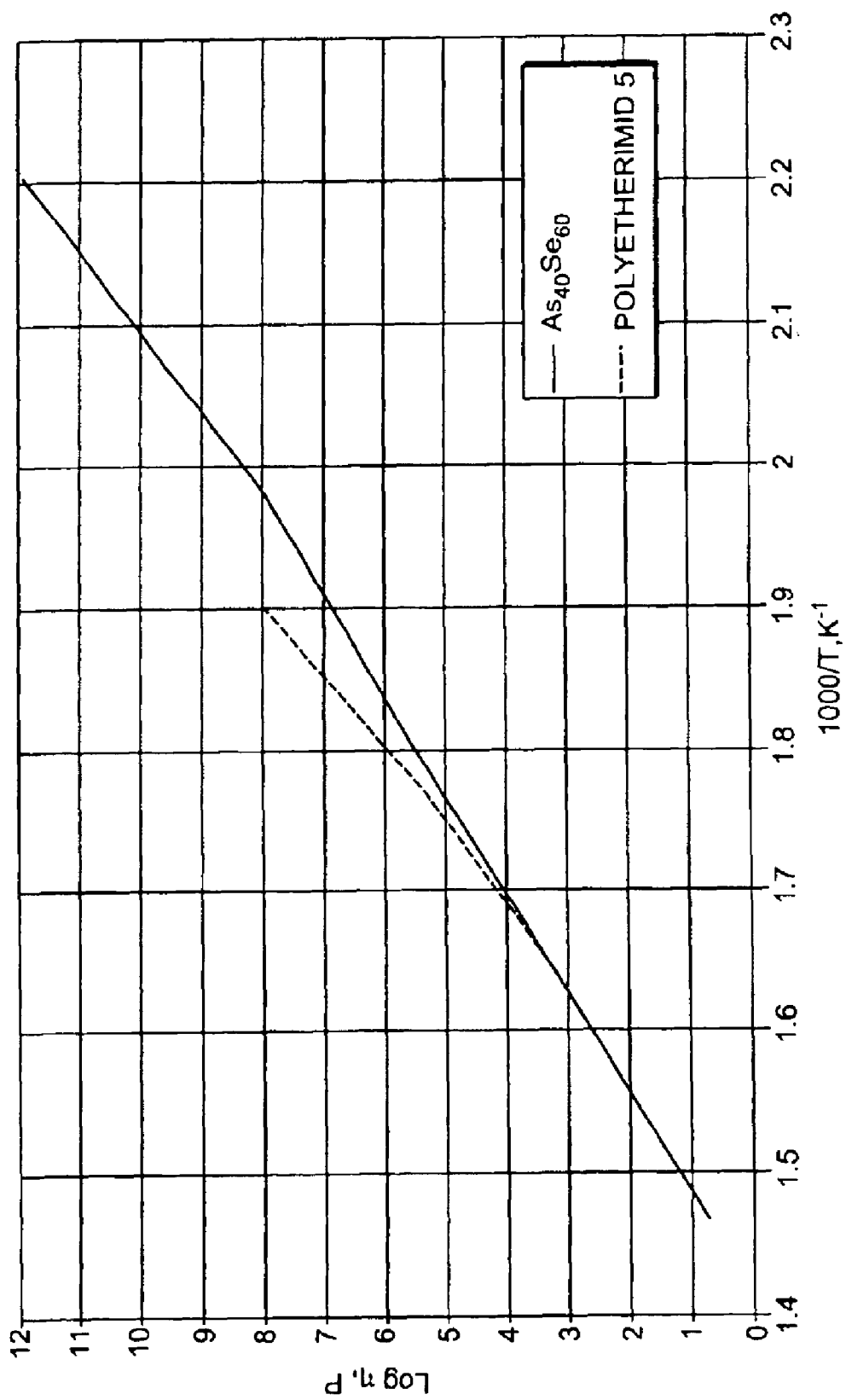
FIG. 16 is a plot showing 1000/Temperature vs. log viscosity for $As_{40}Se_{60}$ glass and a polymer.

Another choice for a low refractive index glass to match $Ge_{33}As_{12}Se_{55}$ can be from the phosphate glass family. For example, FIG. 14A shows the viscosity-temperature behavior of 52 $P_2O_5$-20 $Li_2O$-4 $K_2O$-15 $Sc_2O_3$-9 BaO (mole %) glass. As compared to the borosilicate glasses discussed above, this phosphate glass may be a better choice in terms of thermal stability. Moreover, the presence of $Sc_2O_3$ is known to improve the chemical durability of phosphate glasses. The thermal expansion of this phosphate glass (TEC=11.2×10$^{-6}$/° C.) is close to that of Ge$_{33}$As$_{12}$Se$_{55}$ glass, its n$_d$=1.60. It has T$_g$=426° C., and its viscosity behavior in the drawing temperature range (viscosities 10$^3$ –10$^6$ Poise) is a good match to that of Ge$_{33}$As$_{12}$Se$_{55}$ glass.

Combinations of chalcogenide and fluoride glasses can also provide high index-contrast in a fiber waveguide. For example, referring to FIG. 14B, the chalcogenide glass Ge$_{20}$Se$_{80}$, having n$_d$=2.5, is paired with a fluoride glass, 58 BeF$_2$-15 CsF (mole %) having refractive index n$_d$=1.3.

Referring to FIG. 15, two combinations of a high refractive index heavy metal oxide glass, 45Bi$_2$O$_3$-40PbO-15Ga$_2$O$_3$ (in mole %) with low refractive index oxide glasses are identified using their viscosity, thermal expansion, and stability behaviors. The lead bismuthate-based glass has refractive index n$_d$=2.32, T$_g$=350° C. and TEC=12.7×10$^{-6}$/° C. The viscosity-temperature behavior for this glass is different than for the chalcogenide glass in the foregoing example, therefore, the borosilicate glasses discussed above are not ideal matches. Instead, certain low index alkali silicate and phosphate glasses can be paired with these heavy metal oxide glasses. The viscosity-temperature behavior for examples of each glass type, silicate and phosphate, are shown in FIG. 15, having the compositions 44 SiO$_2$-12 PbO-38 Li$_2$O-6 SrO and 58 P$_2$O$_5$-14 MgO-8 Na$_2$O-20 Li$_2$O (mole %). The viscosity curves of both glasses closely match the curve for 45 Bi$_2$O$_3$-40 PbO-15 Ga$_2$O$_3$ glass in the drawing temperature region. The thermal expansion coefficient of the silicate glass (TEC=13.8×10$^{-6}$/° C.) is closer to that of the high index Bi—Pb-glass than is the TEC of the phosphate glass (TEC=14.2×10$^{-6}$/° C.), but the refractive index of the phosphate glass, n$_d$=1.50, is lower than that of the silicate glass, n$_d$=1.64. Again, depending on the specific implementation, either of these two low index glasses could be chosen as a match for the 45 Bi$_2$O$_3$-40 PbO-15 Ga$_2$O$_3$ glass.

Numerous polymers are also suitable low index materials for co-drawing with inorganic glasses to form composite, high-index-contrast fiber waveguides. For example, referring to FIG. 16, the viscosity-temperature curves for polyetherimid-5 and As$_{40}$Se$_{60}$ glass indicate that these may be suitable materials for co-drawing. Polyetherimid-5 and As$_{40}$Se$_{60}$ glass have refractive indices (n$_d$) of 1.64 and 2.9, respectively.

Varying the arsenic/selenium ratio in the chalcogenide glass does not significantly change its high refractive index, but gives a possibility for modifying the viscosity of the glass and matching its rheological parameters with different classes of lower or higher melting polymers. For example, the chalcogenide As$_{50}$Se$_{50}$ could be combined with polytricyclic 1, As$_{30}$Se$_{70}$ could be combined with poly[2,2-propane bis(4-(2,6-dibromophenyl)carbonate], and As$_5$Se$_{95}$ could be combined with polymethyl metacrylate (PMMA). Other chalcogenide glasses can also be combined for co-drawing with polymers, e.g., Ge$_{10}$Se$_{90}$ could be combined with poly[4.4'-sulfone diphenoxy di(4-phenylene) sulfone].

Figure 17:
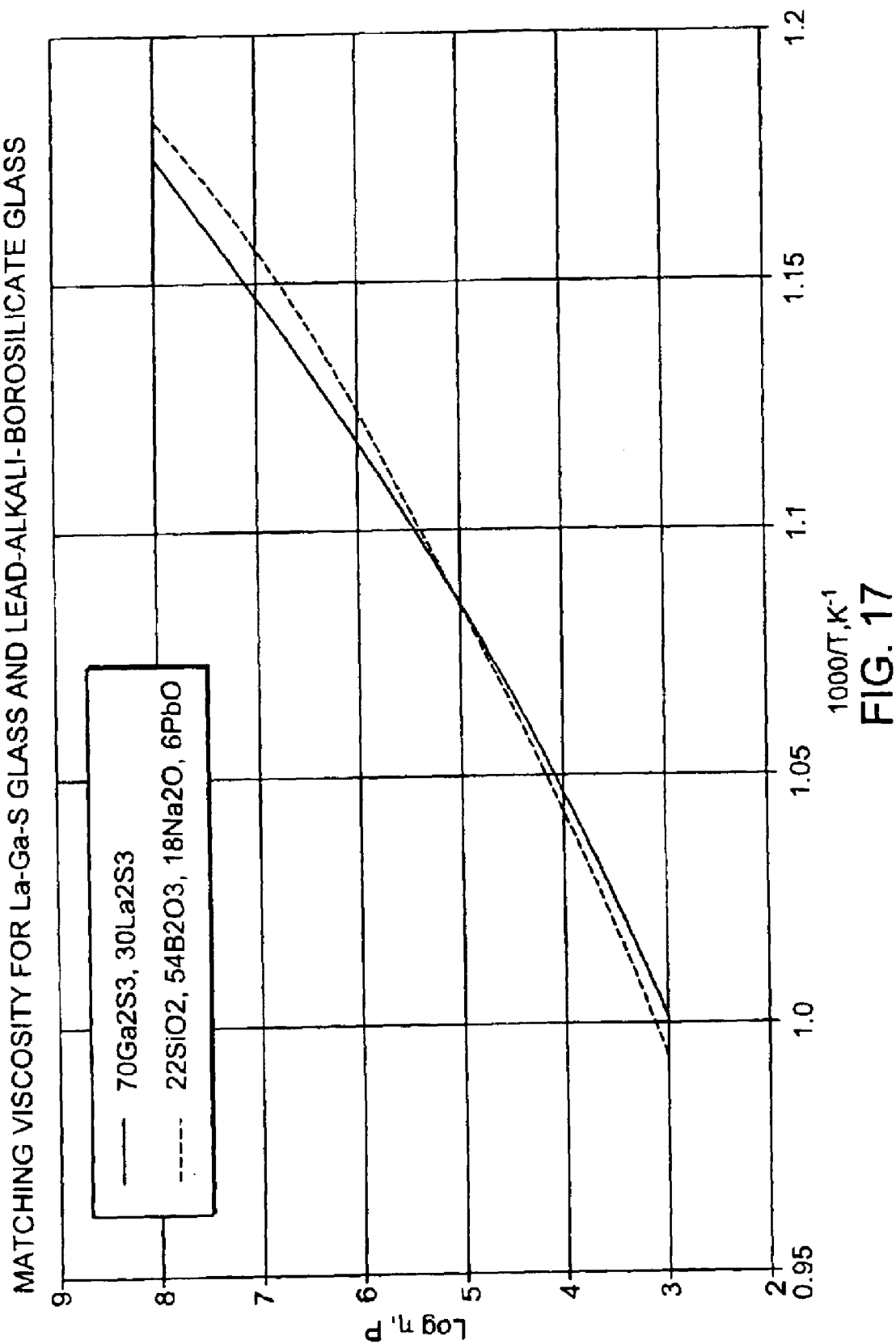
FIG. 17 is a plot showing 1000/Temperature vs. log viscosity for a La—Ga—S glass and a lead alkali-borosilicate glass.

Referring to FIG. 17, a high refractive index glass from the Ga$_2$S$_3$-family is coupled with a multi-component oxide glass. These are higher melting glasses compared to the glasses in the foregoing examples and can be matched rheologically with variety of borosilicate, silicate and phosphate glasses. For example, 70 Ga$_2$S$_3$-30 La$_2$S$_3$ with refractive index 2.5 can be matched with 22 SiO$_2$-54 B$_2$O$_3$-18 Na$_2$O-6 PbO with refractive index 1.53 (compositions are given in mole %). TEC=8.5×10$^{-6}$/° C.

Having described criteria for selecting appropriate materials for high index-contrast fiber waveguides, and identifying examples of such materials, we now turn our attention to specific examples of waveguide structures that provide radial confinement of optical radiation for a subset of frequencies propagating along a waveguide axis. In particular, we will now describe examples of optical fibers and photonic crystal fibers. In both cases, selecting waveguide materials to have high index contrast enhances the ability of the waveguides to radially confine guided modes.

Figure 18:
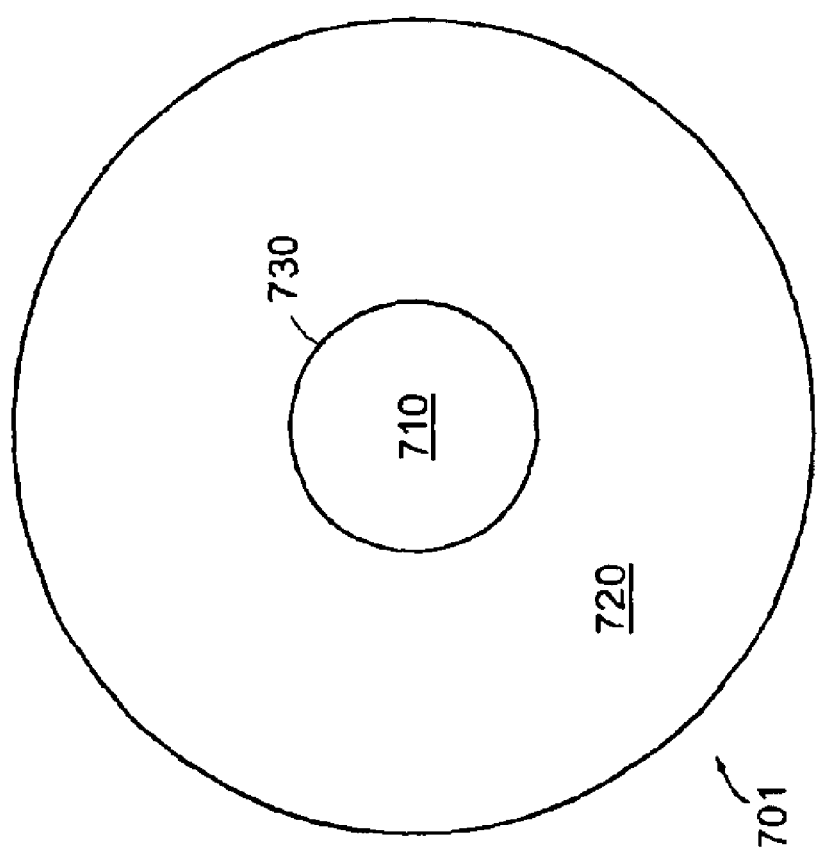
FIG. 18 is a cross-sectional view of an embodiment of a high index-contrast optical fiber.

Referring to FIG. 18, a high index-contrast optical fiber 701 includes a core 710 extending along a waveguide axis and a cladding layer 720 surrounding core 710. Core 710 includes a high index material, e.g., a chalcogenide glass. Cladding layer 720 includes a low index material, e.g., an oxide glass and/or a halide glass. Hence, core 710 has a higher refractive index, n$_H$, than the cladding layer 720 refractive index, n$_L$. Certain optical rays introduced into the core are totally-internally reflected at the core-cladding interface, and are substantially confined to the core. The wavelength and number of these guided modes depends on the structure of optical fiber 701, and the properties of the core and cladding materials. Typically, the number of modes an optical fiber can support increases with the diameter of the core.

The high index-contrast between core 701 and cladding layer 720, optical fiber 701 corresponds to large numerical aperture (NA), which is defined as NA=(n$_H^2$-n$_L^2$)$^{1/2}$. For example, optical fiber 701 can have a NA of at least 0.7 (e.g., at least about 0.8, at least about 0.9, at least about 1.0, at least about 1.1, at least about 1.2, at least about 1.3).

In some embodiments, core 710 can have a small diameter. Due to the large index difference between the core and the cladding, high index-contrast optical fibers can effectively confine modes to small-diameter cores. For example, core 710 can have a diameter less than 10 microns, e.g., less than 5 microns, less than 3 microns, less than 2 microns, less than 1 micron, less than 0.5 microns, less than 0.25 microns.

High index-contrast fiber waveguides also include waveguides than radially confine light to an optical path by a means other than total internal reflection (TIR). For example, high index-contrast fiber waveguides can include fiber waveguides that confine light to a core region using a confinement region having a radially-modulated refractive index. Examples of such fiber waveguides include photonic crystal fibers, such as Bragg fibers.

Figure 19:
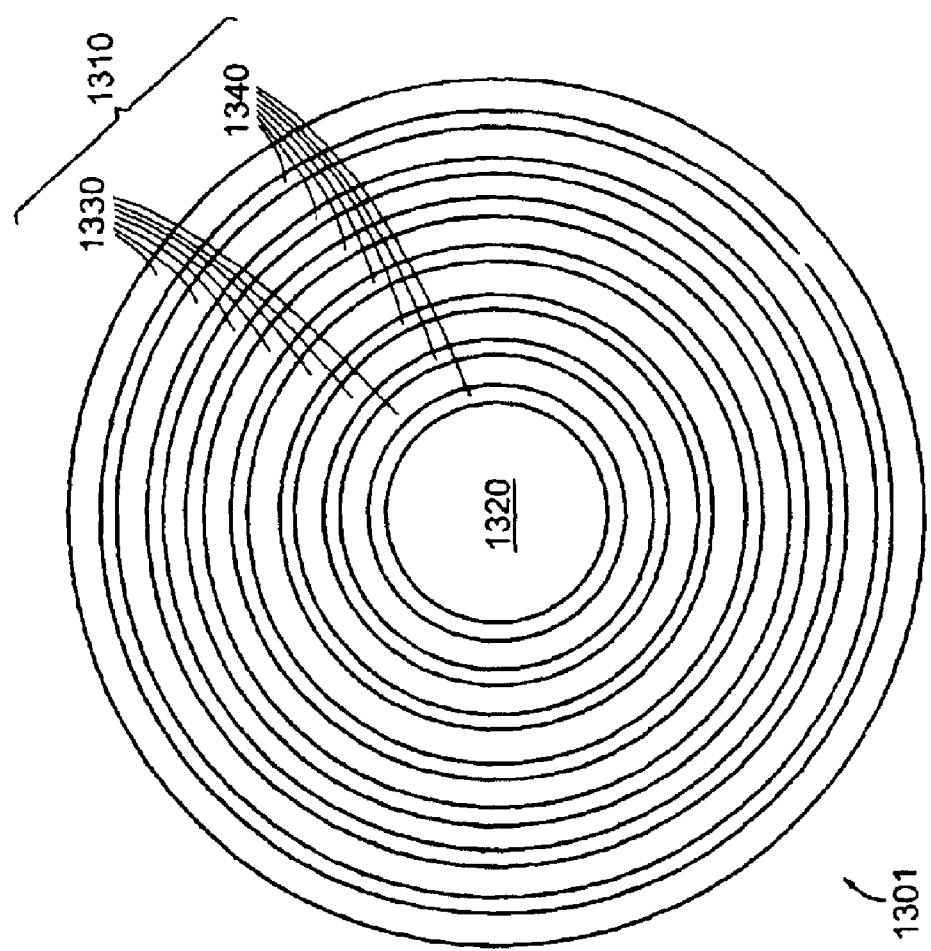
FIG. 19 is a cross-sectional view of an embodiment of a high index-contrast photonic crystal fiber.

Referring to FIG. 19, a photonic crystal fiber 1301 includes a dielectric core 1320 extending along a waveguide axis and a dielectric confinement region 1310 (e.g., a multilayer cladding) surrounding the core. In the embodiment of FIG. 19, confinement region 1310 is shown to include alternating layers 1330 and 1340 of dielectric materials having different refractive indices. One set of layers, e.g., layers 1340, define a high-index set of layers having an index n$_H$ and a thickness d$_H$, and the other set of layers, e.g., layers 1330, define a low-index set of layers having an index n$_L$ and a thickness d$_L$, where n$_L$>n$_L$. For convenience only a few of the dielectric confinement layers are shown in FIG. 19. In practice, confinement region 1310 may include many more layers (e.g., twenty or more layers).

Typically, layers 1340 include a material having a high refractive index, such as the high index materials listed in the foregoing description. Such materials include e.g., chalcogenide glasses, heavy metal oxide glasses, and amorphous alloys. More generally, however, layers 1340 can be formed of any material or combination of materials having a sufficiently high refractive index and that are rheologically compatible with the material forming layers 1330. The material in each of layers 1340 can be the same or different.

Layers 1330 include a material having a low refractive index, such as the low index materials listed in the foregoing description, such as an oxide glass, a halide glass, or certain polymers. More generally, layer 1330 can be formed from any material or combination of materials having a sufficiently low refractive index and that are Theologically compatible with the material forming layers 1340. The material in each of layers 1330 can be the same or different.

In the present embodiment, core 1320 includes a solid dielectric material, such as a high index or low index glass. In general, however, core 1320 can include any material or combination of materials that are Theologically compatible with the materials forming confinement region 1310. In certain embodiments, core 1320 can include one or more dopant materials, such as those described above. Alternatively, core 1320 can be a hollow core. Optionally, the hollow core can be filled with a fluid, such as a gas (e.g., air, nitrogen, and/or a noble gas) or liquid (e.g., an isotropic liquid or a liquid crystal).

Photonic crystal fiber 1301 has a circular cross-section, with core 1320 having a circular cross-section and region 1310 (and layers therein) having an annular cross-section. In other embodiments, however, the waveguide and its constituent regions may have different geometric cross-section such as a rectangular or a hexagonal cross-section. Furthermore, as mentioned below, core and confinement regions 1320 and 1310 may include multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 1320 and 1310, however, is defined by a change in index. The change may be caused by the interface of two different dielectric materials or by different dopant concentrations in the same dielectric material (e.g., different dopant concentrations in silica).

Dielectric confinement region 1310 guides EM radiation in a first range of wavelengths to propagate in dielectric core 1320 along the waveguide axis. The confinement mechanism is based on a photonic crystal structure in region 1310 that forms a bandgap including the first range of wavelengths. Because the confinement mechanism is not index-guiding, it is not necessary for the core to have a higher index than that of the portion of the confinement region immediately adjacent the core. To the contrary, core 1320 may have a lower average index than that of confinement region 1310. For example, core 1320 may be air, some other gas, such as nitrogen, or substantially evacuated. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 1320 may include a porous dielectric material to provide some structural support for the surrounding confinement region while still defining a core that is largely air. Accordingly, core 1320 need not have a uniform index profile.

The alternating layers 1330 and 1340 of confinement region 1310 form what is known as a Bragg fiber. The alternating layers are analogous to the alternating layers of a planar dielectric stack reflector (which is also known as a Bragg mirror). The annular layers of confinement region 1310 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of wavelengths (or inversely, frequencies) in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for wavelengths both below and above the gap, allowing light to be confined even in lower-index regions (in contrast to index-guided TIR structures, such as those described above). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to be excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 1310 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index-contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega = c\beta$, where $\omega$ is the angular frequency of the radiation, β is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in Published PCT application WO 00/22466, the contents of which are incorporated herein by reference.

When alternating layers 1330 and 1340 in confinement region 1310 give rise to an omnidirectional bandgap with respect to core 1320, the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflection in a planar geometry of at least 95% for all angles of incidence ranging from 0° to 80° and for all polarizations of EM radiation having frequency in the omnidirectional bandgap. Furthermore, even when photonic crystal fiber 30 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index-contrast of the two layers) and the lowest-index constituent of the photonic crystal.

In additional embodiments, the dielectric confinement region may include photonic crystal structures different from a multilayer Bragg configuration. For example, rather than the Bragg configuration, which is an example of a one-dimensionally periodic photonic crystal (in the planar limit), the confinement region may be selected to form, for example, a two-dimensionally periodic photonic crystal (in the planar limit), such as an index modulation corresponding to a honeycomb structure. See, for example, R.F. Cregan et al., Science 285, p. 1537–1539, 1999. An example of a photonic crystal fiber having a honeycomb structure is photonic crystal fiber 4401, which includes a confinement region 4410 and a core 4420. Confinement region 4410 includes holey portions 4411 arranged to provide the honeycomb structure. Furthermore, even in a Bragg-like configuration, the high-index layers may vary in index and thickness, and/or the low-index layers may vary in index and thickness. The confinement region may also include a periodic structure including more than two layers per period (e.g., three or more layers per period). Moreover, the refractive index modulation may vary continuously or discontinuously as a function of radius within the confinement region. In general, the confinement region may be based on any index modulation that creates a photonic bandgap.

In the present embodiment, multilayer structure 1310 forms a Bragg reflector because it has a periodic index variation with respect to the radial axis. A suitable index variation is an approximate quarter-wave condition. It is well-known that, for normal incidence, a maximum band gap is obtained for a "quarter-wave" stack in which each layer has equal optical thickness λ/4, or equivalently $d_H/d_L = n_L/n_H$, where d and n refer to the thickness and index, respectively, of the high-index and low-index layers. These correspond to layers 1340 and 1330, respectively. Normal incidence corresponds to β=0. For a cylindrical waveguide, the desired modes typically lie near the light line ω=cβ (in the large core radius limit, the lowest-order modes are essentially plane waves propagating along z-axis, i.e., the waveguide axis). In this case, the quarter-wave condition becomes:

$$\frac{d_H}{d_L} = \frac{\sqrt{n_L^2}}{\sqrt{n_H^2}}$$

Strictly speaking, this equation may not be exactly optimal because the quarter-wave condition is modified by the cylindrical geometry, which may require the optical thickness of each layer to vary smoothly with its radial coordinate. Nonetheless, we find that this equation provides an excellent guideline for optimizing many desirable properties, especially for core radii larger than the mid-bandgap wavelength.

Some embodiments of photonic crystal fibers are described in U.S. Ser. No. 10/057,258, entitled "LOW-LOSS PHOTONIC CRYSTAL WAVEGUIDE HAVING LARGE CORE RADIUS," to Steven G. Johnson et al., filed Jan. 25, 2002.

Both high index-contrast optical fibers and high index-contrast photonic crystal fibers can provide enhanced radial confinement of guided modes to a fiber core. This is due to the large refractive index mismatch between portions of the fiber, e.g., between the core and the cladding in optical fibers, or between the alternating layers of a Bragg fiber. Due to the large index mismatch, the electric field intensity of guided modes decays very rapidly outside the core. Accordingly, most of the guided mode energy resides in the core. This means that high index-contrast fiber waveguides can exhibit lower losses associated with guided mode energy propagating in the cladding. Moreover, this also means that a large proportion of the guided mode energy remains confined to the core even for very small core sizes (e.g., cores having a diameter of less than 2 μm, such as 1 μm or less). Of course, high index contrast fiber waveguides can also have large core diameters, such as 10 μm or more.

A measure of the radial extent of a guided mode is mode field diameter (MFD). MFD is characteristic of the distribution of the irradiance, i.e., the optical power, across the end face of a single-mode fiber. According to K. Peterman in "Constraints for fundamental-mode spot size for broadband dispersion-compensated single-mode fibers," *Electron. Lett.* 19, pp. 712–714, September 1983, MFD can be expressed mathematically as:

$$MFD = 2\sqrt{2} \left[ \frac{\int_0^\infty |\psi(r)|^2 r\,dr}{\int_0^\infty \left|\frac{d\psi(r)}{dr}\right|^2 r\,dr} \right]^{\frac{1}{2}},$$

where, ψ(r) is the amplitude of the near field of the fundamental mode at radius r from the axis of the fiber. For a Gaussian power distribution in a single-mode optical fiber (i.e., $$\psi(r) = \psi_0 \exp\left(-r^2 \big/ \left(\frac{1}{2} MFD\right)\right),$$

the mode field diameter is that at which the electric and magnetic field strengths are reduced to 1/e of their maximum values, i.e., the diameter at which power is reduced to $1/e^2$ of the maximum power, because the power is proportional to the square of the field strength.

Accordingly, in some embodiments, high index-contrast fiber waveguides have a small MFD, such as a MFD of no more than 5 µm (e.g., no more than 4 µm, no more than 3 µm, no more than 2 µm, no more than 1 µm, no more than 0.5 µm), as measured by W. T. Anderson in "Consistency of measurement methods for mode field results in a single-mode fiber," *J. Lightwave Technology* 2, 2, p. 191–197 (1984).

Figure 20:
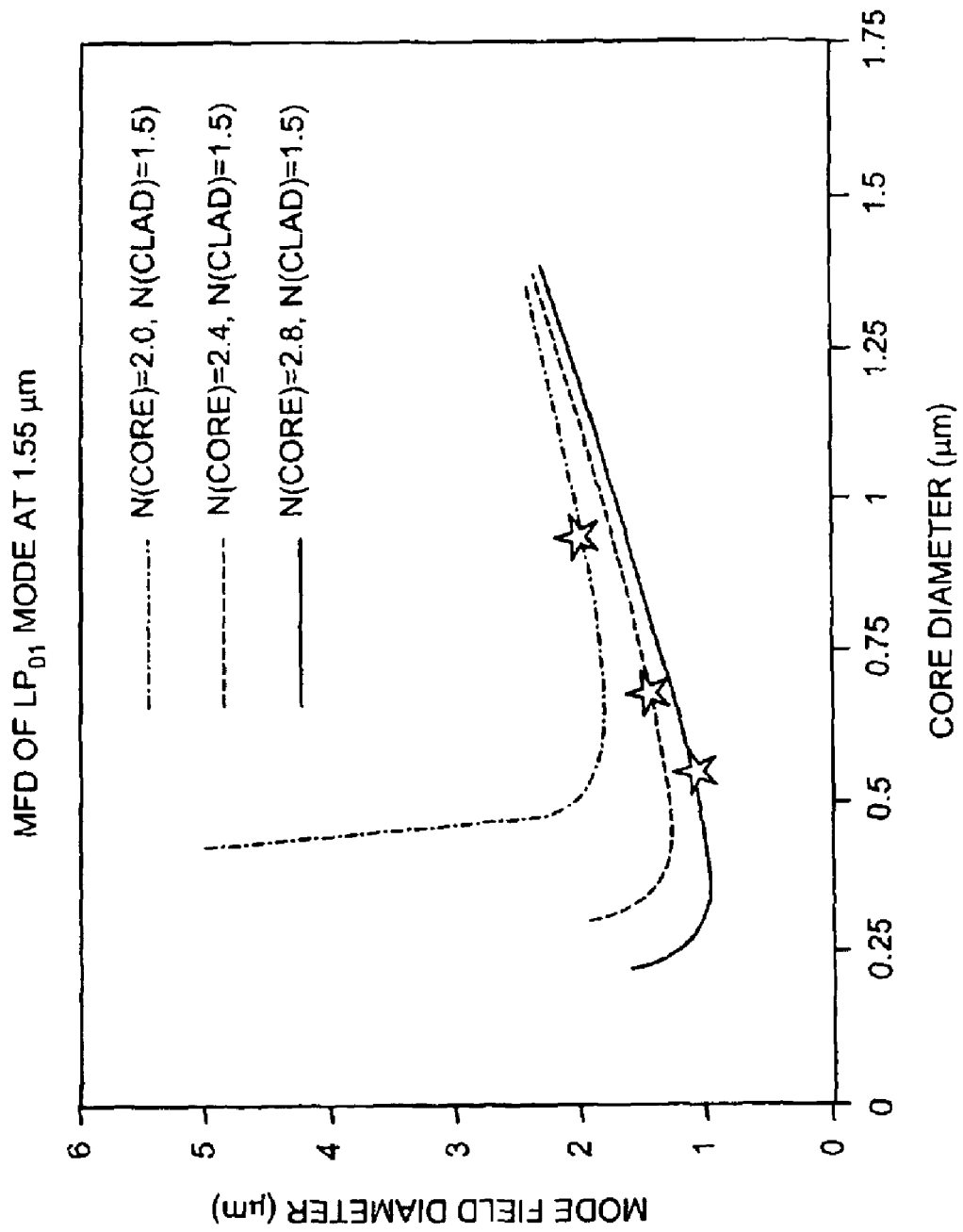
FIG. 20 is a plot showing the relationship between Mode Field Diameter and core diameter for different values of core refractive index in a high index-contrast optical fiber.

Referring to FIG. 20, for optical fibers, the MFD varies as a function of index-contrast between the core and the cladding layer. This is demonstrated by calculating the MFD of the lowest order ($LP_{01}$) mode for different core and cladding index values as a function of core radius. Note that according to e.g., H. Nishihara et al. in *Optical Integrated Circuits*, McGraw-Hill Book Company, New York (1985), there is no cut-off for the fundamental mode in a symmetric (e.g., cylindrically symmetric) waveguide structure, so in a symmetric fiber the $LP_{01}$ mode is always supported. In the current example, the cladding refractive index, $n_L$, is taken as 1.5, and the core refractive index, $n_H$, is varied. When the core diameter is very small (e.g., less than 0.2 µm), confinement of the mode to the core is poor and the MFD is large. As the core size is increased, the MFD decreases to a minimum value, which is a function of the core and cladding refractive indices. For example, the minimum MFD for core indices of 2.8, 2.4, and 2.0 (having index-contrasts of 46%, 36%, and 25%, respectively) are about 0.73, 0.92, and 1.27 µm, respectively. As the core radius is further increased, the MFD increases from its minimum value and the optical fiber starts supporting higher order modes. The single-mode cut off diameter for each fiber is shown in FIG. 20 as a star. As the difference between each curve illustrates, the minimum MFD for the fundamental mode increases as the index-contrast decreases.

Figure 21:
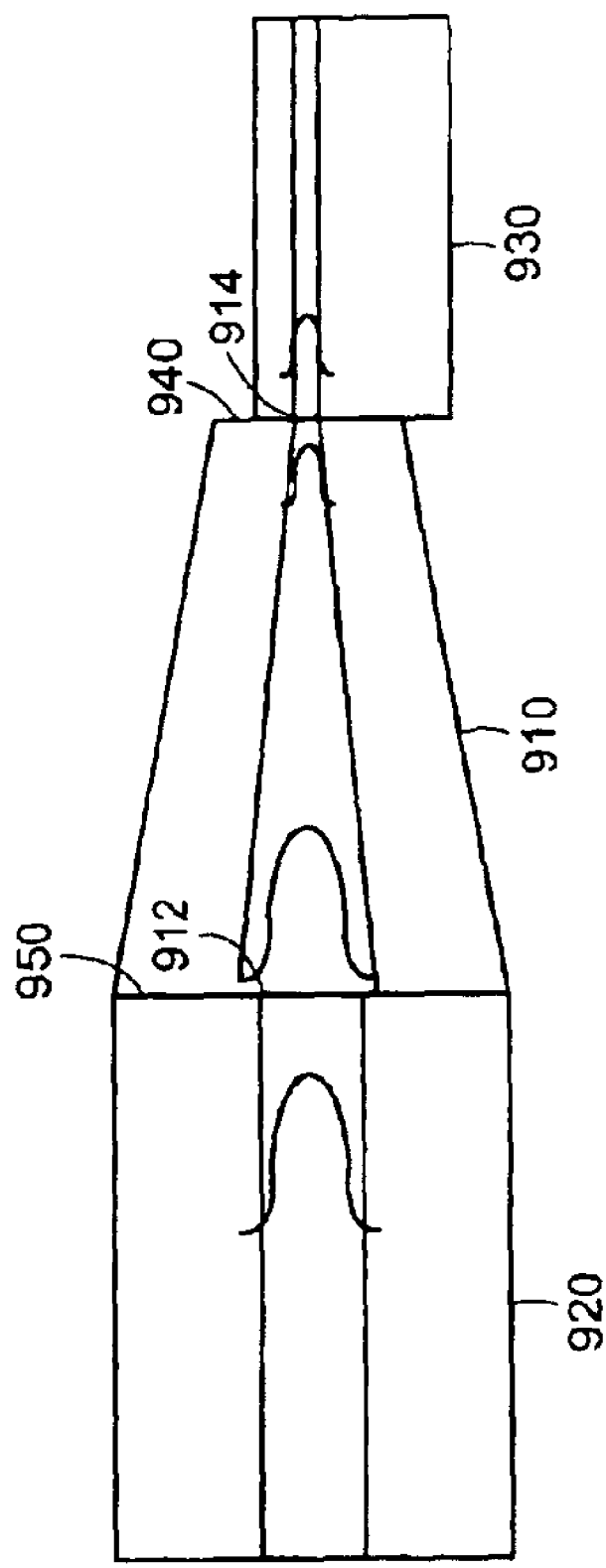
FIG. 21 is a schematic of an embodiment of a high index-contrast fiber waveguide for coupling light from an optical fiber into a integrated optical device.

High index-contrast fiber waveguides with small MFD's can be used to couple light from one optical device to another. For example, referring to FIG. 21, a tapered high index-contrast fiber waveguide 910 having a small MFD couples light from a silica fiber 920 into a photonic integrated circuit 930. Tapered high index-contrast fiber waveguide 910 is designed so that the fiber mode closely matches the silica fiber mode at one end 912, and the mode of photonic integrated circuit 930 at the other end 914. Interfaces 940 and 950 may be coated with an index-matching gel to further minimize reflection of the optical signal at each interface.

Currently, coupling fibers to photonic integrated circuits is usually achieved by directly "butt-coupling" the silica fiber to the facet of the integrated circuit. However, due to the often-large differences in mode size between the fiber and the circuit, this coupling can be inefficient. Losses due to this discrepancy in mode size can be alleviated to a degree by tapering the fiber, but the MFD cannot typically be reduced below the limit imposed by the refractive indices of the fiber materials. As a result, the silica fiber mode of a tapered fiber may still not be small enough to efficiently couple light from the fiber into many integrated optical devices, which can have sub-micron mode sizes. Use of a high index-contrast tapered fiber waveguide provides a smaller minimum MFD than a conventional silica fiber, and can potentially reduce losses associated with coupling light devices having different mode sizes.

In some implementations, use of a tapered high index-contrast fiber waveguide can replace conventional fiber couplings altogether. For example, a high index-contrast fiber waveguide can couple light directly from a light source, e.g., a laser light source, to a photonic circuit by pig-tailing the high-index fiber directly to the light source.

Referring again to FIGS. 18 and 19, optical fiber 701 has a homogenous core 710 and a single homogenous cladding layer 720. Also, photonic crystal fiber 1301 has a homogeneous core and confinement region 1310 includes homogeneous layers. More generally, however, high index-contrast fiber waveguides can have composite core structures and/or composite confinement regions/cladding structures. For example, a core may include portions having different refractive indices or may be a graded index core (e.g., a core having a refractive index profile that varies as a function of radius). Alternatively, or additionally, a confinement region/ cladding layer can include portions having different refractive indexes. For example, an optical fiber can include a holey cladding layer. In another example, a photonic crystal fiber can include a confinement region having a continuously varying radial refractive index profile (e.g., a sinusoidal refractive index profile).

Figure 22:
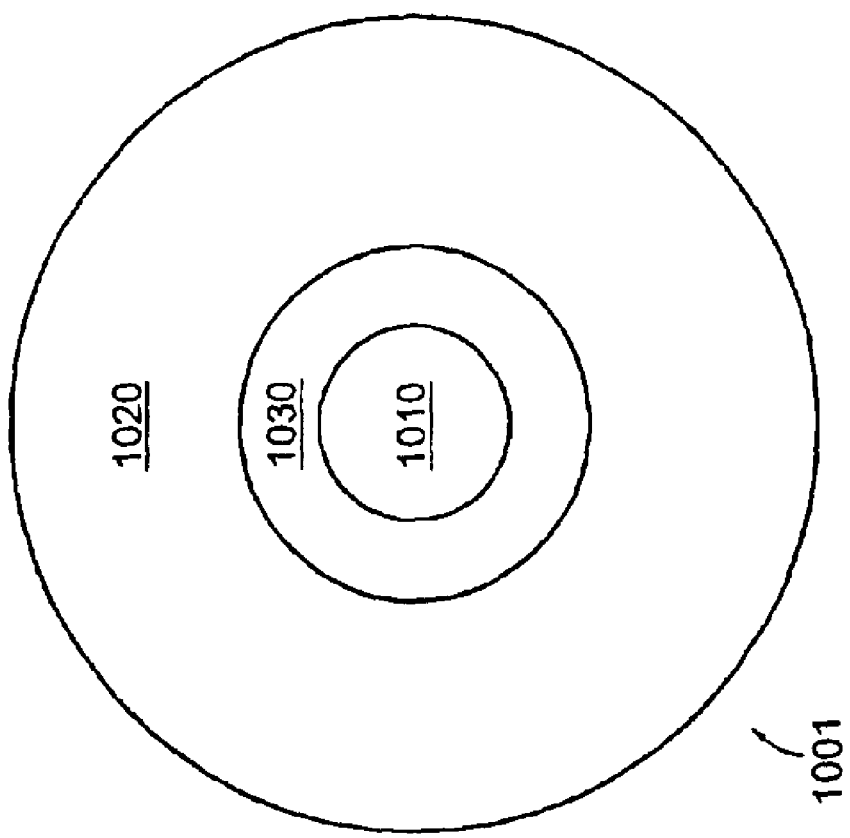
FIG. 22 is a cross-sectional view of an embodiment of a high index-contrast fiber waveguide including a dispersion tailoring region.

Additional portions or regions in the fiber waveguide allow tailoring of different fiber properties, such as dispersion, nonlinearity, and/or bend-sensitivity, depending on particular applications. For example, a high-index-contrast fiber waveguide can be designed for dispersion compensation applications (i.e., to have a high positive or negative dispersion). Referring to FIG. 22, a high index-contrast fiber waveguide 1001 includes a core 1010 and a cladding 1020 (e.g., a cladding layer in the case of an optical fiber, or a confinement region in the case of a photonic crystal fiber), surrounding core 1010. Included between core 1010 and cladding 1020 is a dispersion tailoring region 1030. The size and composition of the dispersion tailoring region is selected such that fiber waveguide 1001 has a specific dispersion characteristic. High index-contrast optical fibers can have large waveguide dispersions at selected wavelengths due to differences in confinement at different wavelengths.

Figure 23:
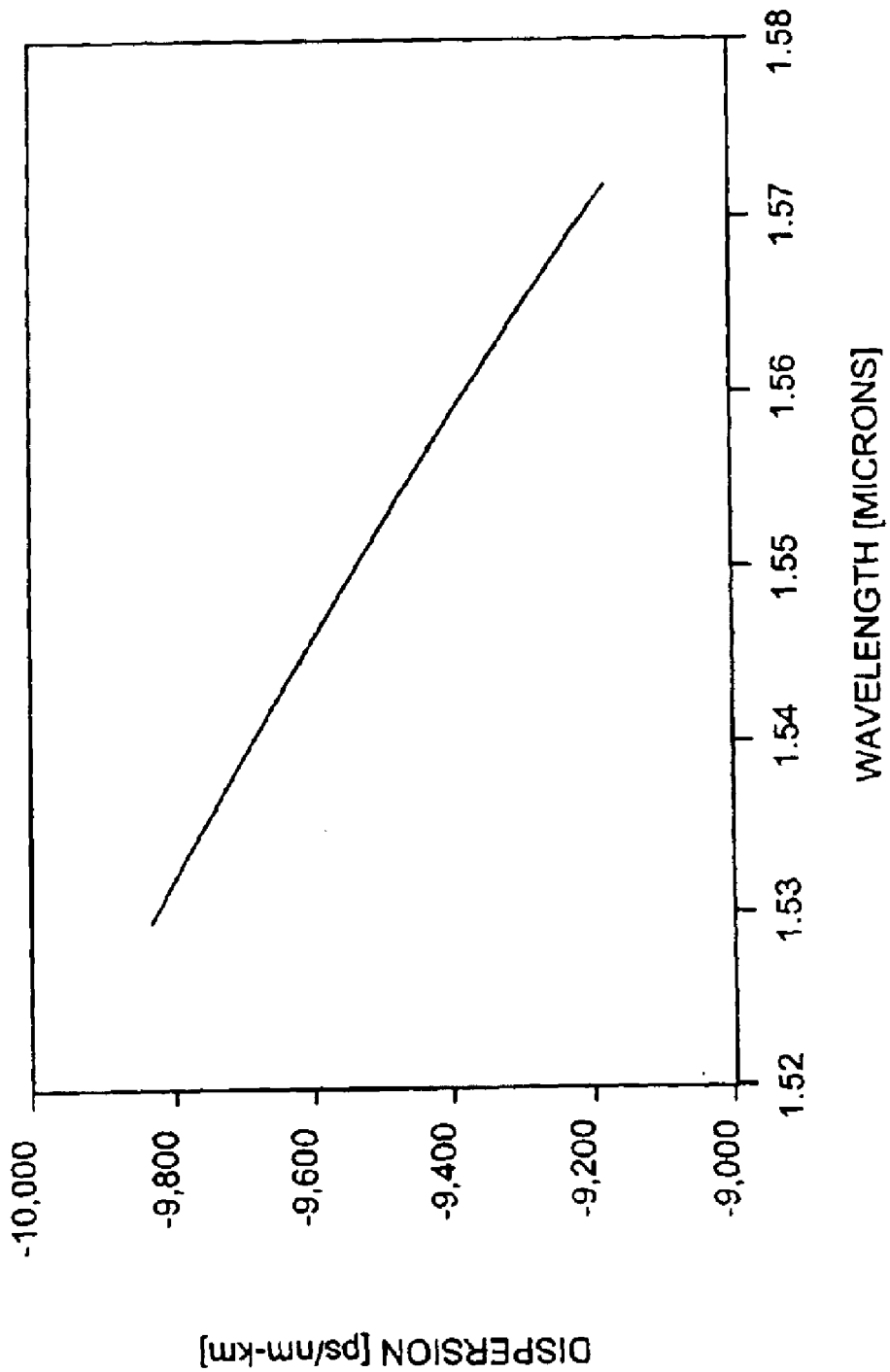
FIG. 23 is a plot of dispersion vs. wavelength for an embodiment of a high index-contrast optical fiber.

For example, high index-contrast optical fiber can have a large, negative dispersion. Referring to FIG. 23, theoretically, such a fiber can be designed to have a negative dispersion of greater than 9,000 ps/nm-km over a desired spectral region (in this case near 1.55 µm). In this example, the high index-contrast fiber waveguide is an optical fiber. The fiber's core has a refractive index 2.8 and a radius 0.1710 µm, the dispersion compensation region includes an inner layer surrounding the core and an outer layer surrounding the inner layer. The inner layer has a refractive index 1.5 and a radius 0.7645 µm, and the outer layer has a refractive index 2.4 and radius 0.8210 µm. The optical fiber cladding surrounding the outer layer has a refractive index 1.5.

Dispersion tailoring in photonic crystal fibers is described in U.S. Ser. No. 10/057,440 entitled "PHOTONIC CRYSTAL OPTICAL WAVEGUIDES HAVING TAILORED DISPERSION PROFILES," to Steven G. Johnson et al., filed Jan. 25, 2002.

Portions of high index-contrast fiber waveguides can be doped with any material or combination of materials capable of interacting with an optical signal in the core to provide e.g., amplification of the optical signal and/or frequency-up conversion of the optical signal. In fiber amplifier applications, for example, the fiber core can include one or more rare earth ion dopants (e.g., erbium ions, ytterbium ions, neodymium ions, holmium ions, dysprosium ions, and/or thulium ions).

Due to the enhanced radial confinement of guided modes in high index-contrast fiber waveguides, the optical energy density of these modes in small diameter core fibers can be large. Accordingly, high-index-contrast optical fibers can have an enhanced nonlinear response. Moreover, due to an enhanced nonlinear response, high-index-contrast optical fibers can be used in nonlinear optical devices, such as optical filters and all-optical switches. In particular, the third order nonlinear effect (also known as the Kerr coefficient) is directly proportional to the electric field intensity and hence inversely proportional to the modal area (provided the nonlinear coefficient and the total power coupled into the fiber are constant). For example, theoretically, the MFD of a high-index-contrast optical fiber having a homogeneous core with $n_H=2.8$ and a homogeneous cladding layer with $n_L=1.5$, can be as small as 0.73 μm for $\lambda=1.55$ μm. In contrast, a typical single-mode silica optical fiber has and MFD~10.4 μm for $\lambda=1.55$ μm. Hence, the modal area of the high-index-contrast optical fiber is $(0.73/10.4)^2$ or ~200 times smaller than that of a silica optical fiber. As a result, the nonlinear response of the high-index-contrast fiber is increased by about 200 times.

Moreover, for embodiments where the core is made of a nonlinear glass, such as a chalcogenide glass, an even greater nonlinear response is possible. For example, according to Cardinal et al., in "Non-linear optical properties of chalcogenide glasses in the system As—S—Se," *J. Non-crystalline Solids* 256–7, 353 (1999), and Harbold et al., in "Highly nonlinear As—S—Se glasses for all-optical switching," *Opt. Lett.* 27 (2), 119 (1992), the Kerr nonlinearity of chalcogenide glasses can be $1-2\times10^{-17}$ m$^2$/W, approximately 400 times larger than that of silica. Hence, a high index-contrast fiber can have a nonlinear optical response approximately 80,000× greater than a silica fiber equivalent (e.g., 200× due to the small MFD and 400× due to the higher nonlinear coefficient). Accordingly, high index-contrast optical fibers can be used in applications such as wavelength conversion via four-wave-mixing, second harmonic generation, and optical parametric generation. High-index-contrast optical fibers with enhanced non-linearity may also be used for low-power super-continuum generation, which has potential applications in spectroscopy, high-precision optical frequency metrology and wavelength division multiplexing. These applications are described by, e.g., Agrawal in *Nonlinear Fiber Optics*, Second Ed., Academic Press, San Diego (1995) and Coen et al., in "White-light supercontinuum generation with 60-ps pump pulses in a photonic crystal fiber," *Opt. Lett.* 26 (17), 1356 (2001).

In the foregoing description, we have discussed radial confinement of optical energy in high index-contrast fiber waveguides. It is also possible to axially confine optical energy in a high index-contrast fiber waveguide. Moreover, using axial confinement, it is possible create optical cavities in high index-contrast fiber waveguides. Furthermore, due to enhanced radial confinement and subsequent low energy loss due to radially leaked energy, optical cavities in high-index contrast fiber waveguides can be treated as one-dimensional cavities.

Optical energy can be axially confined in a high index-contrast fiber by providing an axial optical modulation in the fiber core. An axial optical modulation can be a modulation or variation in the refractive index and/or structure of the waveguide, wherein a characteristic length scale of the modulation, $\Lambda$, is on the order of the wavelength of light guided by the fiber, $\lambda$, measured in the fiber (e.g., $0.1\lambda \leq \Lambda \leq 100\lambda$). In some embodiments, the axial optical modulation causes an axial index modulation in the core and/or portion surrounding the core. Accordingly, the core includes regions of high index, $n_{core,H}$, and regions of low index, $n_{core,L}$. Typically, the axial index contrast, $$\frac{n_{core,H} - n_{core}}{n_{core,H}},$$

is at least 0.01%, such as 0.05%, 0.1% or more. In some embodiments, the axial index contrast can be more than 1%, more than 2%, more than 3%, more than 4%, more than 5%, such as 10% or more.

More generally, we can define an axial optical modulation amplitude, $A_{max}$, as $\max(A(r,\theta, z_1, z_2))$, where $$A(r, \theta, z_1, z_2) = \frac{n(r, \theta, z_1) - n(r, \theta,}{n(r, \theta, z_1)},$$

$\theta$ is the azimuthal angle, and z refers to the axial position. The maximum of A is evaluated for $|z_1-z_2|\leq 10$ and for r within the portions of the fiber. In general, $A_{max}$ (which we quote as a percentage) is equal to or greater than 0.002%. Depending on the application, $A_{max}$ can be reasonably small, such as less than about 0.1%, less than about 0.05%, less than about 0.01%. Alternatively, $A_{max}$ can large, such as greater than 0.5%, greater than 1%, greater than 2%, greater than 4%, greater than 5%, greater than 8%, greater than 10%, greater than 12%, greater than 15%, greater than 20%, greater than 50%, greater than 100%, greater than 150%, such as 175% or more.

An optical modulation along the waveguide axis can have a profound effect on the propagating electromagnetic waves in the fiber. Since the translational symmetry is destroyed, the momentum in the axial direction is no longer conserved. When the axial optical modulation is periodic, a Bloch wave solution appears with a corresponding conserved Bloch wave number. Finite fibers now exhibit propagating modes as well as exponentially decaying modes as observed in periodic dielectric structures (e.g., Bragg mirrors). In other words, for certain frequencies, the optical modulation reflects optical signals propagating in the fiber.

When this reflection is sufficiently strong, an axial optical modulation can cause a transmission bandgap for at least one operating mode for at least one frequency of an optical signal propagating in the fiber. The size of the transmission bandgap, $\Delta\Omega$ is given by $$\Delta\Omega = \frac{\Omega_1 - \Omega_2}{\frac{1}{2}(\Omega_1 + )},$$

where $\Omega_1$ and $\Omega_2$ are the top and the bottom transmission bandgap frequencies, respectively, measured at the 50% transmission intensity position on each bandgap edge. The transmission bandgap size for a fiber waveguide having an axial optical modulation can be determined empirically by measuring the transmission spectrum of the fiber in the region of the transmission bandgap.

Typically, periodic axial optical modulations in silica optical fibers can have a $\Delta\Omega$ from around 0.01% up to about 0.1%. In some embodiments, high index-contrast fiber waveguides can include a periodic optical modulation that provides a large transmission bandgap, e.g., more than 0.2%, more than 0.5%, more than 0.8%, more than 1%, more than 2%, more than 3%, more than 4%, more than 5%, more than 6%, more than 7%, such as 8% or more.

Figure 24:
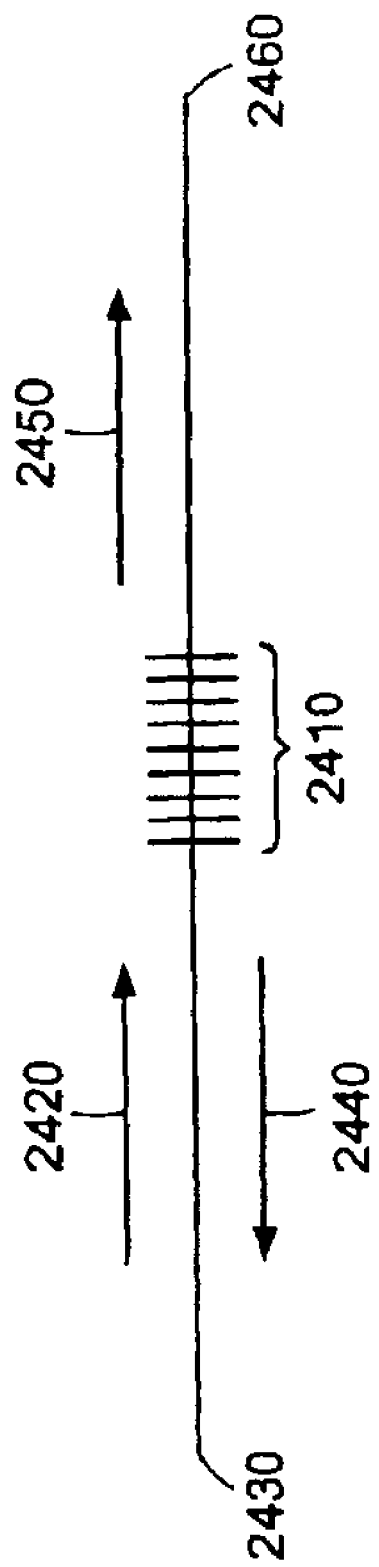
FIG. 24 is a schematic of a high index-contrast fiber waveguide having an axial optical modulation.

The effect of an axial optical modulation on an optical signal in a fiber waveguide is illustrated schematically in FIG. 24. A high index contrast fiber waveguide 2401 includes a periodic optical modulation 2410. An input signal

2420 including a component having a first frequency $\omega_1$, and another component having a second frequency $\omega_2$, enters fiber 2401 from input end 2430. Axial optical modulation 2410 opens a transmission bandgap for certain signal frequencies in fiber 2401. This bandgap includes frequency $\omega_1$, but does not include frequency $\omega_2$. Accordingly, axial optical modulation 2410 strongly reflects the component having frequency $\omega_1$, but only minimally affects the component having frequency $\omega_2$, which is substantially transmitted through optical modulation 2410. Thus, reflected signal 2440 having frequency $\omega_1$ exits fiber 2401 from input end 2430, while a transmitted signal 2450 having frequency $\omega_2$ exits fiber 2401 from an output end 2460, opposite input end 2430. Note that providing a second, similar optical modulation in fiber 2401 would create an optical cavity in the fiber. Optical cavities, also known as optical resonators, "trap" radiation having a certain frequency or range of frequencies by repeated reflections between two reflectors. Optical cavities are typically used to build up large field intensities with moderate power inputs. Optical cavities are the basis for many optical devices and will be discussed in the paragraphs that follow.

A screening test for an appropriate modulation can be performed by illuminating the modulated fiber with a broadband source and measuring of the transmission as a function of wavelength. The fiber should transmit certain frequency ranges while reflecting others. Moreover, an increase in the length of the optically modulated fiber (while keeping modulation period and modulation amplitude constant) should increase the intensity of the reflected wave exponentially.

While the optical modulation described in the foregoing example is periodic, an optical modulation can have any arbitrary z-dependence (i.e., axial dependence). For example, it can be periodic in z, or aperiodic in z. For example, an optical modulation can have a z-dependence whose period slowly changes as a function of the distance of propagation z. Such a modulation would locally provide a regular 1D photonic band-gap, but the properties of the band-gap would slowly change with the propagation distance. Alternatively, the period of modulation in z can be fixed, but the amplitude of modulation (its strength) can vary, such as for apodized fibers. The optical modulation can also be disordered, or even with fractal structure in z.

Figure 25:
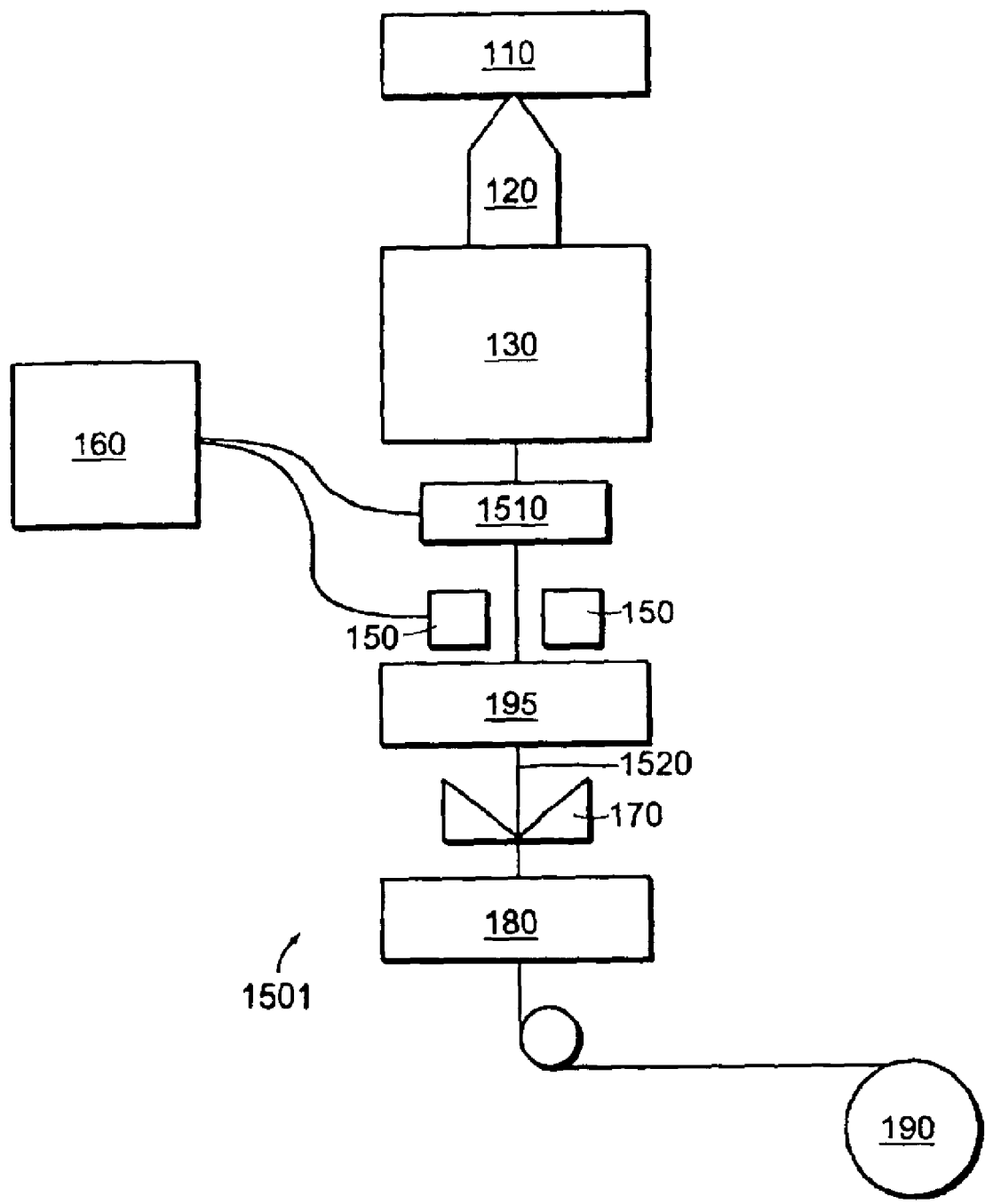
FIG. 25 is a schematic of an embodiment of a high index-contrast fiber waveguide drawing system including a fiber modulation device.

High index-contrast fiber waveguides having an optical modulation along the waveguide axis can be made in many ways. In some embodiments, the optical modulation can be formed in the fiber while the fiber is being drawn. Referring to FIG. 25, this can be achieved by perturbing the fiber or fiber preform during drawing. A fiber modulation device 1510 is included in a fiber drawing system 1501. Fiber modulation device 1510 perturbs the fiber by varying the drawing speed of fiber drawing system in a periodic fashion. As the diameter of fiber 1520 is related to the drawing speed, fiber modulation device 1510 introduces a periodic modulation in the diameter of fiber 1520.

Controller 160 communicates with fiber modulation device 1510 to vary the rate at which fiber is drawn based on data received from fiber monitoring system 150. Accordingly, controller 160 ensures that the period and magnitude of the optical modulation in fiber 1520 are controlled to be within a specified range.

In general, a fiber or fiber preform can be perturbed during drawing by varying other parameters, such as pressure, both inside (in the case of hollow core or holey fibers) and/or outside the fiber. For example, ultrasonic transducers can be used to quickly vary pressure surrounding a still viscous fiber. In another example, the pressure inside the core of a hollow fiber can be changed as a function of time by periodically compressing the gas in the corresponding hollow region in the preform. Such a periodic compression can create a modulation of fiber along the waveguide axis. In some embodiments, local temperature variations can also perturb the fiber. For example, a laser (or several lasers) having an operating wavelength selected to heat the fiber can be used to periodically illuminate the fiber during drawing. Each laser pulse locally heats the fiber, reducing the fiber viscosity. Accordingly, the heated portion of the fiber draws to a thinner diameter than the portions not heated by the laser thereby forming an optical modulation in the fiber.

Alternatively, an optical modulation can be formed in a photonic crystal fiber after the fiber has been drawn. For example, one can put same-radius spheres in the fiber core by e.g., dispersing the spheres in a liquid and drawing them into the core by capillary action and/or manipulating the spheres using optical tweezers. The diameter of these spheres can be similar to the diameter of the core. The spheres can be position in the core while the fiber is at an elevated temperature. Upon cooling from the elevated temperature, the confinement region shrinks onto the spheres and the spheres imprint the axial modulation into the core of the fiber. Optionally, one can remove the spheres afterwards, using a suitable solvent or acid. Alternatively, the spheres can be positioned in the fiber and swollen to fit snugly into the core by exposure to a swelling agent.

Figure 26:
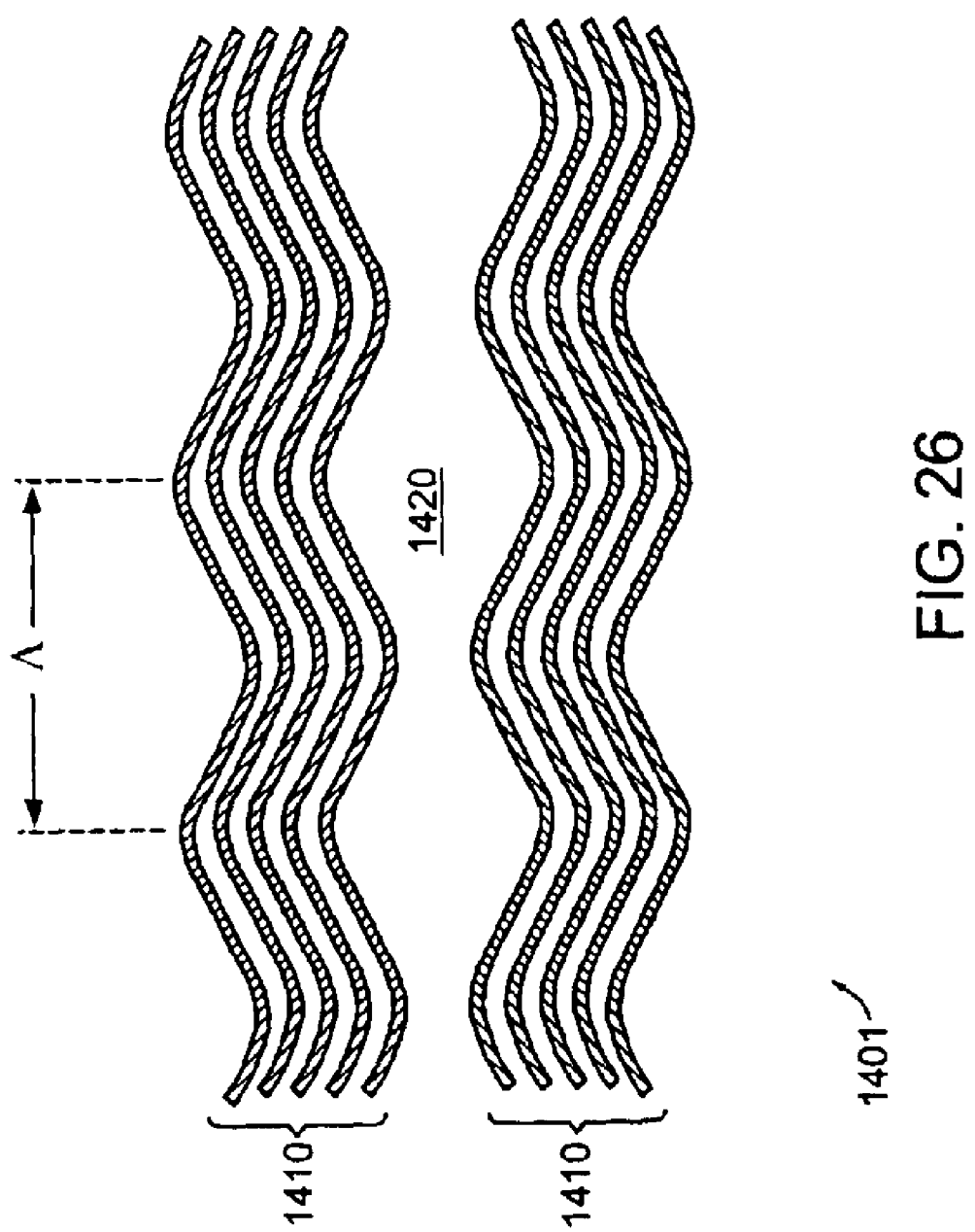
FIG. 26 is a sectional view of an embodiment of a high index-contrast photonic crystal fiber having an axial optical modulation.

The foregoing methods result in a structurally-formed optical modulation of the fiber waveguide. Referring to FIG. 26, such a photonic crystal fiber 1401 having a structurally formed optical modulation extending along the waveguide axis is shown. The diameter of confinement layer 1410 and core 1410 of photonic crystal fiber 1401 varies periodically as a function of position along the waveguide axis, providing the optical modulation in the fiber.

Methods for creating axial refractive index modulations in a high index-contrast fiber waveguide are also contemplated. For example, a fiber waveguide can be prepared having a core filled with block-copolymers, that self assemble into periodic structures in the z-direction. Such block co-polymers are described by e.g, Fink et al., in "Block Copolymers as Photonic Band Gap Materials", *J. Lightwave Technology* 17 (11), p. 1963–1969 (1999) (JLT IEEE-special issue on photonic crystals-invited paper). Such a fiber can be drawn from a preform having a block-copolymer core. Alternatively, the fiber can be drawn having a hollow core, and the core filled with the block co-polymer after drawing. In another example, a fiber having a hollow core can be filled with opals (self-assembly spheres) to create a real 3D photonic band gap structure inside the fiber core. Moreover, if one starts with a fiber with a hollow core, one can deposit one additional innermost layer of a polymer in the core (e.g., a UV curable polymer), and illuminate it with two interfering light beams. In areas of sufficiently light high-intensity, the polymer will cross link rendering it insoluble. The non-cross-linked or weakly cross-linked polymer can then be dissolved with solvents, leaving an axial optical modulation. Another method for forming a refractive index optical modulation involves placing spheres in the hollow core of a fiber as described above. The spheres themselves provide an axial refractive index modulation without further treatment of the fiber.

One can also create a desired axial optical modulation the way Bragg gratings are commonly implemented in optical fibers. The core and/or cladding can include a photosensitive material or dopant. Illuminating the fiber with two interfering ultra-violet beams on the fiber from the side periodically imprints the doping levels in the fiber, resulting in a modulation of the refractive index in an axial direction along the fiber. The process by which the refractive index of a glass is changed by exposure to radiation of the appropriate wavelength is known as "photo-darkening." The refractive index of chalcogenide glasses can exhibit an unusually strong response to certain illumination. For example, Ramachandran et al. reported a photo-induced refractive index change of ~5% (see, e.g., "Low loss photoinduced waveguides in rapid thermally annealed films of chalcogenide glasses," *Appl. Phys. Lett.* 74 (1), 13 (1999).

Figure 27A:
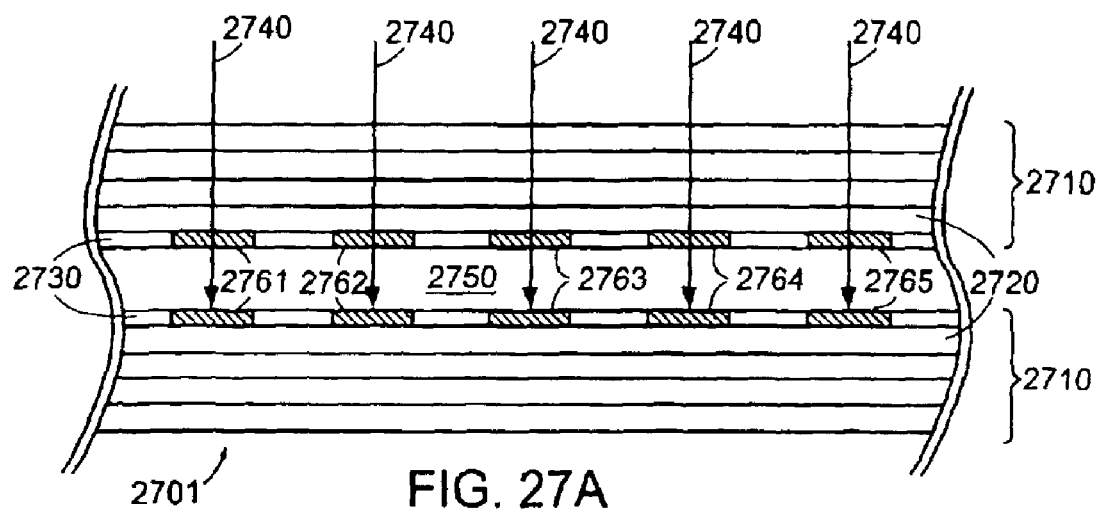
FIGS. 27A–27C is a series of schematics of steps in forming an axial optical modulation in a hollow high index-contrast fiber waveguide.
Figure 27B:
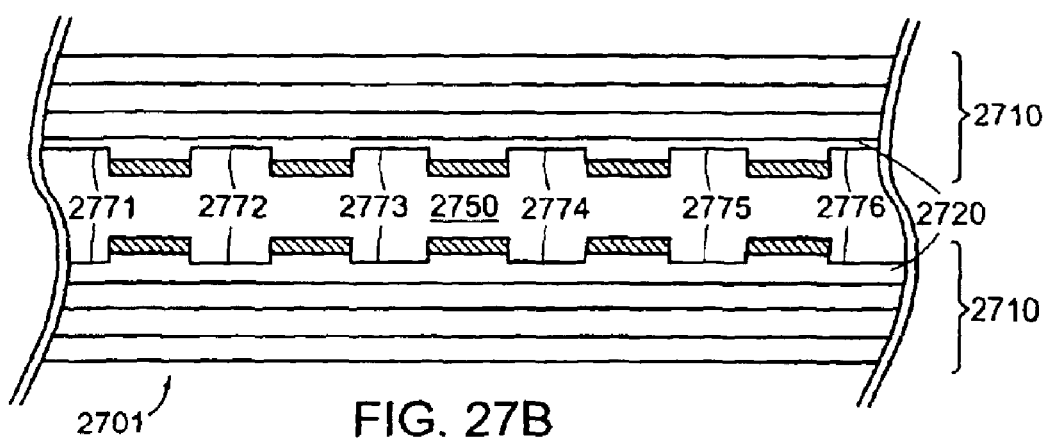
Figure 27C:
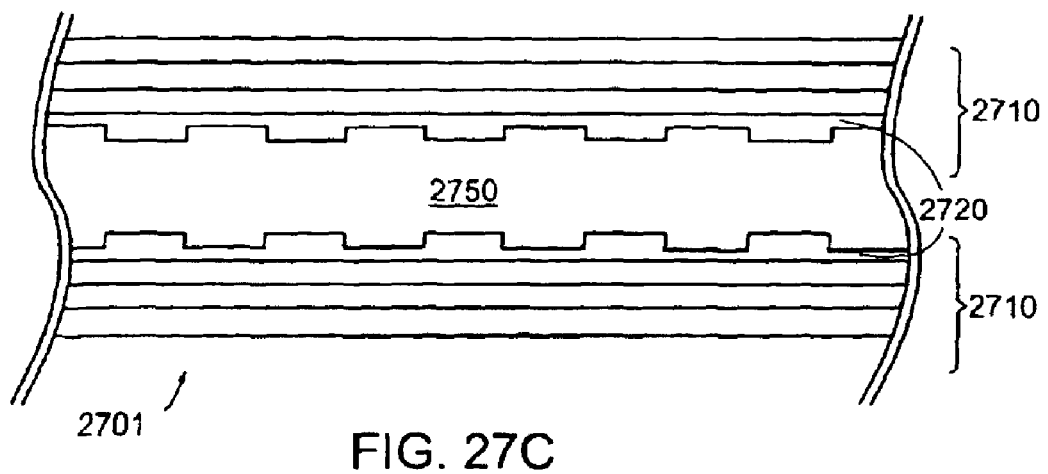

In some embodiments, lithographic methods can be used to create an axial optical modulation in a fiber waveguide. For example, the hollow portions of a fiber waveguide, e.g., the core of a hollow photonic crystal fiber, can be coated with a photosensitive material, such as a photoresist, as shown in FIGS. 27A–27C. Referring to FIG. 27A, an innermost layer 2720 of a confinement region 2710 of a hollow Bragg fiber 2701 is coated with a layer of a photoresist 2730. The fiber is illuminated with a periodic light pattern 2740. The light forming the light pattern has a wavelength that initiates a reaction in exposed portions 2761–2765 of photoresist layer 2730, but is away from the Bragg reflection band of the layers of confinement region 2710 so that it can penetrate confinement region 2710. Next, core 2750 is flushed with a developer that removes portions of photoresist layer 2730 minimally exposed to periodic light pattern 2740, leaving only portions 2761–2765. Referring to FIG. 27B, the core is then flushed with an etchant that removes portions 2771–2776 of innermost layer 2720 not still coated with photoresist 2730. Referring to FIG. 27C, optionally, core 2750 is finally flushed with a cleaner that removes remaining portions 2661–2665 of photoresist layer 2730, leaving a Bragg fiber having an axial optical modulation. Note that in implementations where innermost layer 2720 is a chalcogenide glass, the etchant can be a base (e.g., ammonia, potassium hydroxide, sodium hydroxide).

As previously mentioned, in some embodiments, an axial optical modulation in high index-contrast fiber waveguides can create a large bandgap in the fiber waveguide. Moreover, a large bandgap can enhance the axial confinement of an optical signal in a high index-contrast fiber waveguide. This is analogous to the enhanced radial confinement afforded by a high index-contrast fiber waveguide. Enhanced axial confinement can provide optical cavities with extremely small modal volumes. Moreover, optical cavities with extremely small modal volumes can be useful in device applications. A discussion of examples of such cavities and devices follows.

Figure 28:
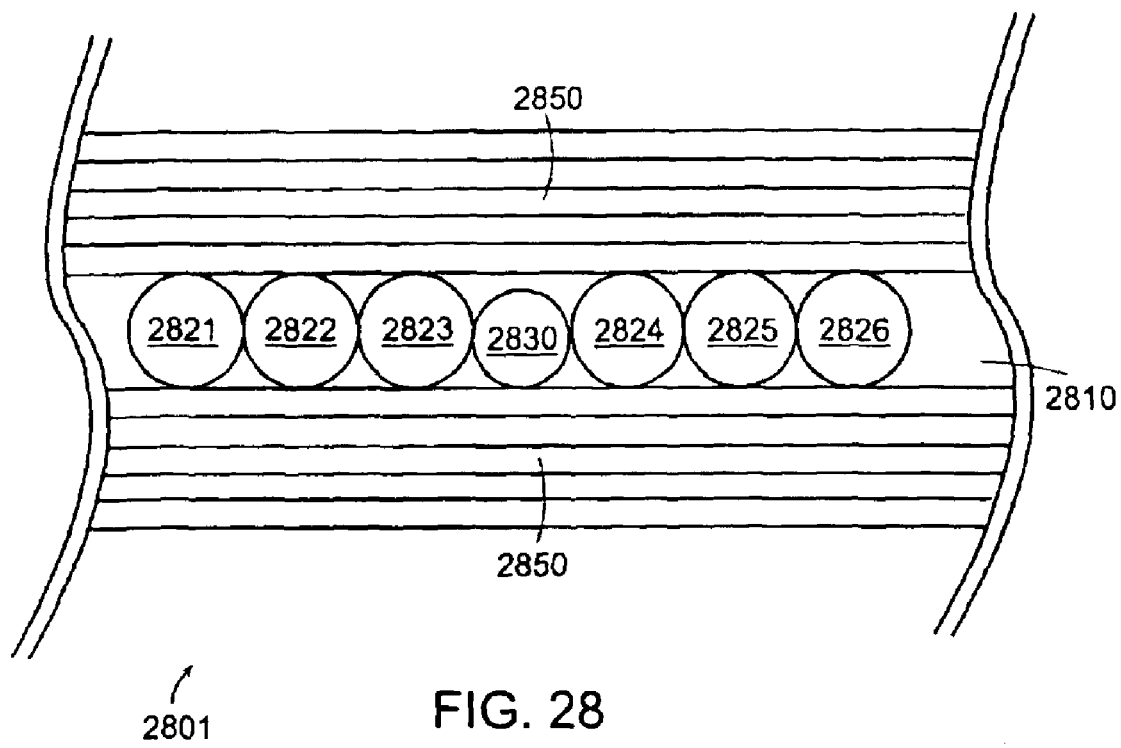
FIG. 28 is a schematic of an embodiment of an optical cavity formed in a high index-contrast fiber waveguide.

Referring to FIG. 28, the hollow core 2810 of a photonic crystal fiber 2801, surrounded by a confinement region 2850, is filled with identical spheres 2821–2826. Spheres 2821–2826 are identical in size and composition. Note that while only six identical spheres are shown in FIG. 28, core 2810 can be filled with any number of spheres (e.g., 10 or more, 20 or more, 100 or more). A smaller sphere 2830, is positioned amongst identical spheres 2821–2826. Spheres 2821–2826 and 2830 modulate the average refractive index of the core as a function of axial position. As spheres 2821–2826 are identical, the axial optical modulation is spatially periodic and the modulation amplitude is constant. However, smaller sphere 2830 causes a defect in the period optical modulation, and creates an optical cavity in fiber 2801. While sphere 2830 causes a defect due to being smaller in size than identical spheres 2821–2826, other differences between the spheres can also create an optical cavity. For example, differences in sphere composition and/ or shape can create an optical cavity. Moreover, in other implementations more than one non-identical sphere can be positioned in the core to create an optical cavity. Furthermore, any of spheres 2821–2826 and 2830 need not be spherical at all. More generally, optical cavities can be formed in a fiber waveguide by any axial optical modulation that gives rise to one or more resonant modes for an optical signal propagating in the fiber.

Figure 29:
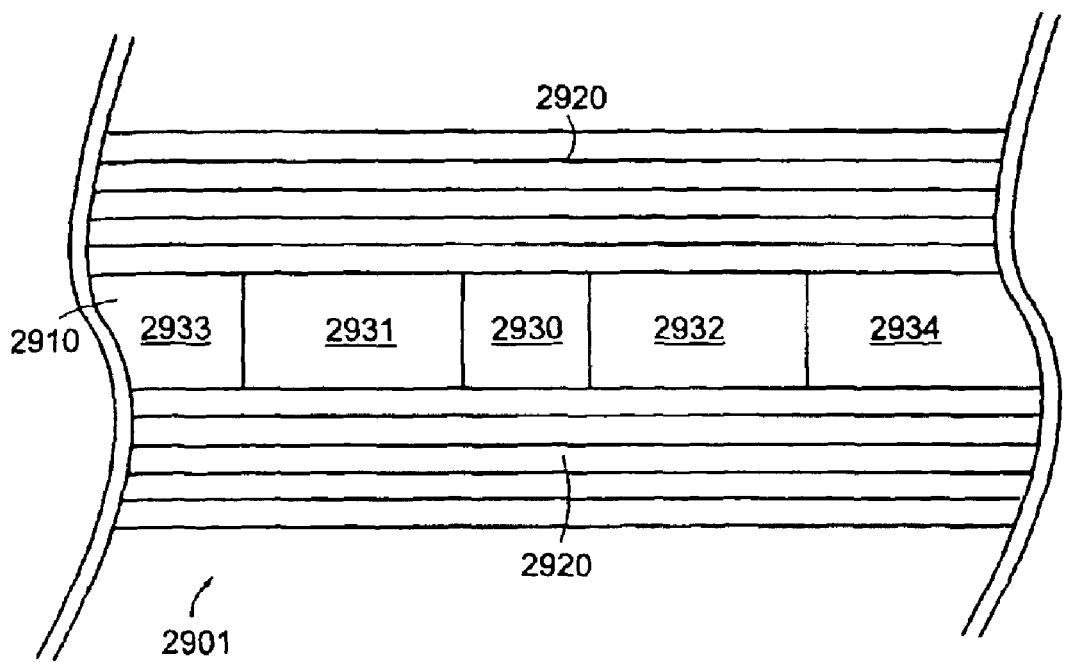
FIG. 29 is a schematic of another embodiment of an optical cavity formed in a high index-contrast fiber waveguide.

For example, referring to FIG. 29, a fiber waveguide 2901 includes a core 2910 and is surrounded by a confinement region 2920. Core 2910 includes regions 2930–2934 where adjacent regions have different refractive indices. Accordingly, fiber waveguide 2901 includes an axial optical modulation. In this implementation, regions 2931 and 2932 have the same refractive index $n_a$, while regions 2930, 2933, and 2934 have the same refractive index, $n_b$, different from $n_a$. $n_a$ can be greater than or less than $n_b$. Region 2930 forms an optical cavity in fiber waveguide 2901, as it can support at least one resonant mode. While FIG. 29 depicts regions 2930–2934 as discontinuous regions, in other implementations adjacent regions may be more continuous. For example, the average refractive index of core 2910 can vary continuously or discontinuously as a function of axial position.

Figure 30:
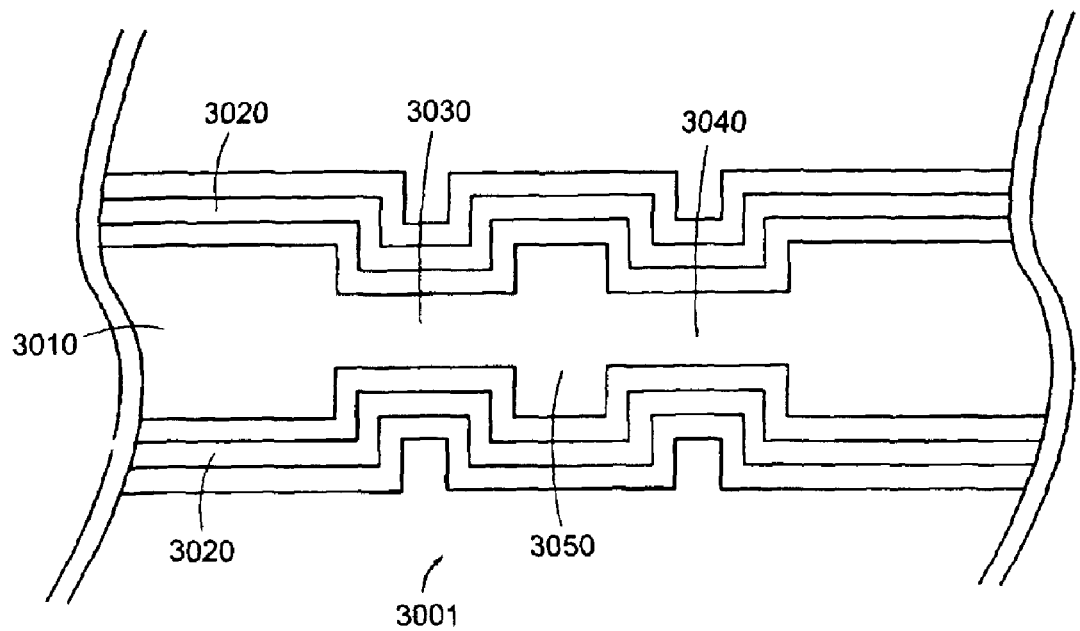
FIG. 30 is a schematic of a further embodiment of an optical cavity formed in a high index-contrast fiber waveguide.
Figure 31:
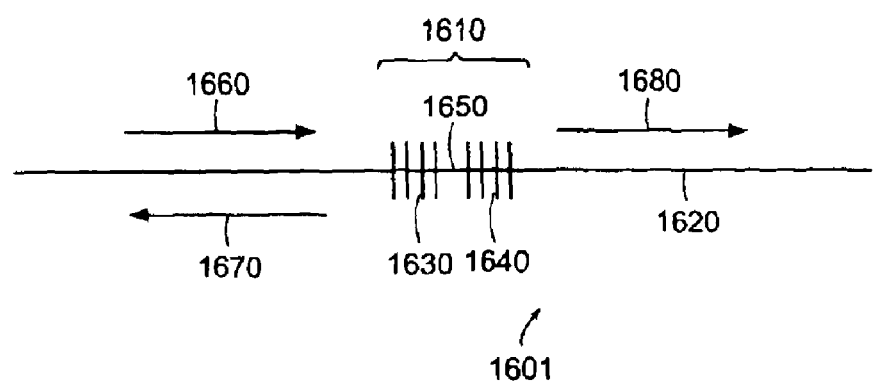
FIG. 31 is a schematic showing the operation of an optical cavity formed in a high index-contrast fiber waveguide.

A further example of an optical cavity in a fiber waveguide is shown in FIG. 30. A photonic crystal fiber 3001 includes a core 3010 and a confinement region 3020 surrounding core 3010. Fiber 3001 includes two regions 3030 and 3040 having a smaller diameter, compared other regions of fiber 3001. Regions 3030 and 3040 create an axial optical modulation in fiber 3001, which forms an optical cavity in region 3050. Of course, while fiber waveguide 3001 has discontinuous variations in fiber diameter, the fiber diameter can also be continuously varied. Moreover, while regions of smaller diameter are shown, in other implementations fibers can include regions of greater diameter than adjacent fiber regions.

Figure 32:
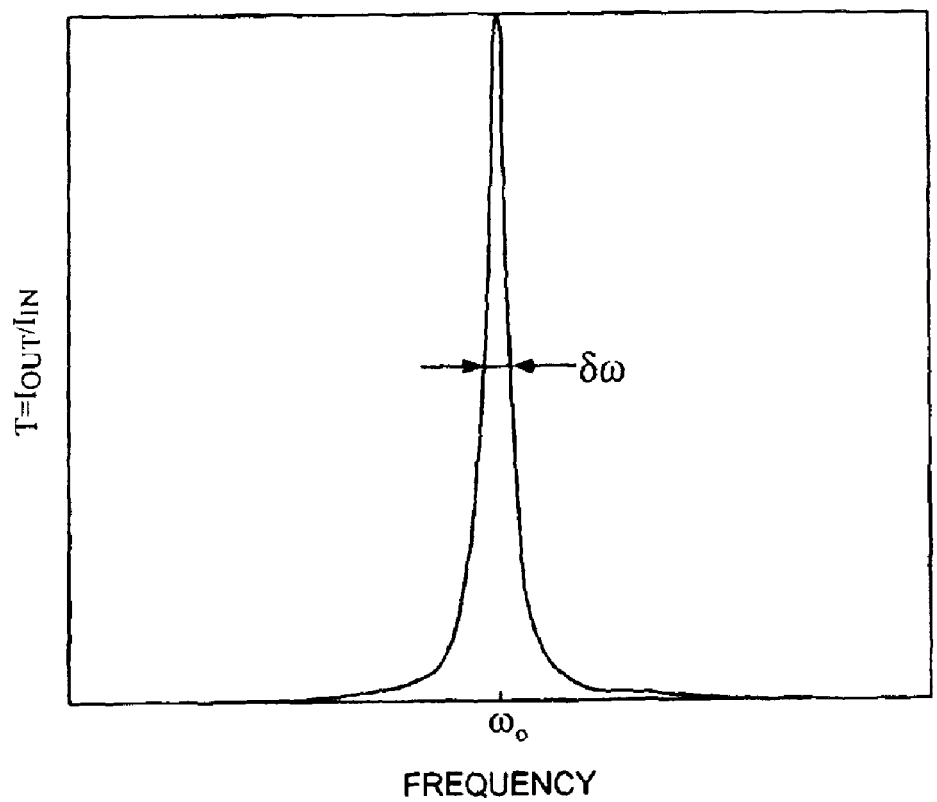
FIG. 32 is a plot of filter transmission as a function of frequency for an optical filter.

In some embodiments, high index-contrast fiber waveguides having optical modulations along the waveguide axis can form optical filters. Referring to FIG. 32, an optical filter 1601 includes a Fabry-Perot oscillator 1610 formed in a high-index contrast fiber waveguide 1620 (e.g., a high index-contrast optical fiber or photonic crystal fiber). Fabry-Perot oscillator 1610 is formed from two Bragg gratings 1630 and 1640 in fiber waveguide 1620. Bragg gratings 1630 and 1640 are formed from optical modulations in fiber 1620. The space between Bragg gratings 1630 and 1640 forms an optical cavity 1650. The period and amplitude of Bragg gratings 1630 and 1640 are selected so the gratings reflect light in a range of frequencies, centered around $\omega_0$ (where $\omega_0 = \lambda_0/c$, c is the speed of light).

Optical filter 1601 functions as follows. An input signal 1660, having a frequency $\omega$ (where $\omega = \lambda/c$) is incident on Bragg grating 1630 from the left. For most input signal frequencies within the reflection band of Bragg grating 1630, optical filter 1601 reflects most of incident input signal 1660 as reflected signal 1670. However, for a certain narrow range of frequencies close to the resonant frequency of the cavity, input signal 1660 efficiently couples into cavity 1650. A cavity signal (not shown) oscillates back and forth between Bragg gratings 1230 and 1240 before being coupled out of cavity 1650 as output signal 1680. At the cavity's resonant frequency the substantially all of the input signal is transmitted by optical filter 1601.

Figure 33:
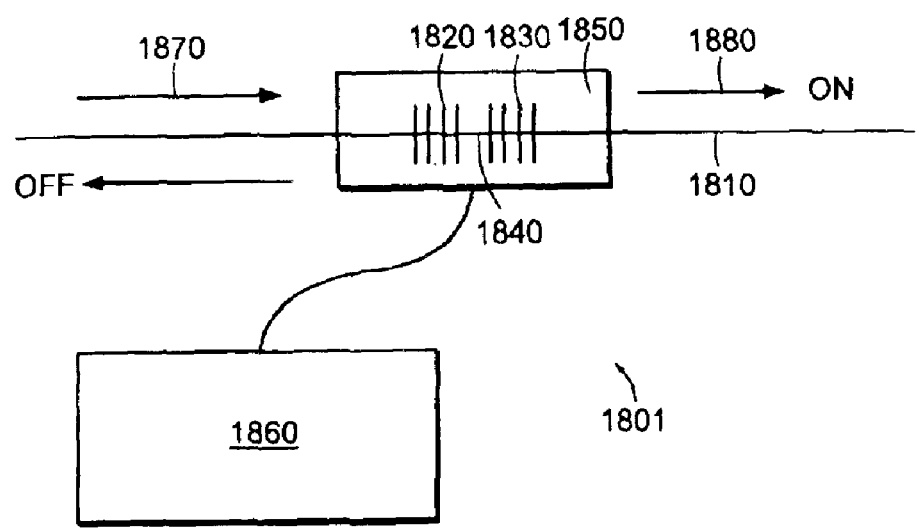
FIG. 33 is a schematic of an optical switch.

The time the cavity signal spends inside cavity 1650 before coupling out of the cavity as output signal 1680 can be expressed as $\Delta t \approx Q$, where Q is the quality factor of the cavity. The quality factor can be expressed as $Q=\omega_0/\delta$, where $\delta\omega$ is the spectral width of the cavity. T is the period of the carrier light ($T=2\pi/$). Referring to FIG. 33, theoretically, close to the carrier frequency, such devices will have a Lorentzian-like transmission spectrum. For a left-right symmetric cavity that supports only a single resonant mode in the frequency range of interest, the transmission is peaked at 100% (neglecting radiation losses). The transmission bandwidth, $\delta\omega$, is defined as the full-width-at-half-maximum.

In some embodiments, due to enhanced radial confinement (which prevents radial losses) and due to enhanced axial confinement (which prevents axial losses), optical cavities formed in high index-contrast fiber waveguides can have a high Q value. For example, such optical cavities can have a Q of at least 300 (e.g., at least 400, at least 500, at least 600, at least 750, at least 1,000, at least 1,200) such as 10,000 or more, like about 100,000 or about 200,000.

Alternatively, or additionally, optical cavities formed in high index-contrast fiber waveguides can have small modal volumes, such as less than about 500 $\lambda^3$, e.g., less than about 200 $\lambda^3$. In some embodiments, the modal volume can be smaller than 100 $\lambda^3$ (e.g., less than 10 $\lambda^3$, less than 5 $\lambda^3$, less than 3 $\lambda^3$, less than 2 $\lambda^3$, less than 1 $\lambda^3$). Here, $\lambda$ is the wavelength of the resonant light. As used herein, the modal volume, $V_{MODE}$, of an optical cavity is given by:

$$V_{MODE} = \frac{\int_{VOL.} \vec{E} \cdot \vec{D} d\ell}{(\vec{E} \cdot \vec{D})_{MA}},$$

where the volume of integration is over regions where the scalar product, $\vec{E}$, of the cavity mode's electric field vector, and electric displacement vector, is greater than or equal to one percent of $(\vec{E} \cdot \vec{D})_{MA}$, where $(\vec{E} \cdot \vec{D})_{MA}$ is the maximum value of $\vec{E}$ anywhere, i.e., $$\vec{E} \cdot \vec{D} \geq \frac{1}{100}(\vec{E} \cdot \vec{D})_{MA}.$$

In other words, by combining the enhanced radial and axial confinement properties of high index-contrast fiber waveguides, it is possible to confine optical energy to extremely small volume optical cavities having large Q.

For example, consider a high index-contrast photonic crystal fiber having alternating high-index and low-index cladding layers (see FIG. 19) where the bi-layer structure has a period a (where a is chosen below to tune the operation frequency), with layer indices 2.8 and 1.5, and thickness 0.3a and 0.7a for the high-index and low-index layers, respectively. Seven and a half cladding bilayers are used (starting and ending with high-index layers). The core has diameter 2.3a and is filled with air (index 1). Inside the core, reflectors are formed from a periodic sequence of dielectric slabs, with period 2a, index 1.2, thickness a (separated by a air). An air region in the center, of width 1.9a, forms an optical cavity. Nine periodic dielectric slabs are on either side of the optical cavity. Using a two-dimensional model, this cavity supports a resonant mode with frequency 0.3031 c/a, a Q of 1249, and a modal area of only about $20a^2$. This frequency is in "dimensionless" units of a/$\lambda$; e.g., a physical $\lambda$ of 1.55 $\mu$m, implies an a of 0.4698 $\mu$m, which sets the scale of the structure. Tuning the frequency and localization of the state can further increase Q. For example, a Q of 2900 is achieved at a frequency of 0.3060 c/a, by changing the index of the two slabs adjacent to the defect from 1.2 to 1.136. Note that these Q values are the limiting "radiation" Q values, determined by the leakage rate of the mode into the axial directions (i.e., they ignore radial losses). They therefore indicate an upper bound on an actual device Q. However, due to the enhanced radial confinement possible in high index-contrast fiber waveguides, we expect these values to be representative of three-dimensional systems.

In some embodiments, the optical cavity includes a material having a refractive index that varies in response to a stimulus. For example, referring to FIG. 33, an optical switch 1801 includes a pair of Bragg gratings 1820 and 1830 formed in a high index-contrast fiber waveguide. Bragg gratings 1820 and 1830 form an optical cavity 1840 in fiber waveguide 1810. Fiber waveguide 1810 includes an electro-optical material (e.g., a liquid crystal) in optical cavity 1840. Optical switch 1801 also includes an electrical module 1850, which, when activated by a controller 1860, applied an electric field across optical cavity 1840. The applied electric field changes the refractive index of the electro-optical material, which changes the effective optical length of optical cavity 1840 from the zero applied field cavity optical length.

Figure 34:
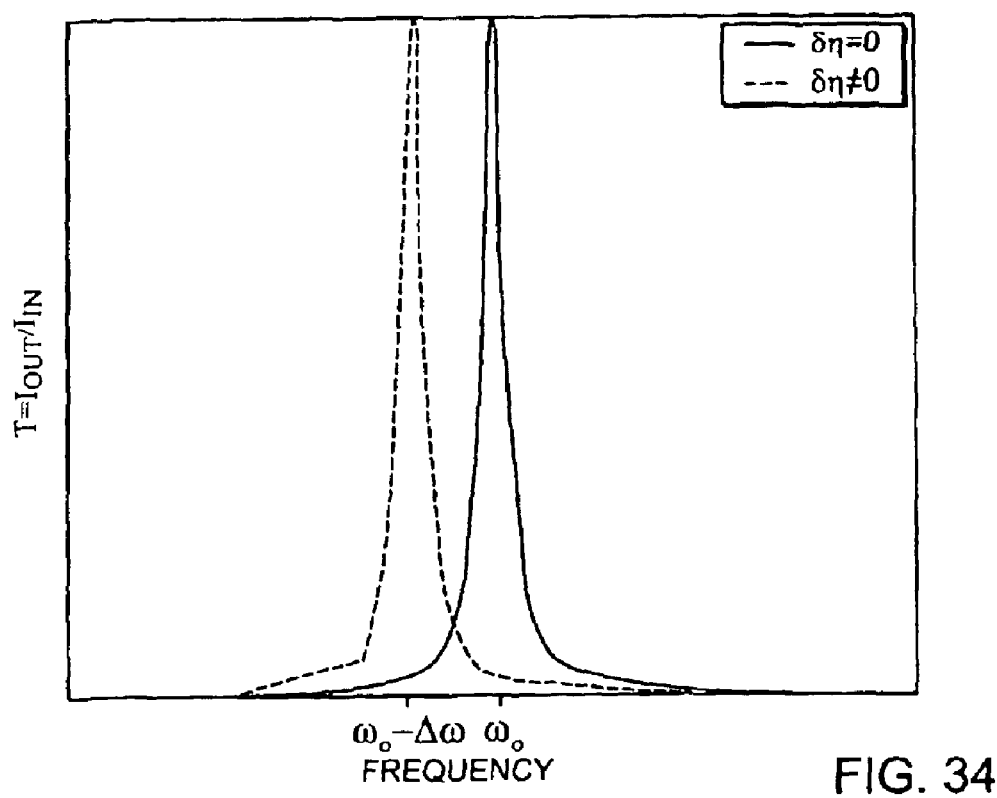
FIG. 34 is a plot of filter transmission as a function of frequency for two states in an optical switch.

The effective cavity length change shifts the resonant frequency of the cavity. Referring to FIG. 34, for a small refractive index change, $\delta n$, the transmission curve shifts linearly to higher or lower frequencies, depending on the sign of refractive index change $\delta n$. Theoretically, the frequency shift, $\Delta\omega$, of the peak transmission frequency, $\omega_0$, can be expressed as:

$$\frac{\Delta\omega}{\omega_0} = \kappa \frac{\delta n}{n_0},$$

where $n_0$ is the initial refractive index of the material in the cavity, and $\kappa$ is a constant factor that depends on the particular geometry of the system. In general, $\kappa$, wherein a cavity having $\kappa=1$ will experience the largest shift in resonant frequency for a given change in refractive index. Such a result is achieved when a large fraction of the resonant mode energy is tightly confined in the region of shifted index.

In the present embodiments, the induced change of refractive index, $\delta n$, is large enough so that $\Delta\omega > \delta$, and the refractive index change can be used for optical switching. Referring again to FIG. 33, optical switch 1801 functions as follows. Suppose an input signal 1870 has carrier frequency $\omega_0$. For no applied external stimulus, this frequency matches the transmission frequency of optical cavity 1840 and the signal exits as an output signal 1880. Accordingly, the switch is turned ON. Upon application of an external stimulus, however, the refractive index changes, shifting the transmission frequency to $\omega_0 \pm$. Accordingly, the optical switch reflects input signal 1870, and the switch is turned OFF.

In the foregoing embodiment, the fiber includes an electro-optical material (i.e., a material that changes refractive index as a function of applied electric field. More generally, an optical switch (or other device) can include any active material, such as a Kerr medium, or other nonlinear material. On activation, a stimulus (e.g., an external electric or magnetic field, a change in temperature, or an input signal of sufficient power) causes the refractive index of the active material to change by an amount $\delta n$. This refractive index change alters the length of the optical path in the cavity, which effectively changes the length of the cavity, and switches the device from one optical state to another.

In some implementations, the optical signal can itself act as the stimulus to modify the refractive index of the cavity material. For example, the cavity material can be a Kerr medium, for which $\delta n \propto E^2$, where I is the local intensity of the light. This arrangement can provide a bi-stable optical device. In other words, for certain input signal powers and carrier frequencies, the output signal power can have more than one value (e.g., two values). In some embodiments, such devices can exhibit optical bi-stability at an input signal power of no more than $10^8$ W/Q$^2$ (e.g., no more than $10^7$ W/Q$^2$, no more than $10^6$ W/Q$^2$, no more than $10^5$ W/Q$^2$, no more than $10^4$ W/Q$^2$), where power is in units of Watts per Q-factor squared.

Figure 35:
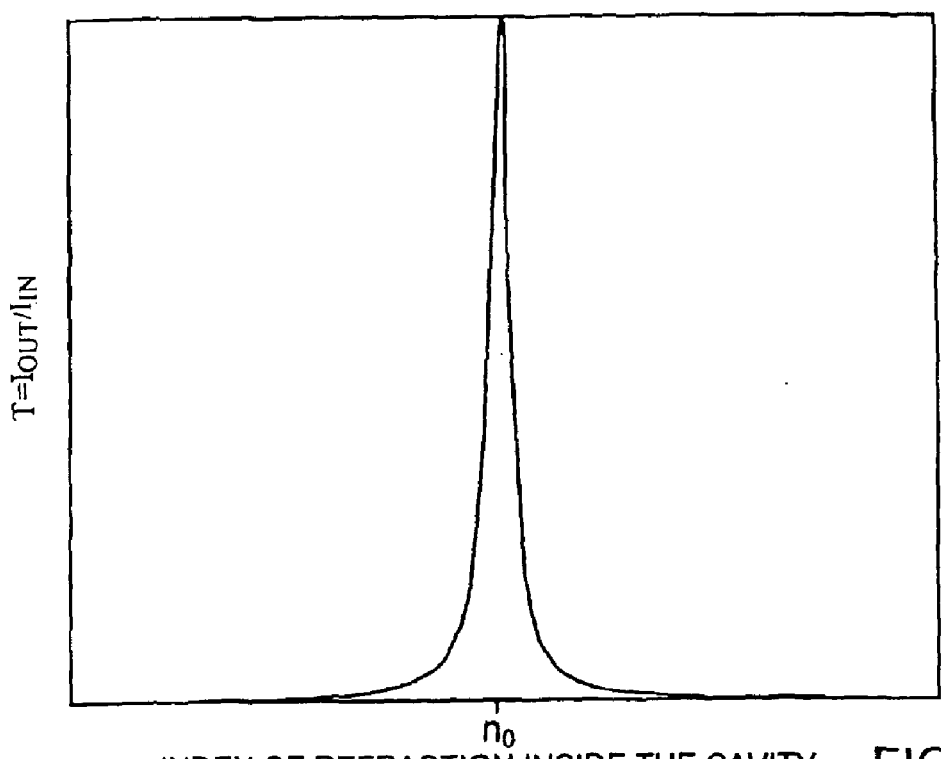
FIG. 35 is a plot of transmission as a function of the refractive index inside the cavity of an optical device.
Figure 36:
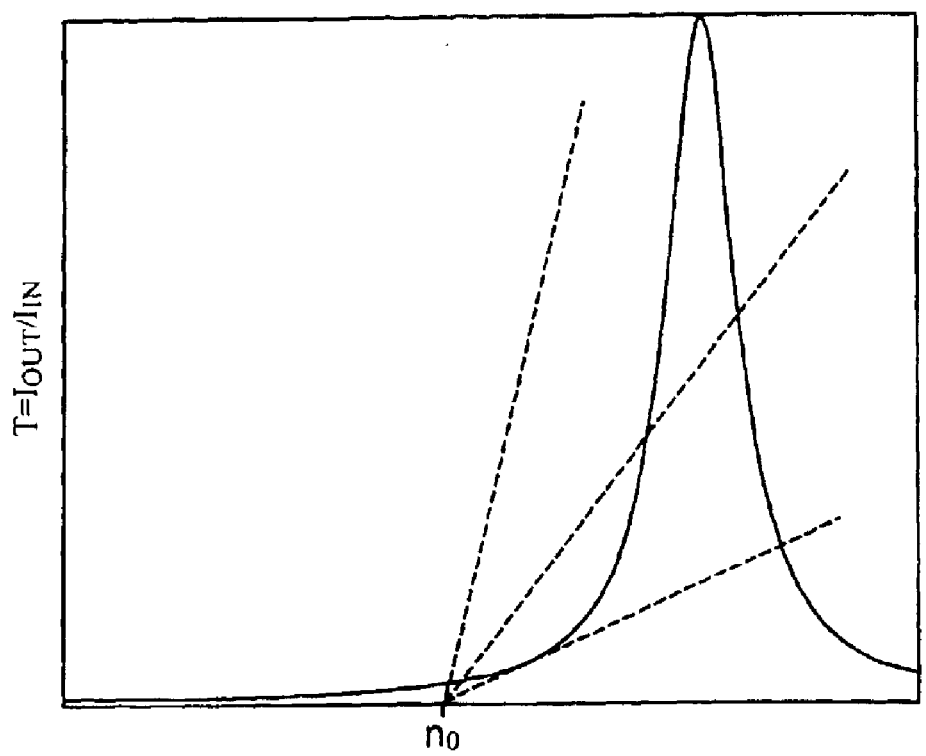
FIG. 36 is a plot of transmission as a function of the refractive index inside the cavity of a bi-stable optical device and curves representing the linear relationship between the refractive index inside the cavity and the product of transmission and input signal intensity.

Referring to FIG. 35, we analyze such a Kerr nonlinear cavity as follows. Theoretically, for a single carrier frequency, $\omega_0$, the transmission curve of the cavity will be a Lorentzian-like function of $n_C$, the refractive index of the cavity. The relationship between the input and output intensities, $I_{OUT}(I_{IN})$, can be solved in a self-consistent manner as follows. For each value of $I_{IN}$, we look for a corresponding value for $I_{OUT}$. Note than while the current discussion is refers to input and output intensities, it can be convenient to refer to input and output power (e.g., steady state power). The transmission vs. refractive index curve in FIG. 36 provides one constraint on possible $I_{OUT}$ values. Another constraint comes from the fact that for any given refractive index, n, and carrier frequency $\omega_0$, the energy stored inside the cavity is always proportional to $I_{OUT}$, where the constant of proportionality is given by the geometry of the system and is generally independent of the signal. Now, for an optical cavity having Bragg reflectors having high reflectivity, r, so that 1−r is small and Q is large, the electric field inside the cavity can be modeled as a combination of a wave propagating to the left and a wave propagating to the right. Since r is maximally 1, these two waves have almost the same intensity, which is just $I_{OUT}/(1-r)$. The total energy stored inside the cavity is now a linear function of the input and output intensity, and thus $n_C$ is a linear function of $I_{OUT}$ due to the Kerr effect: $n_C = n_{C0} + \alpha I_{OUT}$, where a is some constant. $I_{OUT} = T I_I$, and therefore (for fixed $I_{IN}$), we get another constraint on T as a function of $n_C$:

$$T = \frac{(n_C - c)}{\alpha I_{IN}}$$

Referring to FIG. 35, to find $T(I_{IN})$, we plot these two constraints together, and the solution is obtained as the point of intersection between the two curves. For a bi-stable optical device, we design the cavity so that the peak transmission frequency is slightly detuned for a given $\omega_0$ when $\delta n = 0$ (i.e., $n_{C0}$ is a marginally too small to provide a cavity with maximum transmission at $\omega_0$).

Figure 37:
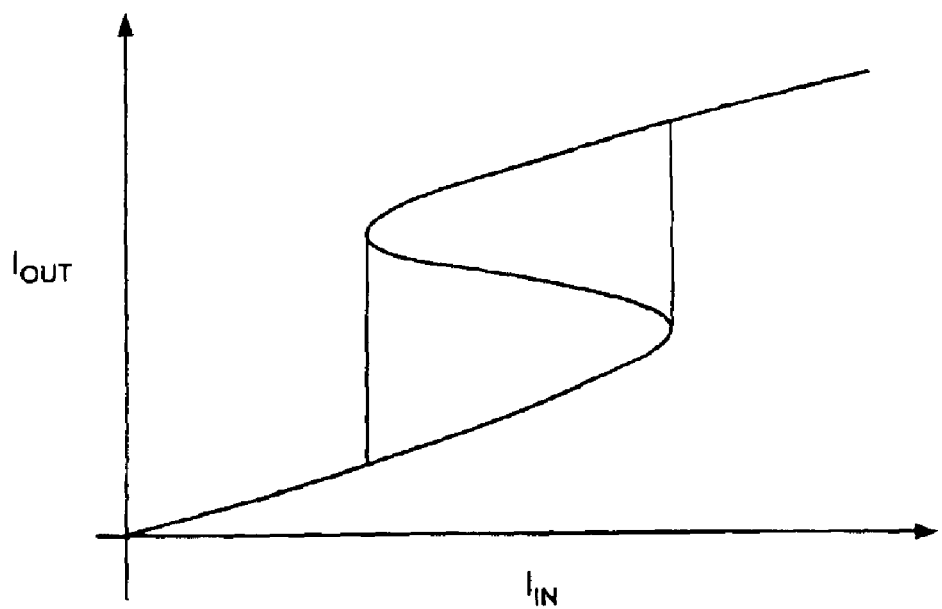
FIG. 37 is a plot showing output intensity as a function of input intensity for a bi-stable optical device.

As is evident in FIG. 36, one can have 1, 2, or 3 possible values for $I_{OUT}$ at a given $I_{IN}$. Referring to FIG. 37, when solving for these solutions explicitly, one obtains a characteristic hysteresis curve for $I_{OUT}(I_{IN})$. The solutions in the "backwards" part of the curve (i.e., for which $I_{OUT}$ is decreasing as $I_{IN}$ increases) are unstable. In other words, any small perturbation makes the system jump to either the upper or lower branch of the curve, so that only the upper and lower branches of this curve are physically observable. In this manner, we obtain a bi-stable device with a hysteresis loop. For example, if one starts with a high $I_{IN}$, and decreases it slowly, one follows the upper branch of the curve until one "runs out" of the upper branch, at which point one drops discontinuously to the lower branch. Alternatively, if one starts at $I_{IN}=0$, and increases $I_{IN}$ slowly, one follows the lower branch till this branch "runs out," at which point one jumps discontinuously to the upper branch, as indicated by the dotted lines in FIG. 37.

The characteristics of a nonlinear Fabry-Perot in-fiber oscillator can be studied using a simple one-dimensional model described below. Exemplary parameters used to describe the Bragg gratings are: layer thickness equal to $\lambda_0/8$, (where $\lambda_0$ is comparable to the free-space wavelength of the light), with indices of refraction being $n_1=1.5$ and $n_2=2.75$. This one-dimensional system has a band gap of 34%. Due to high confinement, only 5 bilayers are sufficient to achieve the necessary Q. The nonlinear cavity, which is sandwiched between the two gratings, has index of refraction $n=1+\delta n$ and is $\lambda_0/2$ in thickness. Here, $\delta n$ is the externally (or internally) induced change in the index of refraction of the cavity, if any. (It is not present in e.g., a simple linear filter.)

Figure 38:
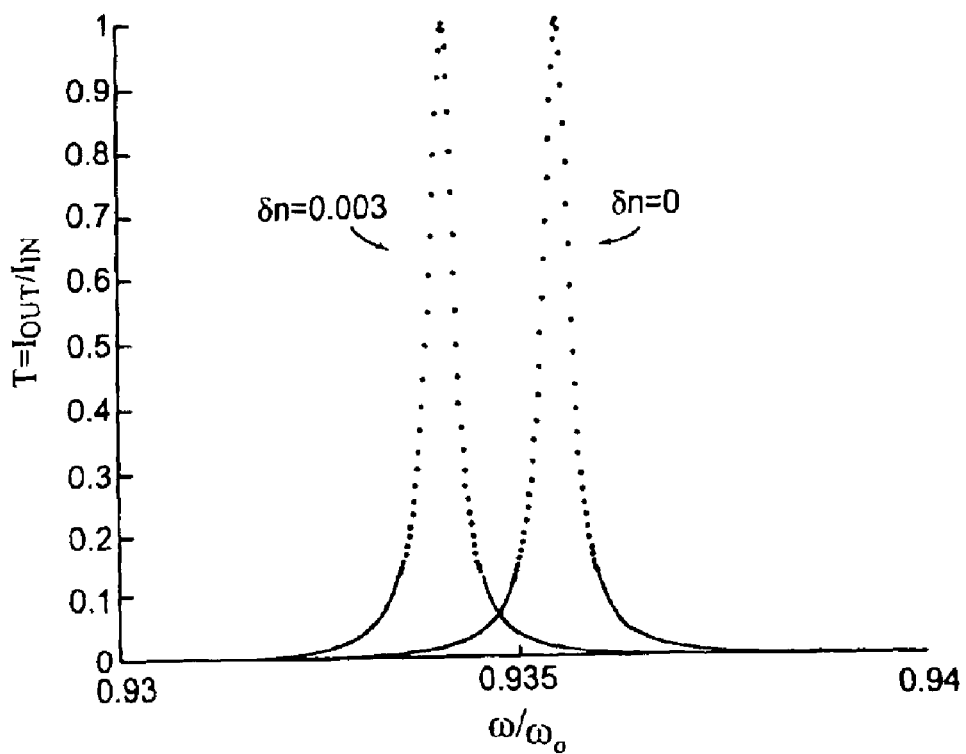
FIG. 38 is a plot showing transmission as a function of frequency for a bi-stable optical device for two different values for the refractive index inside the optical cavity.

Referring to FIG. 38, the transmission curves as a function of frequency for both $\delta n=0$ and $\delta n=0.003$ are plotted. The quality factor (Q) for this structure is 2350, while the resonant frequency (when $\delta n=0$) is 0.935463 $\omega_0/2\pi$ (where $\omega_0$ is the frequency corresponding to $\lambda_0$). The index shift is seen to result in a shift in the peak frequency.

Figure 39:
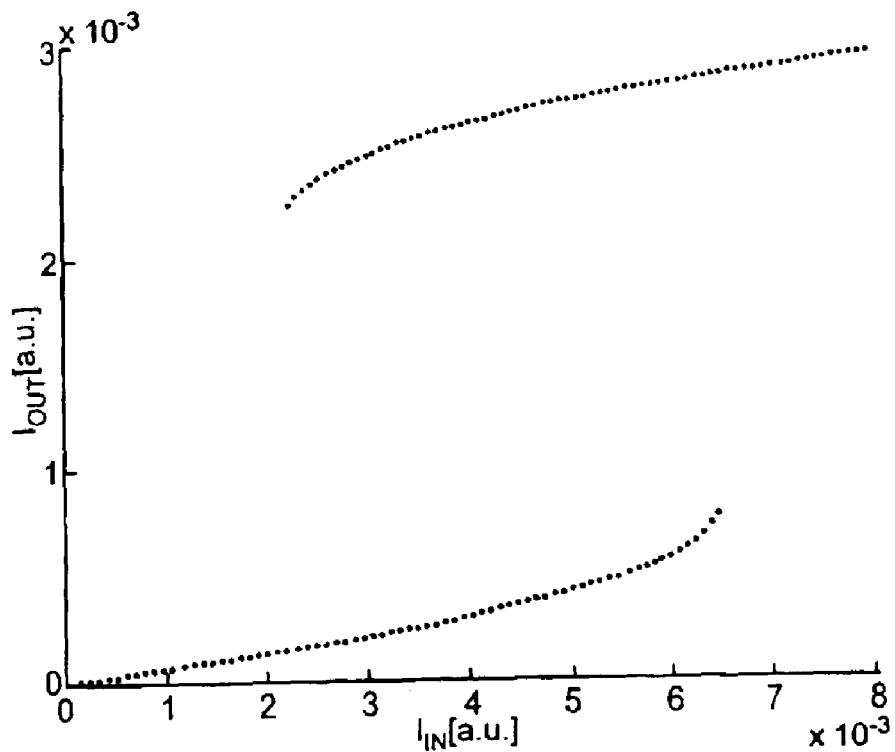
FIG. 39 is a plot showing output intensity as a function of input intensity for a bi-stable optical device.

Referring to FIG. 39, next, we analyze a $\delta n$ induced by the signal itself. We select the operating frequency to be 0.9991 times the resonant frequency of the linear device. Assuming that $\delta n$ is directly proportional to the total energy inside the cavity, FIG. 39 shows the output intensity ($I_{OUT}$) vs. input intensity ($I_{IN}$) for this device. The units of intensity are arbitrary, since the physical intensity will depend strongly on the Kerr coefficient of the nonlinear material being used. However, we selected the constant of proportionality between I (in these arbitrary units) and $\delta n$ so that the maximum $\delta n$ ever attained when operating this device in the regime of FIG. 39 is 0.0023.

Figure 40:
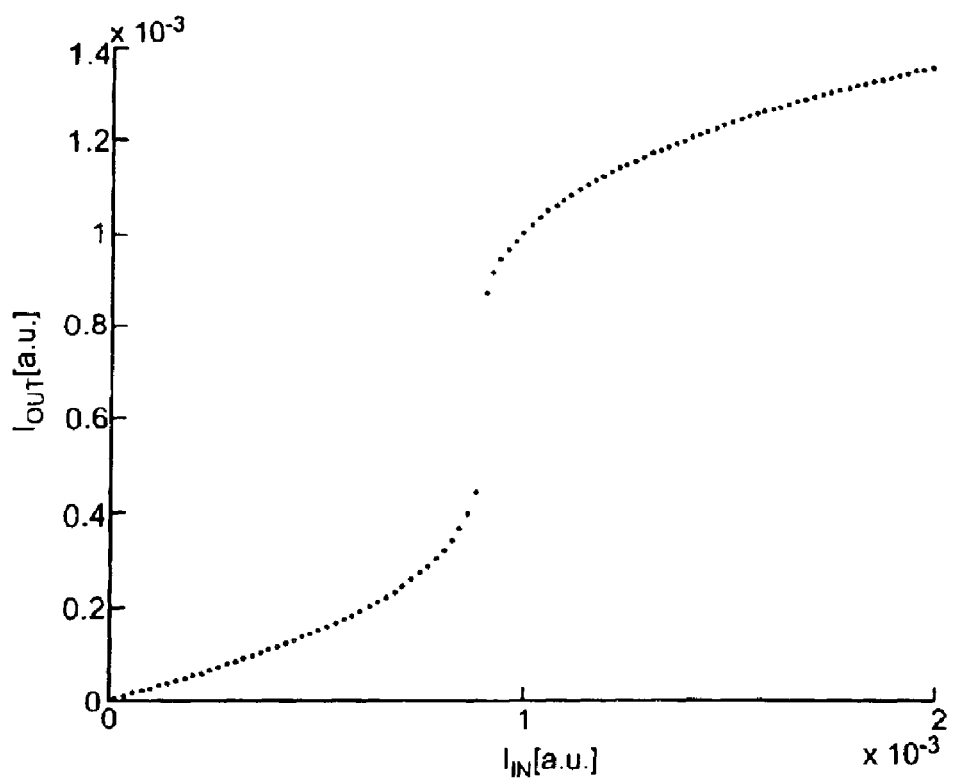
FIG. 40 is a plot showing output intensity as a function of input intensity for another bi-stable optical device.

Referring to FIG. 40, it is possible to reduce the effect of the hysteresis loop by selecting the operating frequency to be closer to the resonant frequency. In this example, the distance between these frequencies is kept such that the nonlinear response of $I_{OUT}$ vs. $I_{IN}$ is as large as possible. The operating frequency is 0.9996 times the resonant frequency, and the largest $\delta n$ achieved when operating this device in the regime of FIG. 40 is $\delta n=0.001$.

Figure 41:
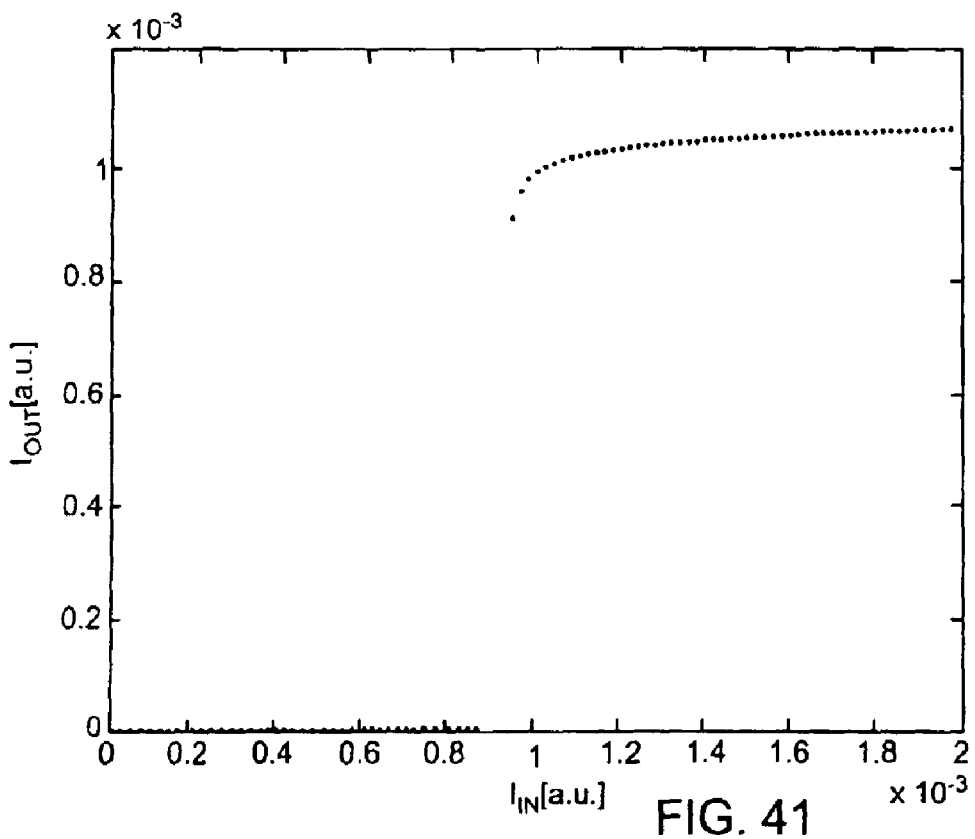
FIG. 41 is a plot showing output intensity as a function of input intensity for a further bi-stable optical device.

An even stronger nonlinear relation of $I_{OUT}$ vs. $I_{IN}$ than the one illustrated in FIG. 40, the output of one device is used as the input of another identical device. Referring to FIG. 41, a near step-like nonlinear response is observed when cascading four such devices.

In general, any number of devices can be cascaded to provide a device with the desired nonlinear response. For example, a bi-stable optical device can include more than four optical cavities (e.g., five optical cavities, six optical cavities, seven optical cavities, or eight or more optical cavities). Alternatively, a bi-stable optical device can include less than four optical cavities (e.g., one, two, or three optical cavities).

Figure 42:
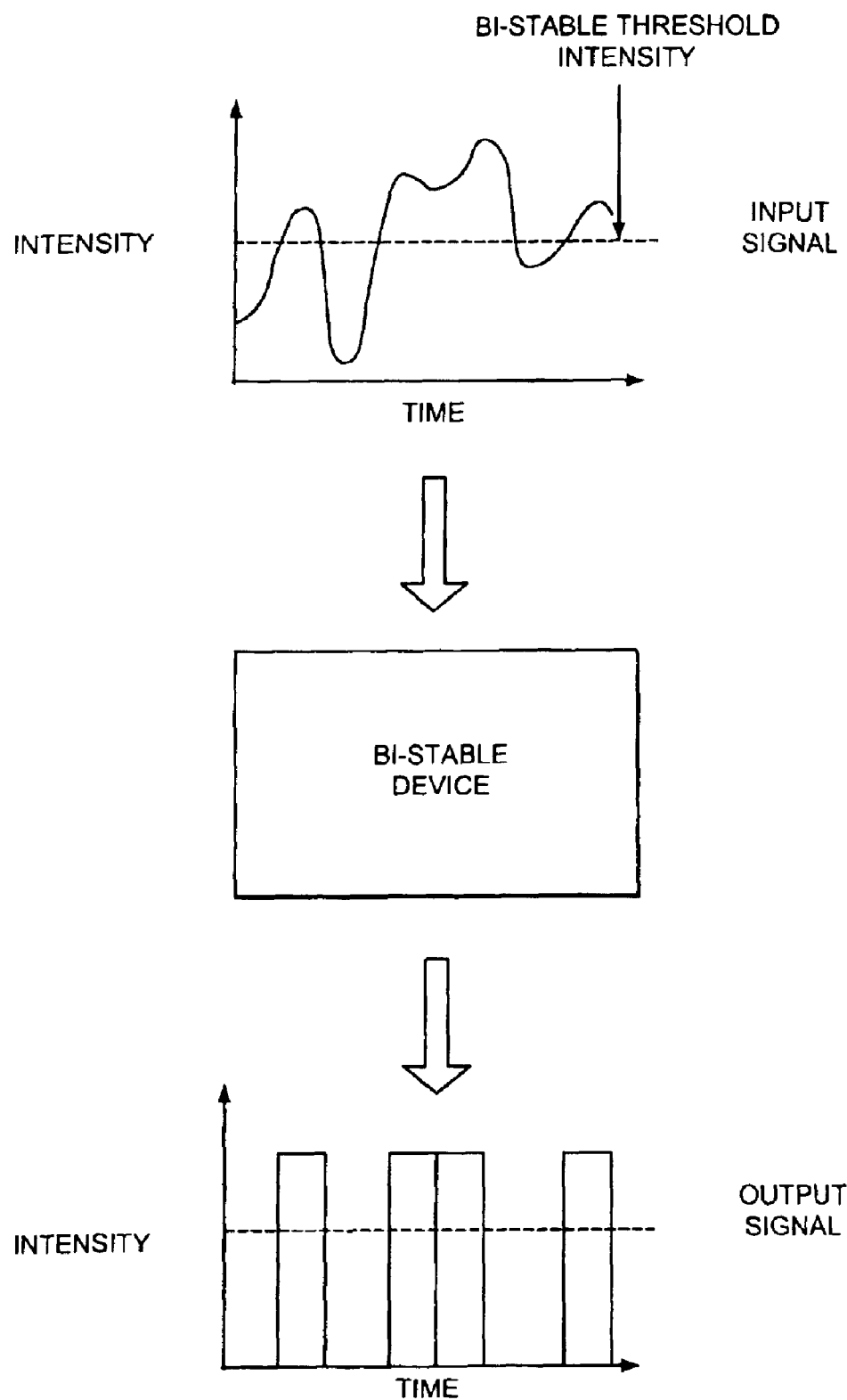
FIG. 42 is a schematic illustrating the operation of a bi-stable optical device.

Bi-stable optical devices can be used in numerous optical systems; such as an optical system used in optical limiting and power equalizing applications. For example, in embodiments having a relatively flat output curve (such as in FIG. 41), the output has a fixed intensity despite the variations in input. Exploring the same effect, bi-stable optical devices can also be used for cleaning up noise in the signal. For example, a bi-stable optical device can be used in place of an optical regenerator in an optical system. An optical regenerator is an optical receiver that feeds its electrical output directly into an optical transmitter. The optical transmitter than launches a new optical signal into the fiber. Optical regenerators are typically used in long-haul applications to remove the effects of, e.g., dispersion, nonlinearities, and noise that could otherwise corrupt the optical signal and increase the bit-error rate in the system. However, as many components are needed for converting the optical signal into an electrical signal, and the electrical signal back into an optical signal, optical regeneration can be complex, inefficient, and expensive. A bi-stable optical device can provide an all-optical analogue for an optical regenerator. For example, FIG. 42 shows the intensity profile of an input signal into a bi-stable optical device, and the corresponding output signal exiting the device. The input signal pulse train profile is highly distorted from the binary waveform (not shown) originally launched into the system. However, the bi-stable device provides only two possible output states for an input signal, corresponding to an input signal above and below a bi-stable threshold intensity. Accordingly, a binary pulse train is restored in the output signal.

Moreover, if a device has two input signals, which are then added as a single input into a bi-stable device, the bi-stable device can be used as an all-optical AND gate (since the parameters can be chosen such that only two inputs being present at the same time trigger the device into the high-output state). Moreover, if a "control" signal, and the main signal are at two different frequencies, such devices can also be used for optical imprinting of one signal onto another, or alternatively for wavelength conversion. In addition, one can also use them as amplifiers (when operated in the high $d(I_{OUT)/d(IIN)}$ region of the curve in FIG. 40), or potentially for all-optical memory (using hysteresis such as that shown in FIG. 41, or by employing a feedback loop with two devices like those illustrated by the output curve in FIG. 41).

Figure 43:
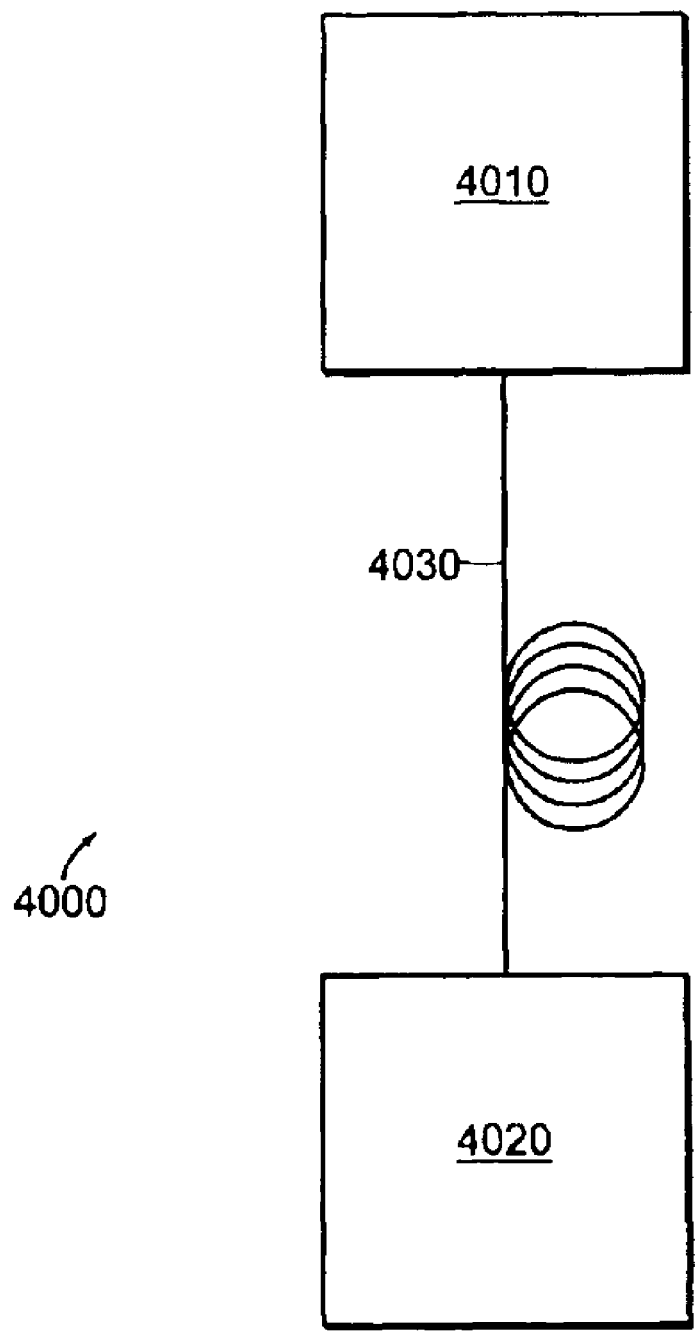
FIG. 43 is a schematic of a telecommunications system including a high index-contrast fiber waveguide.
Figure 44:
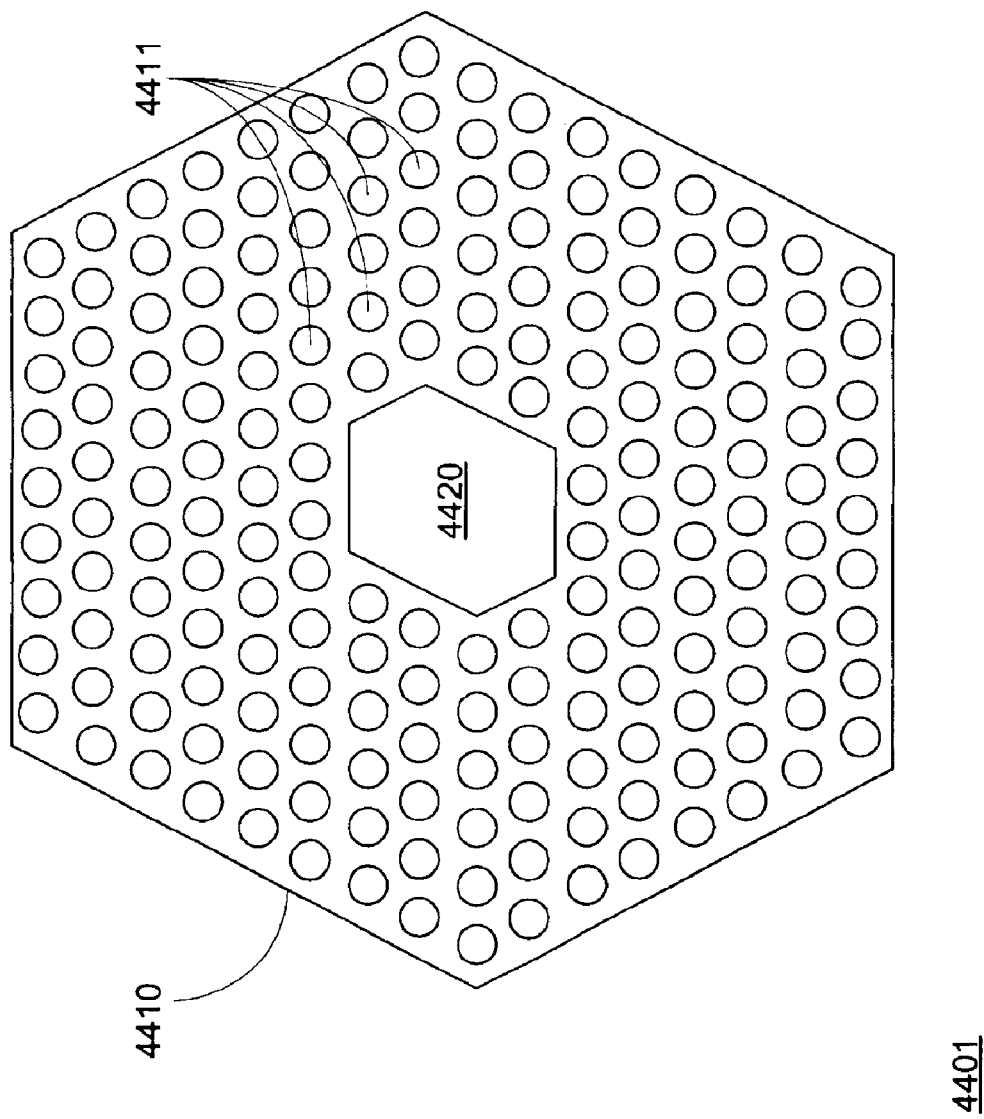
FIG. 44 is a cross-sectional view of an embodiment of a high index-contrast photonic crystal fiber including holey portions.

More generally, any of the high index-contrast fiber waveguides described herein may be used in optical telecommunications systems. FIG. 43 shows a schematic diagram of an optical telecommunication system 4000 including a source node 4010 and a detection node 4020, which are coupled to one another by an optical transmission line 4030. The optical transmission line may include one or more segments of transmission fiber and one or more segments of dispersion compensation fiber. The transmission fiber can be a high index-contrast fiber waveguide (e.g., a high index-contrast optical fiber or a high index-contrast photonic fiber). Any of the dispersion compensation fiber segments can also be a high index-contrast fiber waveguide. Source node 4010 may be the original source of an optical signal directed along the transmission line or it may be an intermediate node that redirects the optical signal to transmission line 4030, optically amplifies it, and/or electronically detects it and optically regenerates it. Furthermore, source node 4010 may include components for multiplexing or demultiplexing multiple optical signals at different wavelengths. Similarly, detector node 4020 may be the final destination for the optical signal transmitted along the transmission line, or it may be an intermediate node that redirects, optically amplifies, and/or electrically detects and optically regenerates the optical signal. In addition, detector node 4020 may also include components for multiplexing or demultiplexing multiple optical signals at different wavelengths. Any of the devices in either source node 4010 or detector node 4020 can include a high index-contrast fiber waveguide device. For example, an optical regenerator in the source node can be a high index-contrast fiber waveguide bi-stable device. In a further example, either node may include an erbium-doped high index-contrast optical fiber amplifier, etc. The dispersion compensation fiber(s) may be positioned to pre-compensate or post-compensate for dispersion in the optical signal caused by the transmission fiber(s). Furthermore, the optical signal transmitted along the transmission line may be a wavelength division multiplexed (WDM) signal that includes multiple signals at corresponding wavelengths. Suitable wavelengths for the system include those within a range of about 1.2 microns to about 1.7 microns, which corresponds to many long-haul systems in use today, as well those within a range of about 0.7 microns to about 0.9 microns, which corresponds to some metro systems currently being considered.

A number of embodiments of the invention have been described. Nevertheless, it will be understood that various modifications may be made without departing from the spirit and scope of the invention. Accordingly, other embodiments are within the scope of the following claims.

What is claimed is:

1. A fiber waveguide having a waveguide axis, comprising:
a first portion extending along the waveguide axis; and
a second portion different from the first portion extending along the waveguide axis surrounding the first portion;
wherein at least one of the first and second portions comprises a chalcogenide glass selected from the group consisting of Selenium chalcogenide glasses and Tellurium chalcogenide glasses, both the first and second portions have a viscosity greater than $10^3$ Poise at some temperature, T, and the fiber waveguide is a photonic crystal fiber.

2. The fiber waveguide of claim 1, wherein the chalcogenide glass is selected from the group consisting of As—S, As—Se, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—Se—Tl, As—Te—Tl, As—Se—Ga, and Ge—Sb—Se.

3. The fiber waveguide of claim 1, wherein the chalcogenide glass comprises an element selected from the group consisting of boron, aluminum, silicon, phosphorus, sulfur, gallium, arsenic, indium, tin, antimony, thallium, lead, bismuth, cadmium, lanthanum, fluorine, chlorine, bromine, and iodine.

4. The fiber waveguide of claim 1, wherein at least one of the first and second portions includes a nonlinear material.

5. The fiber waveguide of claim 4, wherein the nonlinear material is an electrooptic material.

6. The fiber waveguide of claim 1, wherein the first or second material include one or more rare earth ions.

7. The fiber waveguide of claim 6, wherein the rare earth ions include erbium ions.

8. The fiber waveguide of claim 1, wherein the first portion is a homogeneous portion.

9. The fiber waveguide of claim 1, wherein the first portion is an inhomogeneous portion.

10. The fiber waveguide of claim 9, wherein the first portion includes a holey portion having one or more holes extending along the waveguide axis.

11. The fiber waveguide of claim 1, wherein the second portion comprises a dielectric material.

12. The fiber waveguide of claim 11, wherein the dielectric material is an inorganic material.

13. The fiber waveguide of claim 12, wherein the inorganic material is an inorganic glass.

14. The fiber waveguide of claim 13, wherein the inorganic glass is a halide glass.

15. The fiber waveguide of claim 13, wherein the inorganic glass is an oxide glass.

16. The fiber waveguide of claim 15, wherein the oxide glass includes up to 40 mole % of a compound of the form MO, where M is selected from the group consisting of Pb, Ca, Mg, Sr, Zn, and Ba.

17. The fiber waveguide of claim 15, wherein the oxide glass includes up to 40 mole % of a compound of the form $M_2O$, where M is selected from the group consisting of Li, Na, K, Rb, and Cs.

18. The fiber waveguide of claim 15, wherein the oxide glass includes up to 40 mole % of a compound of the form $M_2O_3$, where M is selected from the group consisting of Al, B, Ga, In, and Bi.

19. The fiber waveguide of claim 15, wherein the oxide glass includes up to 60 mole % of $P_2O_5$.

20. The fiber waveguide of claim 15, wherein the oxide glass includes up to 40 mole % of $SiO_2$.

21. The fiber waveguide of claim 15, wherein the oxide glass includes up to 40 mole % of a compound of the form MO, where M is selected from the group consisting of Zn.

22. The fiber waveguide of claim 15, wherein the oxide glass comprises more than one oxide compound.

23. The fiber waveguide of claim 22, wherein the oxide glass comprises ZnO and $P_2O_5$.

24. The fiber waveguide of claim 23, wherein the oxide glass further comprises PbO and $In_2O_3$.

25. The fiber waveguide of claim 13, wherein the inorganic glass is a mixed oxide-fluoride glass.

26. The fiber waveguide of claim 11, wherein the dielectric material is an organic material.

27. The fiber waveguide of claim 26, wherein the organic material is a polymer.

28. The fiber waveguide of claim 27, wherein the polymer is a polymer selected from the group consisting of carbonate-, sulfone-, etherimid-, acrylate-families, and fluoropolymers.

29. The fiber waveguide of claim 1, wherein the second portion is a homogeneous portion.

30. The fiber waveguide of claim 1, wherein the second portion is an inhomogeneous portion.

31. The fiber waveguide of claim 30, wherein the second portion is a holey portion having one or more holes extending along the waveguide axis.

32. The fiber waveguide of claim 1, wherein the photonic crystal fiber is a Bragg fiber.

33. The fiber waveguide of claim 1, wherein the first portion has a refractive index $n_1$, the second portion has a refractive index $n_2$, and $|n_1-n_2| \geq 0.35$.

34. The fiber waveguide of claim 1, wherein the first portion has a refractive index $n_1$, the second portion has a refractive index $n_2$, and $|n_1-n_2| \geq 0.5$.

35. The fiber waveguide of claim 1, wherein the first and second portions have a viscosity between $10^3$ Poise and $10^6$ Poise at some temperature, T.

36. A fiber waveguide having a waveguide axis, comprising:
a core extending along the waveguide axis; and
a confinement region surrounding the core about the waveguide axis and comprising a chalcogenide glass, the confinement region further comprising a photonic crystal structure having a photonic band gap, wherein during operation the confinement region guides EM radiation in at least a first range of frequencies to propagate along the waveguide axis,
wherein the fiber waveguide is a photonic crystal fiber.

37. The fiber waveguide of claim 36, wherein the confinement region includes a first portion having a refractive index $n_1$ and a second portion having a refractive index $n_2$, and $|n_1-n_2| \geq 0.1$.

38. The fiber waveguide of claim 37, wherein $|n_1-n_2| \geq 0.3$.

39. The fiber waveguide of claim 36, wherein the core is a hollow core.

40. The fiber waveguide of claim 36, wherein the core includes a dielectric material.

41. The fiber waveguide of claim 36, wherein the core includes a nonlinear material.

42. The fiber waveguide of claim 36, wherein the core includes a rare earth ion.

43. The fiber waveguide of claim 36, wherein the confinement region comprises a plurality of layers.

44. The fiber waveguide of claim 43, wherein plurality of layers include the chalcogenide glass.

45. The fiber waveguide of claim 43, wherein a subset of the plurality of layers are devoid of the chalcogenide glass.

46. The fiber waveguide of claim 43, wherein a subset of layers are alternating layers.

47. The fiber waveguide of claim 36, wherein the chalcogenide glass includes Selenium.

48. The fiber waveguide of claim 36, wherein the chalcogenide glass includes Tellurium.

49. The fiber waveguide of claim 36, wherein the chalcogenide glass comprises an element selected from the group consisting of boron, aluminum, silicon, phosphorus, sulfur, gallium, arsenic, indium, tin, antimony, thallium, lead, bismuth, cadmium, lanthanum, fluorine, chlorine, bromine, and iodine.

50. A method for making photonic crystal fiber waveguide, comprising:
providing a fiber preform comprising a first portion and a second portion surrounding the first portion, wherein the first portion comprises a chalcogenide glass;
heating the fiber preform such that the first and second portions have a viscosity between $10^3$ Poise and $10^6$ Poise; and
drawing the heated fiber preform to make the photonic crystal fiber waveguide.

51. The method of claim 50, wherein the viscosity of the heated first and second portions is less than $10^5$ Poise.

52. A fiber waveguide having a waveguide axis, comprising:
a first portion extending along the waveguide axis comprising a chalcogenide glass selected from the group consisting of Selenium chalcogenide glasses and Tellurium chalcogenide glasses; and
a second portion different from the first portion extending along the waveguide axis surrounding the first portion, the second portion comprising a non-chalcogenide glass;
wherein both the first and second portions have a viscosity greater than $10^3$ Poise at some temperature, T, and the fiber waveguide is a photonic crystal fiber.

53. The fiber waveguide of claim 52, wherein the non-chalcogenide glass is an oxide glass.

54. The fiber waveguide of claim 52, wherein the non-chalcogenide glass is a halide glass.

55. The fiber waveguide of claim 52, wherein the first and second portions have a viscosity between $10^3$ Poise and $10^6$ Poise at some temperature, T.

* * * * *